(12) United States Patent
Takahashi

(10) Patent No.: US 12,113,415 B2
(45) Date of Patent: Oct. 8, 2024

(54) ROTATING ELECTRIC MACHINE AND CONDUCTOR

(71) Applicant: DENSO CORPORATION, Kariya (JP)

(72) Inventor: Yuki Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 239 days.

(21) Appl. No.: 17/741,566

(22) Filed: May 11, 2022

(65) Prior Publication Data

US 2022/0271593 A1    Aug. 25, 2022

Related U.S. Application Data

(63) Continuation of application No. PCT/JP2020/041959, filed on Nov. 10, 2020.

(30) Foreign Application Priority Data

Nov. 11, 2019    (JP) .................. 2019-204213

(51) Int. Cl.
*H02K 3/28* (2006.01)
*H02K 3/34* (2006.01)
*H02K 3/42* (2006.01)

(52) U.S. Cl.
CPC ............. *H02K 3/34* (2013.01); *H02K 3/28* (2013.01); *H02K 3/42* (2013.01)

(58) Field of Classification Search
CPC .. H02K 3/12; H02K 3/28; H02K 3/04; H02K 3/38; H02K 3/50; H02K 1/27; H02K 1/2791; H02K 1/276
See application file for complete search history.

(56) References Cited

U.S. PATENT DOCUMENTS

| | | | |
|---|---|---|---|
| 6,229,241 B1 | 5/2001 | Ishigami et al. | |
| 2014/0125182 A1 | 5/2014 | Takahashi | |
| 2020/0161939 A1 | 5/2020 | Takahashi et al. | |
| 2020/0162003 A1 | 5/2020 | Takahashi et al. | |
| 2020/0328639 A1 | 10/2020 | Takahashi | |
| 2020/0336033 A1 | 10/2020 | Takahashi | |
| 2021/0006115 A1* | 1/2021 | Nehl .................. | H02K 1/276 |

FOREIGN PATENT DOCUMENTS

| | | |
|---|---|---|
| JP | 2002-064028 A | 2/2002 |
| JP | 2002-272066 A | 9/2002 |
| JP | 2013-122849 A | 6/2013 |
| JP | 2015-128355 A | 7/2015 |
| JP | 5805336 B1 | 11/2015 |
| JP | 2017-131046 A | 7/2017 |
| JP | 2019-106864 A | 6/2019 |
| JP | 2019-122236 A | 7/2019 |

* cited by examiner

*Primary Examiner* — Bryan R Perez
(74) *Attorney, Agent, or Firm* — Oliff PLC

(57) ABSTRACT

A rotating electric machine includes an armature that has an armature winding of multiple phases. The armature winding is configured by a conductor being wound. The conductor is configured by a plurality of wires being covered by an insulation coating in a state in which the plurality of wires are bundled. Each of the plurality of wires includes a conductor body configured to permit flow of a current, and a fusion layer that covers a surface of the conductor body. The fusion layer is configured to be thinner than the insulation coating. In the state in which the plurality of wires are bundled, fusion layers of the plurality of wires are fused and in contact with one another.

3 Claims, 41 Drawing Sheets

COMPARATIVE EXAMPLE

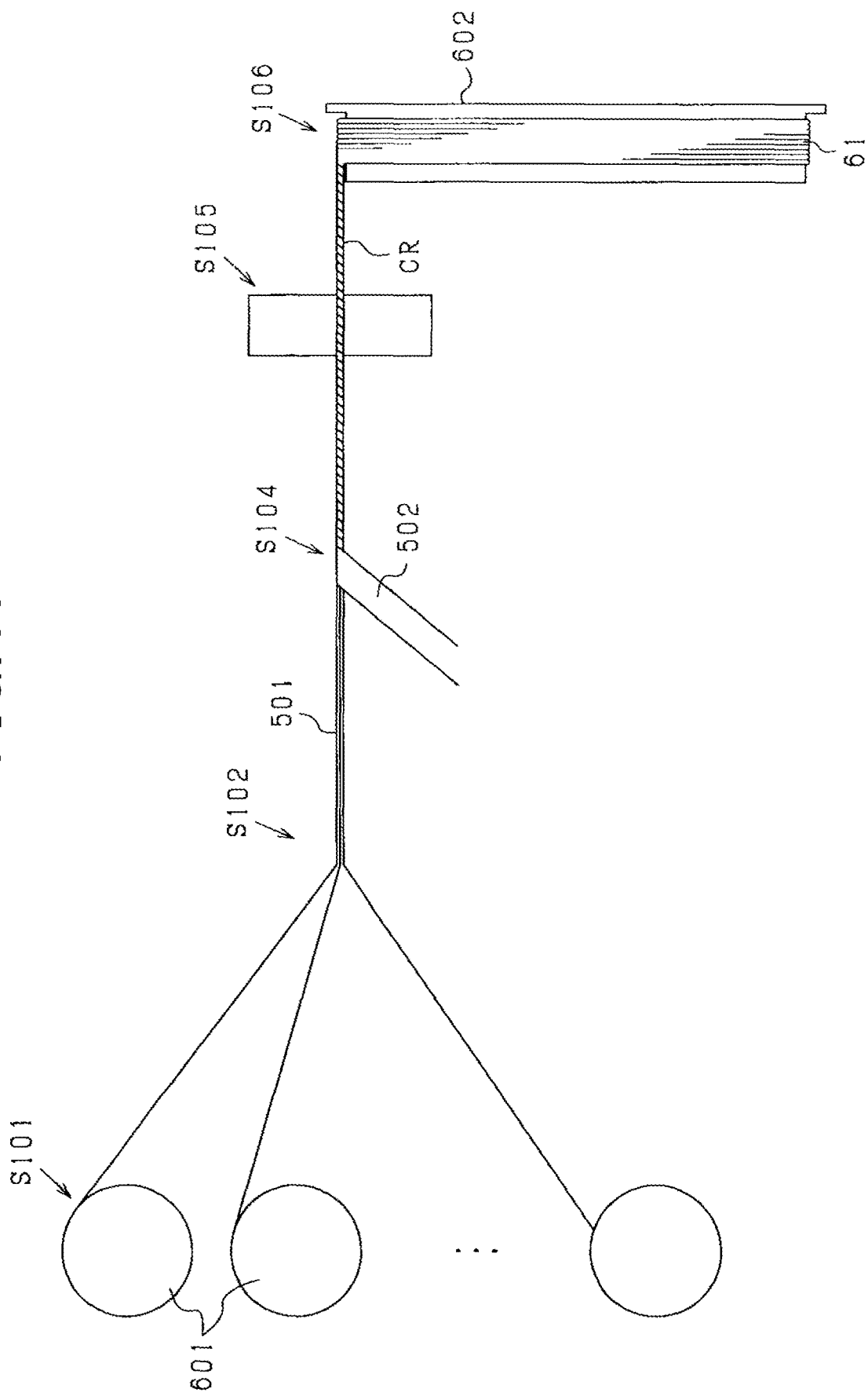

ROTATING ELECTRIC MACHINE AND CONDUCTOR

CROSS-REFERENCE TO RELATED APPLICATION

The present application is a continuation application of International Application No. PCT/JP2020/041959, filed on Nov. 10, 2020, which claims priority to Japanese Patent Application No. 2019-204213, filed on Nov. 11, 2019. The contents of these applications are incorporated herein by reference in their entirety.

BACKGROUND

Technical Field

The present disclosure relates to a rotating electric machine and a conductor.

Related Art

A rotating electric machine that includes a stator winding (armature winding) that is formed by a conductor being wound has been proposed. The conductor is configured of bundled wires and is capable of favorably suppressing eddy current loss.

SUMMARY

One aspect of the present disclosure provides a rotating electric machine that includes an armature that has an armature winding of multiple phases, in which: the armature winding is configured by a conductor being wound; the conductor is configured by a plurality of wires covered by an insulation coating in a state in which the plurality of wires are bundled; each of the plurality of wires includes a conductor body configured to permit flow of a current, and a fusion layer that covers a surface of the conductor body; the fusion layer is configured to be thinner than the insulation coating; and in the state in which the plurality of wires are bundled, fusion layers of the plurality of wires are fused and in contact with one another.

BRIEF DESCRIPTION OF THE DRAWINGS

In the accompanying drawings:

FIG. 44 is a diagram illustrating an image of a manufacturing process for the stator winding;

DESCRIPTION OF THE EMBODIMENTS

Figure 1:
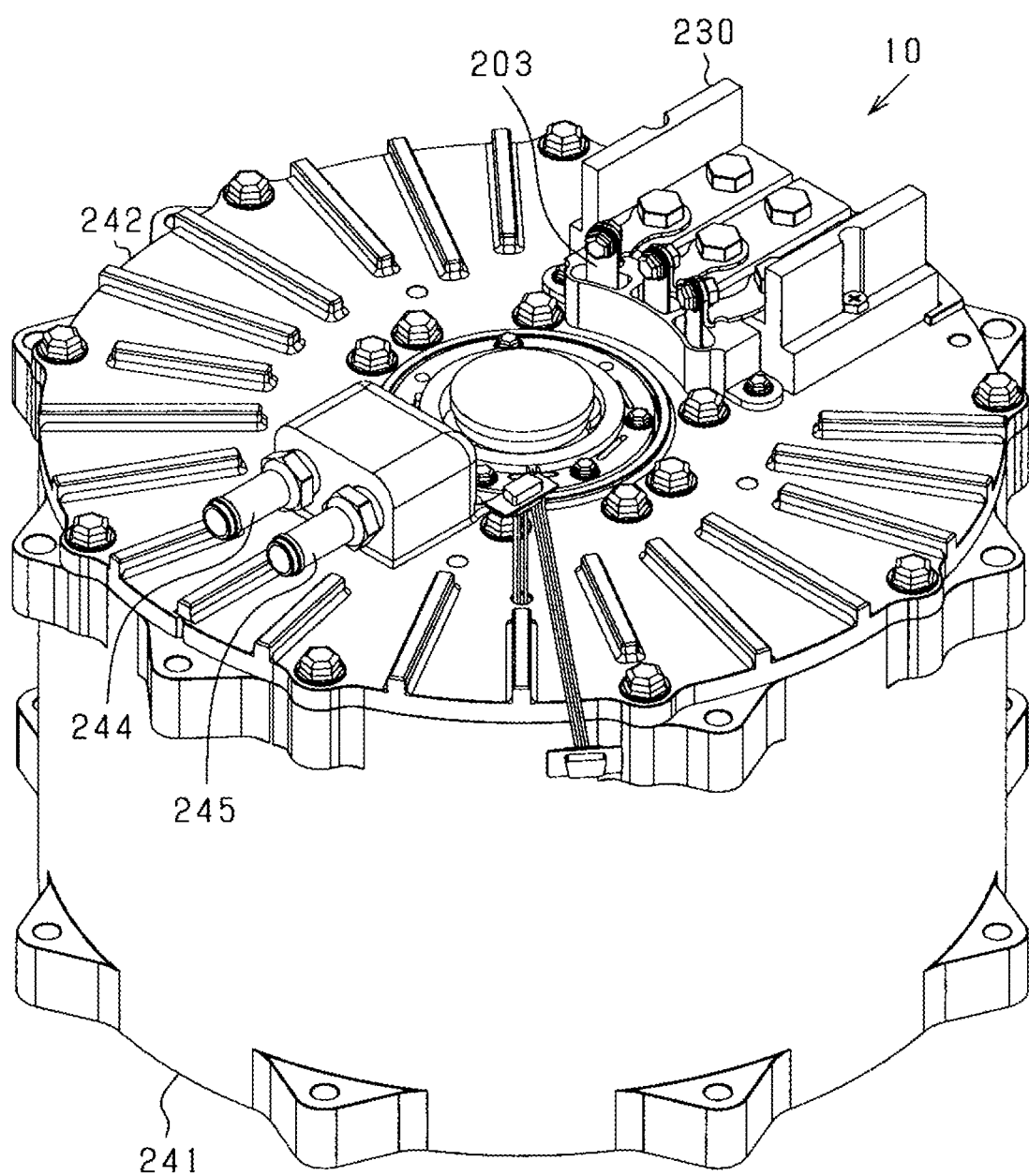
FIG. 1 is a perspective view illustrating an overall rotating electric machine according to a first embodiment.

Conventionally, as described in JP-A-2019-106864, a rotating electric machine that includes a stator winding (armature winding) that is formed by a conductor being wound has been proposed. The conductor is configured of bundled wires and is capable of favorably suppressing eddy current loss.

In the above-described stator winding, each wire is provided with an insulating layer. Therefore, eddy current loss can be favorably suppressed. However, there are issues in that manufacturing is difficult, and a coating on the wire becomes thick and space factor of a conductor body becomes poor.

It is thus desired to provide a rotating electric machine and a conductor that can be easily manufactured.

A plurality of embodiments disclosed in this specification employ technical measures that differ from one another to achieve respective objects. Objects, features, and effects disclosed in this specification will be further clarified with reference to detailed descriptions that follow and accompanying drawings.

A first exemplary embodiment provides a rotating electric machine that includes an armature that has an armature winding of multiple phases, in which: the armature winding is configured by a conductor being wound; the conductor is configured by a plurality of wires covered by an insulation coating in a state in which the plurality of wires are bundled; each of the plurality of wires includes a conductor body configured to permit flow of a current, and a fusion layer that covers a surface of the conductor body; the fusion layer is configured to be thinner than the insulation coating; and in the state in which the plurality of wires are bundled, fusion layers of the plurality of wires are fused and in contact with one another.

The insulation coating provides insulation between the conductors. Meanwhile, although the conductor body of the wire is covered by the fusion layer, an insulating layer is not provided. Therefore, the conductor bodies may come into contact with each other and become conductive. However, a potential difference between the conductor bodies is small. In addition, even if the fusion layer is damaged when the plurality of wires are bundled or covered by the insulation coating, an area over which the conductor bodies come into contact with each other is extremely small, and contact resistance is extremely large. Therefore, even if the conductor bodies are not completely insulated, eddy currents flowing between the conductor bodies can be suppressed.

Therefore, the fusion layer is directly provided on the conductor body without the insulating layer being provided on the surface of the conductor body, and the fusion layers are fused together. As a result, difficulty in providing the insulating layer is eliminated. In addition, as a result of the fusion layer being provided, the state in which the plurality of wires are bundled can be easily maintained and covering by the insulation coating can be facilitated. As a result of the foregoing, the conductor and the rotating electric machine can be easily manufactured. Furthermore, because the insulating layer of the wire is omitted, space factor of the conductor body can be improved.

According to a second exemplary embodiment, in the first exemplary embodiment, the insulation coating is formed into a tape-like shape and is wound in a spiraling manner around an outer circumference of the plurality of wires that are bundled.

As a result, because the conductor is formed by the tape-like insulation coating being wound around the plurality of wires, compared to a case in which the plurality of wires are resin-molded or the like, the insulation coating can be made thinner.

A third exemplary embodiment provides a conductor that configures an armature winding of a rotating electric machine, in which: the conductor is configured by a plurality of wires covered by an insulation coating in a state in which the plurality of wires are bundled; each of the plurality of wires includes a conductor body configured to permit flow of a current, and a fusion layer that covers a surface of the conductor body; the fusion layer is configured to be thinner than the insulation coating; and in the state in which the plurality of wires are bundled, fusion layers of the plurality of wires are fused and in contact with one another.

The insulation coating provides insulation between the conductors. Meanwhile, although the conductor body of the wire is covered by the fusion layer, an insulating layer is not provided. Therefore, the conductor bodies may come into contact with each another and become conductive therebetween. However, a potential difference between the conductor bodies is small. In addition, even if the fusion layer is damaged when the plurality of wires are bundled or covered by the insulation coating, an area over which the conductor bodies come into contact with each other is extremely small, and contact resistance is extremely large. Therefore, even if the conductor bodies are not completely insulated, eddy currents flowing between the conductor bodies can be suppressed.

Therefore, the fusion layer is directly provided on the conductor body without the insulating layer being provided on the surface of the conductor body, and the fusion layers are fused together. As a result, difficulty in providing the insulating layer is eliminated. In addition, as a result of the fusion layer being provided, the state in which the plurality of wires are bundled can be easily maintained and covering by the insulation coating can be facilitated. As a result of the foregoing, the conductor and the rotating electric machine can be easily manufactured. Furthermore, because the insulating layer of the wire is omitted, space factor of the conductor body can be improved.

The above-described object, other objects, characteristics, and advantages of the present disclosure will be further clarified through the detailed description herebelow, with reference to the accompanying drawings.

A plurality of embodiments will be described with reference to the drawings. According to the plurality of embodiments, sections that are functionally and/or structurally corresponding and/or related may be given the same reference numbers or reference numbers of which digits in the hundreds place and higher differ. Descriptions according to other embodiments can be referenced regarding the corresponding sections and/or related sections.

For example, a rotating electric machine according to a present embodiment may be used as a vehicle power source. However, the rotating electric machine can be widely used for industrial use, in vehicles, household appliances, office automation (OA) equipment, and gaming machines, and the like. Here, sections according to the embodiments below that are identical or equivalent to each other are given the same reference numbers in the drawings. Descriptions of sections that have the same reference numbers are applicable therebetween.

First Embodiment

Figure 2:
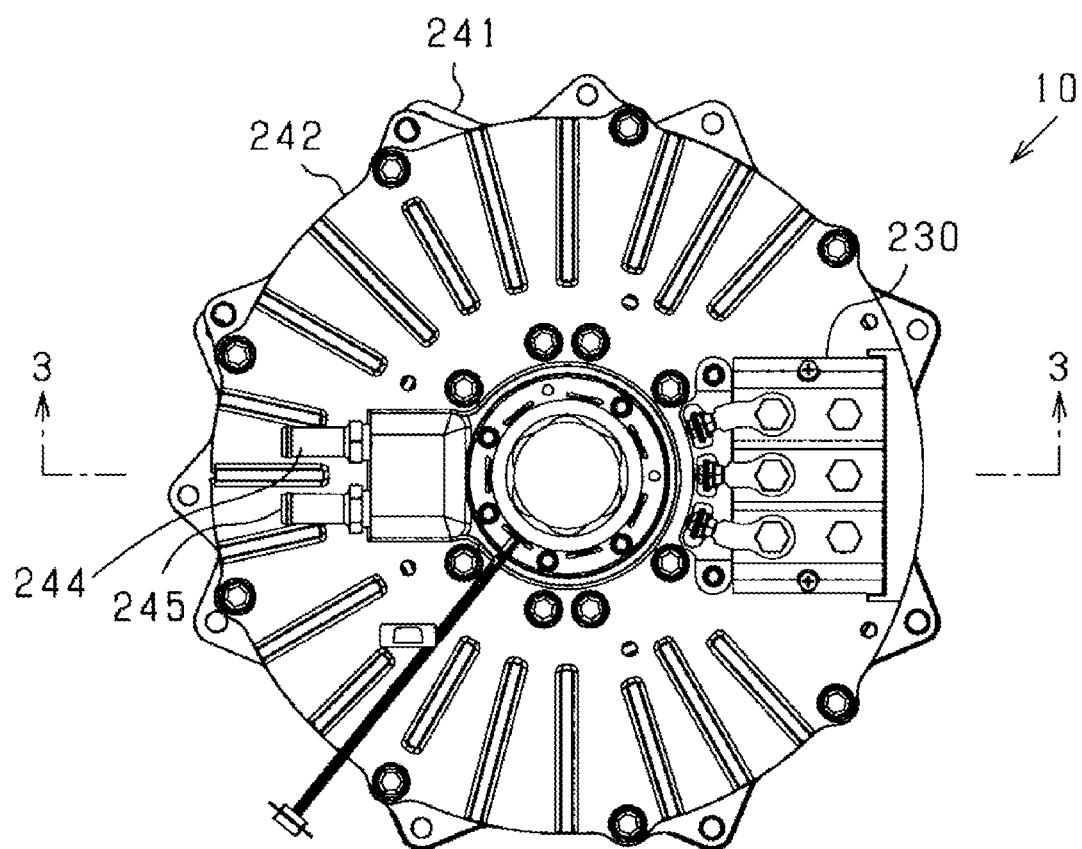
FIG. 2 is a plan view of the rotating electric machine.
Figure 3:
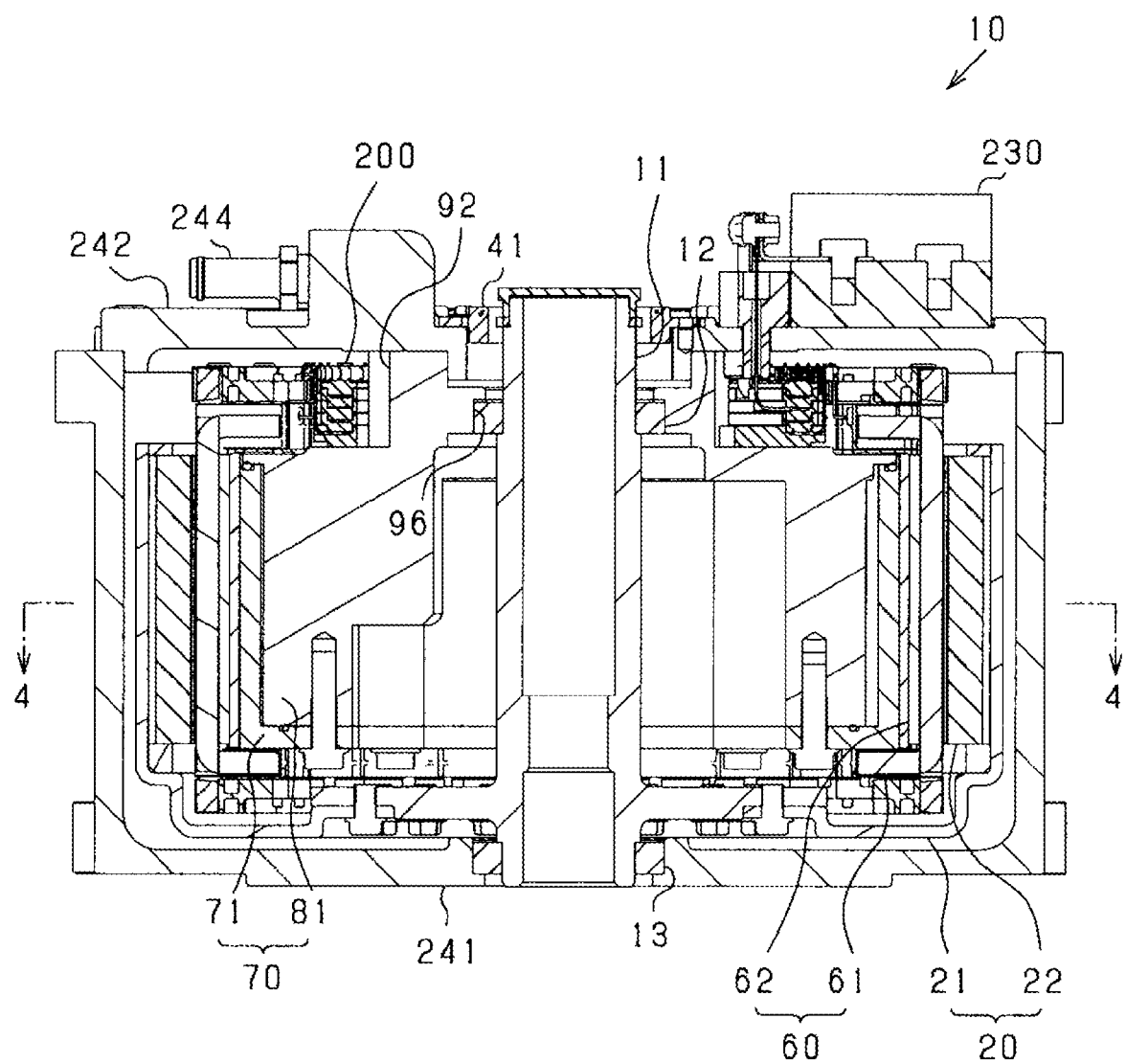
FIG. 3 is a longitudinal cross-sectional view of the rotating electric machine.
Figure 4:
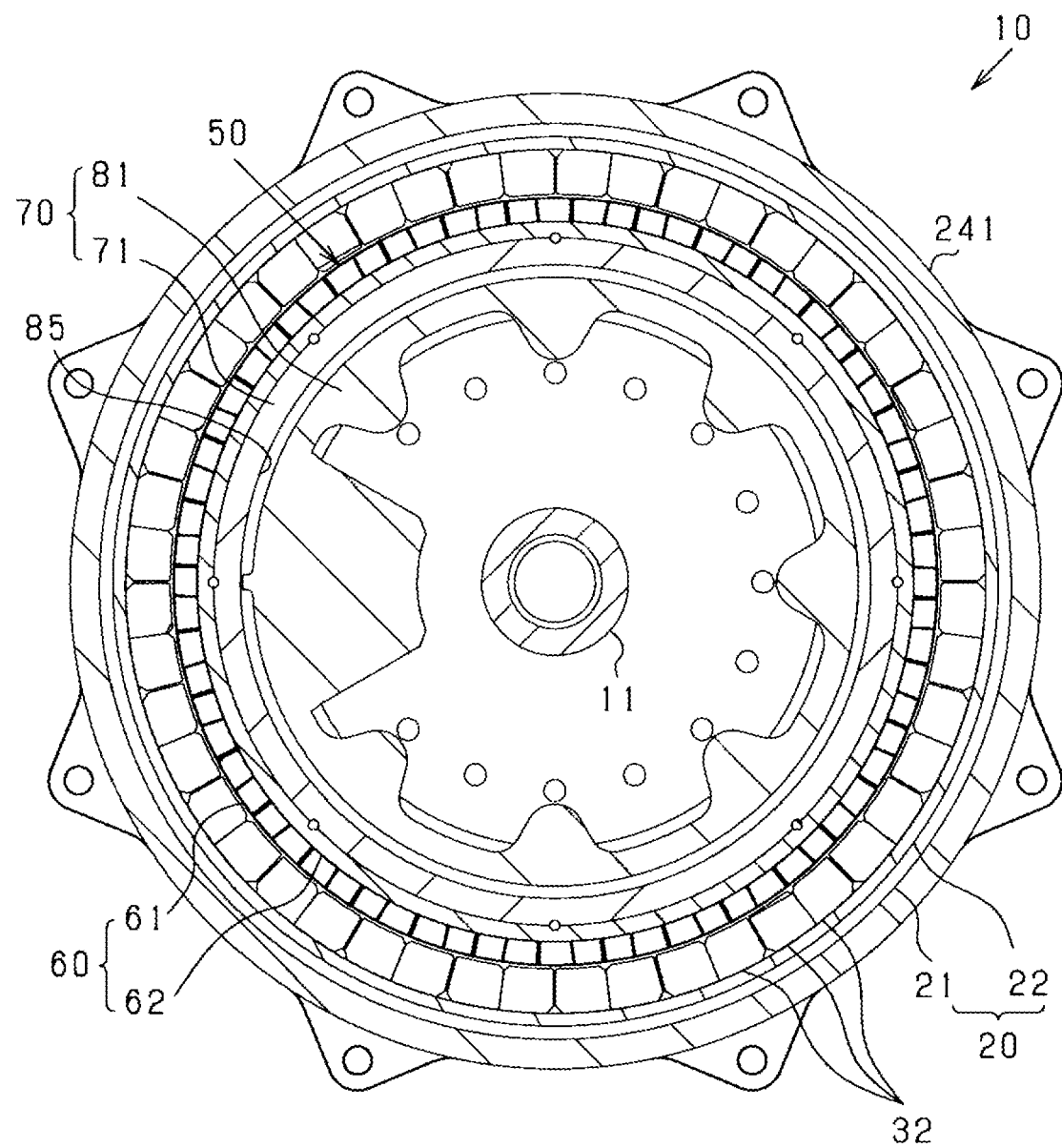
FIG. 4 is a lateral cross-sectional view of the rotating electric machine.
Figure 5:
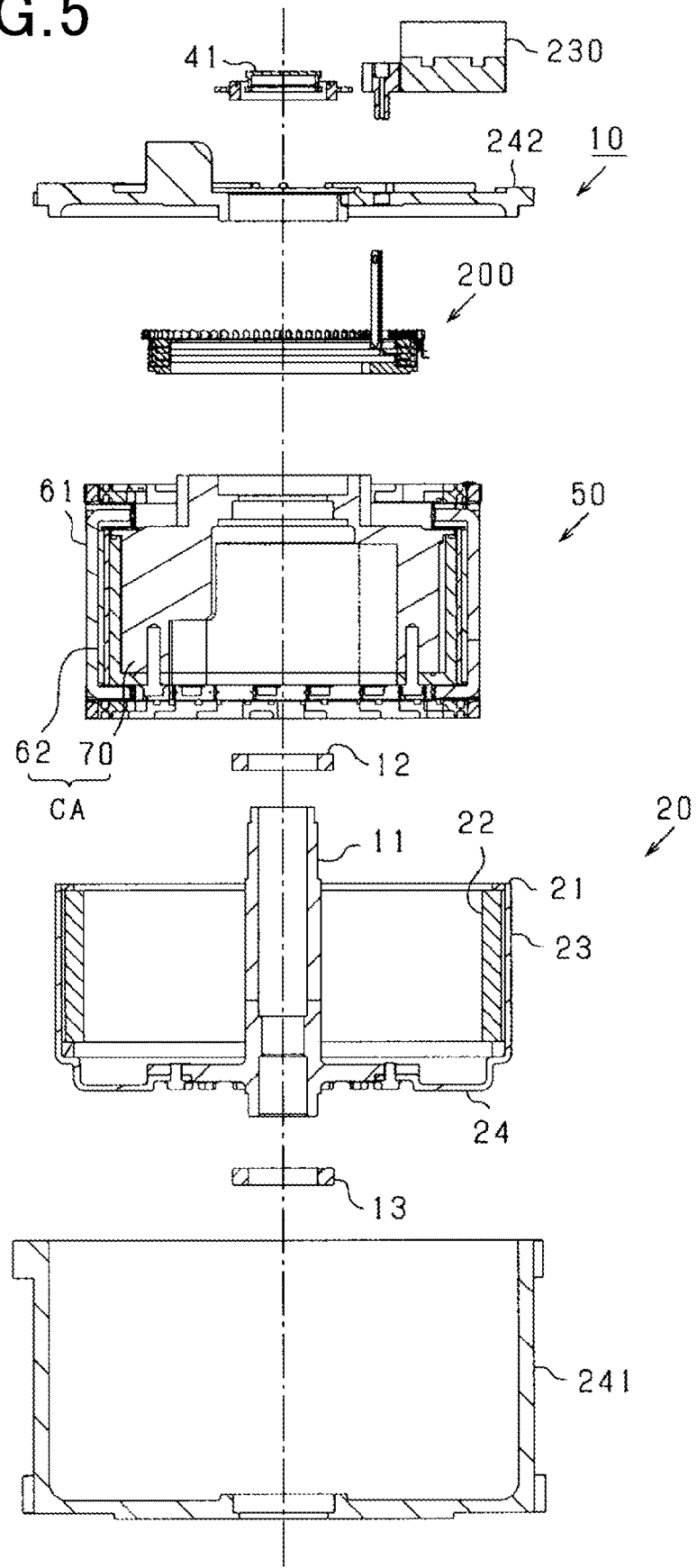
FIG. 5 is an exploded cross-sectional view of the rotating electric machine.

A rotating electric machine 10 according to a present embodiment is a synchronous-type multiphase alternating-current motor and has an outer-rotor structure (outer-revolution structure). An overview of the rotating electric machine 10 is shown in FIG. 1 to FIG. 5. FIG. 1 is a perspective view of the overall rotating electric machine 10. FIG. 2 is a plan view of the rotating electric machine 10. FIG. 3 is a longitudinal cross-sectional view (cross-sectional view taken along line 3-3 in FIG. 2) of the rotating electric machine 10. FIG. 4 is a lateral cross-sectional view (cross-sectional view taken along line 4-4 in FIG. 3) of the rotating electric machine 10. FIG. 5 is an exploded cross-sectional view in which constituent elements of the rotating electric machine 10 are shown in an exploded manner. In the description below, in the rotating electric machine 10, a direction in which the rotation shaft 11 extends is an axial direction. A direction that radially extends from a center of the rotation shaft 11 is a radial direction. A direction that circumferentially extends with the rotation shaft 11 as a center is a circumferential direction.

The rotating electric machine 10 generally includes a rotating-electric-machine main body that has a rotor 20, a stator unit 50, and a bus bar module 200, and a housing 241 and a housing cover 242 that are provided so as to surround the rotating-electric-machine main body. The rotating electric machine 10 is configured by all of these components being arranged coaxially with the rotation shaft 11 that is provided integrally with the rotor 20, and assembled in the axial direction in a predetermined order. The rotation shaft 11 is supported by a pair of bearings 12 and 13 that are respectively provided in the stator unit 50 and the housing 241, and is rotatable in this state. Here, for example, the bearings 12 and 13 may be radial ball bearings that have an inner ring, an outer ring, and a plurality of balls that are arranged therebetween. For example, an axle of the vehicle may rotate as a result of rotation of the rotation shaft 11. The rotating electric machine 10 can be mounted in the vehicle by the housing 241 being fixed to a vehicle body frame or the like.

In the rotating electric machine 10, the stator unit 50 is provided so as to surround the rotation shaft 11. The rotor 20 is arranged on an outer side in the radial direction of the stator unit 50. The stator unit 50 includes a stator 60 and a stator holder 70 that is assembled on an inner side in the radial direction of the stator 60. The rotor 20 and the stator 60 are arranged so as to oppose each other in the radial direction with an airgap therebetween. As a result of the rotor 20 integrally rotating with the rotation shaft 11, the rotor 20 rotates on an outer side in the radial direction of the stator 60. The rotor 20 corresponds to a "field element." The stator 60 corresponds to an "armature."

Figure 6:
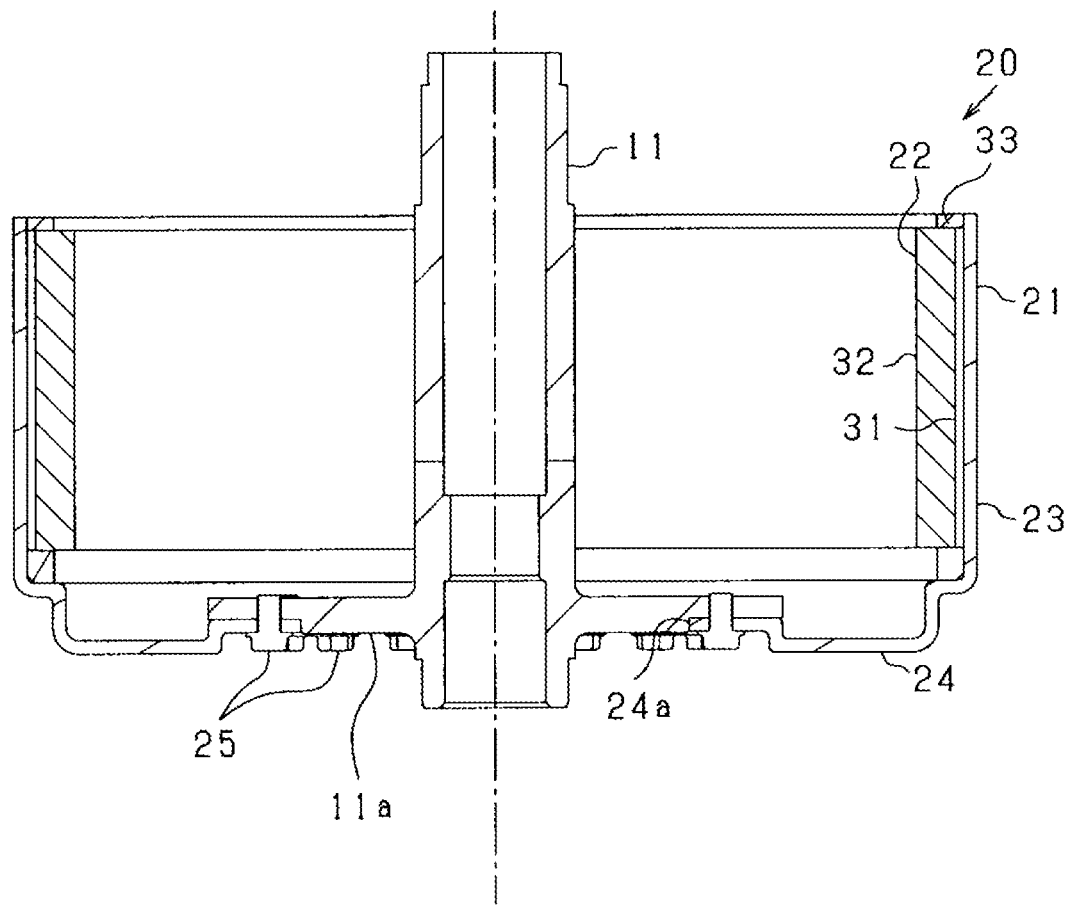
FIG. 6 is a cross-sectional view of a rotor.

FIG. 6 is a longitudinal cross-sectional view of the rotor 20. As shown in FIG. 6, the rotor 20 includes a rotor carrier 21 that has a substantially circular cylindrical shape and an annular magnet unit 22 that is fixed to the rotor carrier 21. The rotor carrier 21 includes a cylindrical portion 23 that has a circular cylindrical shape and an end plate portion 24 that is provided on one end in the axial direction of the cylindrical portion 23. The rotor carrier 21 is configured by the cylindrical portion 23 and the end plate portion 24 being integrated. The rotor carrier 21 functions as a magnet holding member. The magnet unit 22 is fixed in an annular shape on an inner side in the radial direction of the cylindrical portion 23. A through hole 24a is formed in the end plate portion 24. In a state in which the rotation shaft 11 is inserted into the through hole 24a, the rotation shaft 11 is fixed to the end plate portion 24 by a fastener 25 such as a bolt. The rotation shaft 11 includes a flange 11a that extends in a direction that intersects (is orthogonal to) the axial direction. The rotor carrier 21 is fixed to the rotation shaft 11 in a state in which the flange 11a and the end plate portion 24 are surface-joined.

The magnet unit 22 includes a circular cylindrical magnet holder 31, a plurality of magnets 32 that are fixed to an inner circumferential surface of the magnet holder 31, and an end plate 33 that is fixed on a side opposite the end plate portion 24 of the rotor carrier 21, of both sides in the axial direction of the magnet 32. The magnet holder 31 has a length dimension that is same as that of the magnet 32 in the axial direction. The magnets 32 are provided so as to be surrounded by the magnet holder 31 from the outer side in the radial direction. In addition, the magnet holder 31 and the magnets 32 are fixed in a state in which one end side of both ends in the axial direction is in contact with the rotor carrier 21, and fixed in a state in which the other end side is in contact with the end plate 33. The magnet unit 22 corresponds to a "magnet portion."

Figure 7:
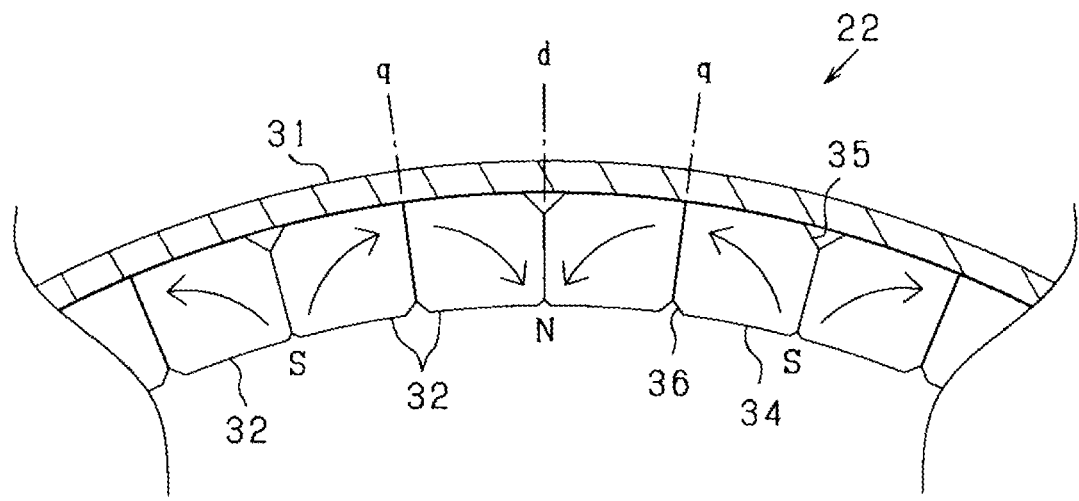
FIG. 7 is a partial lateral cross-sectional view of a cross-sectional structure of a magnet unit.

FIG. 7 is a partial lateral cross-sectional view of a cross-sectional structure of the magnet unit 22. In FIG. 7, an orientation of an easy axis of magnetization of the magnet 32 is indicated by an arrow.

In the magnet unit 22, the magnets 32 are provided in an array such that polarities alternately change along the circumferential direction of the rotor 20. As a result, the magnet unit has a plurality of magnetic poles in the circumferential direction. The magnet 32 is a polar-anisotropic permanent magnet and is configured by using a sintered neodymium magnet of which intrinsic coercive force is equal to or greater than 400 [kA/m], and remanent flux density Br is equal to or greater than 1.0 [T].

A circumferential surface on an inner side in the radial direction of the magnet 32 is a magnetic flux action surface 34 through which magnetic flux is received and transmitted. In the magnet 32, the orientation of the easy axis of magnetization differs between a d-axis side (a portion closer to the d-axis) and a q-axis side (a portion closer to the q-axis). On the d-axis side, the orientation of the easy axis of magnetization is an orientation that is parallel to the d-axis. On the q-axis side, the orientation of the easy axis of magnetization is an orientation that is orthogonal to the q-axis. In this case, a magnet magnetic path that has a circular arc shape is formed along the orientations of the easy axes of magnetization. In short, the magnets 32 are configured to be oriented such that, on the side of the d-axis that is a magnetic pole center, the orientation of the easy axis of magnetization is parallel to the d-axis compared to the side of the q-axis that is a magnetic pole boundary.

In the magnet 32, as a result of the magnet magnetic path being formed in a circular arc shape, a magnet magnetic path length is longer than a thickness dimension in the radial direction of the magnet 32. As a result, permeance of the magnet 32 increases and performance that is equivalent to a magnet that has a large amount of magnets can be exhibited with the same amount of magnets.

A single magnetic pole is configured with two magnets 32 that are adjacent to each other in the circumferential direction forming a set That is, the plurality of magnets 32 that are arrayed in the circumferential direction in the magnet unit 22 each have cut surfaces on the d-axis and the q-axis, and are arranged in a state in which the magnets 32 are in contact or in proximity with each other. As described above, the magnet 32 has the magnet magnetic path that has a circular arc shape. On the q-axis, an N pole and an S pole of the magnets 32 that are adjacent to each other in the circumferential direction face each other. Therefore, improvement in permeance near the q-axis can be achieved. In addition, the magnets 32 on both sides sandwiching the q-axis attract each other. Therefore, the magnets 32 can maintain the state of contact therebetween. Consequently, this also contributes to improvement in permeance.

Figure 8:
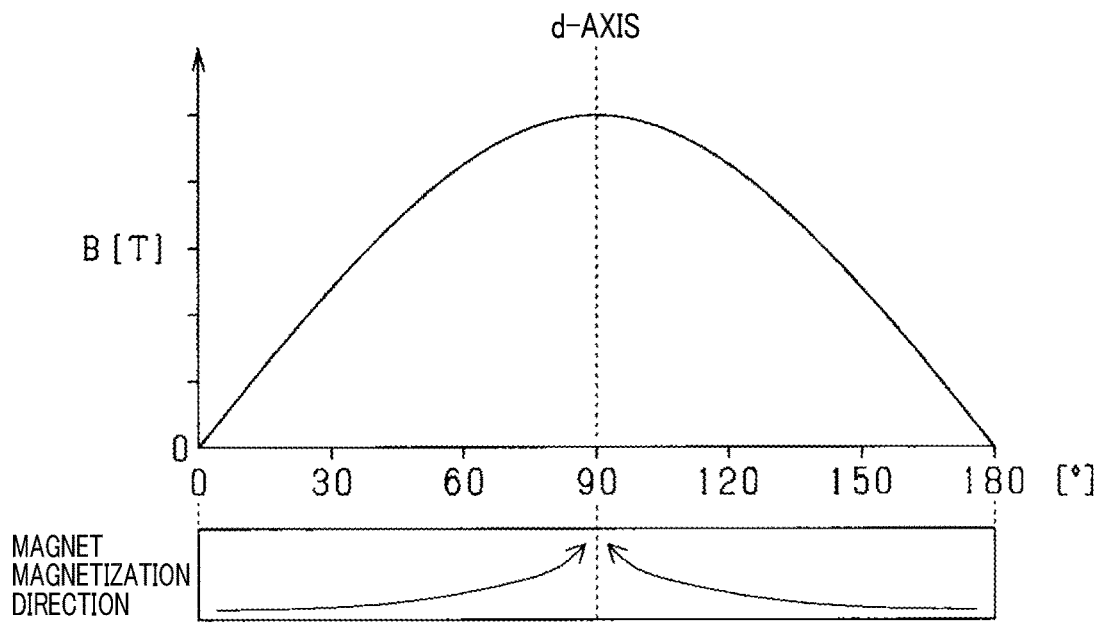
FIG. 8 is a diagram illustrating a relationship between electrical angle and magnetic flux density in a magnet according to an embodiment.

In the magnet unit 22, as a result of the magnets 32, magnetic flux flows between adjacent N and S poles in a circular arc shape. Therefore, for example, the magnet magnetic path may be longer compared to that of a radial anisotropic magnet. Therefore, as shown in FIG. 8, a magnetic flux density distribution is close to a sine wave. As a result, unlike the magnetic flux density distribution of the radial anisotropic magnet shown as a comparative example in FIG. 9, the magnetic flux can be concentrated towards a center side of the magnetic pole. Torque of the rotating electric machine 10 can be increased. In addition, in the magnet unit 22 according to the present embodiment, even compared to a conventional magnet that has a Halbach array, a difference in the magnetic flux density distribution is confirmed. Here, in FIG. 8 and FIG. 9, a horizontal axis indicates electrical angle and a vertical axis indicates magnetic flux density. In addition, in FIG. 8 and FIG. 9, 90° on the horizontal axis indicates the d-axis (that is, the magnetic pole center), and 0° and 180° on the horizontal axis indicate the q-axis.

That is, as a result of the magnets 32 configured as described above, in the magnet unit 22, the magnet magnetic flux on the d-axis is strengthened and changes in the magnetic flux at locations near the q-axis are suppressed. As a result, the magnet unit 22 of which changes in surface magnetic flux from the q-axis to the d-axis are gradual at each magnetic pole can be suitably actualized.

For example, a sine-wave matching rate of the magnetic flux density distribution may be a value that is equal to or greater than 40%. As a result, compared to a case in which a radial orientation magnet or a parallel orientation magnet of which the sine-wave matching rate is about 30% is used, an amount of magnetic flux in a waveform center portion can be improved with certainty. In addition, when the sine-wave matching rate is equal to or greater than 60%, the amount of magnetic flux in the waveform center portion can be improved with certainty compared to that of a magnetic flux concentration array such as the Halbach array.

Figure 9:
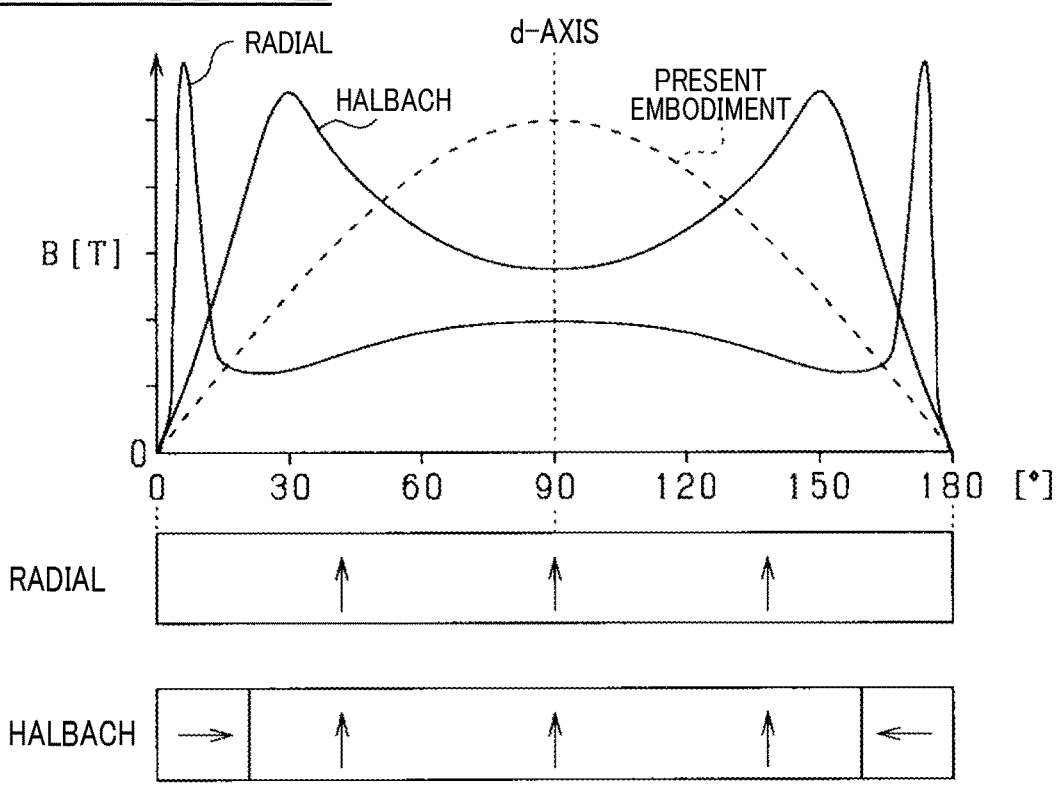
FIG. 9 is a diagram illustrating a relationship between electrical angle and magnetic flux density in a magnet of a comparative example.

In the radial anisotropic magnet shown in FIG. 9, the magnetic flux density near the q-axis sharply changes. As the change in magnetic flux density becomes sharper, eddy currents increase in a stator winding 62 of the stator 60, described hereafter. In addition, the change in magnetic flux on the stator winding 61 side also becomes sharp. In this regard, according to the present embodiment, the magnetic flux density distribution is a magnetic flux waveform that is close to a sine wave. Therefore, near the q-axis, the change in the magnetic flux density is smaller than the change in the magnetic flux density in the radial anisotropic magnet. As a result, the generation of eddy currents can be suppressed.

In the magnet 32, a recess portion 35 is formed over a predetermined area including the d-axis on an outer circumferential surface on the outer side in the radial direction. In addition, a recess portion 36 is formed over a predetermined area including the q-axis on an inner circumferential surface on the inner side in the radial direction. In this case, based on the orientation of the easy axis of magnetization of the magnet 32, the magnet magnetic path becomes shorter near the d-axis on the outer circumferential surface of the magnet 32 and the magnet magnetic path becomes shorter near the q-axis on the inner circumferential surface of the magnet 32. Therefore, taking into consideration difficulty in generating sufficient magnet magnetic flux in a location in which the magnet magnetic path length is short in the magnet 32, a magnet is eliminated in a location that has weak magnet magnetic flux.

Here, in the magnet unit 22, the same number of magnets 32 as the magnetic poles may be used. For example, the magnets 32 may be provided such that the magnets 32 between d-axes that are centers of the magnet poles in two magnetic poles that are adjacent to each other in the circumferential direction are provided as a single magnet. In this case, the magnet 32 is configured such that a center of each magnet in the circumferential direction is the q-axis and the cut surface is provided on the d-axis. In addition, rather than the configuration in which the center in the circumferential direction is the q-axis, the magnet 32 may be configured such that the center in the circumferential direction is the d-axis. As the magnet 32, instead of a configuration in which twice the number of magnets as the number of magnetic poles or the same number of magnets as the number of magnetic poles are used, a configuration in which a circular annular magnet that is connected in a circular annular shape is used is also possible.

As shown in FIG. 3, a resolver 41 that serves as a rotation sensor is provided on an end portion (an end portion on an upper side in the drawing) on a side opposite a joining portion with the rotor carrier 21, of both sides in the axial direction of the rotation shaft 11. The resolver 41 includes a resolver rotor that is fixed to the rotation shaft 11, and a resolver stator that is arranged in an opposing manner on the outer side in the radial direction of the resolver rotor. The resolver rotor has a circular-disk ring shape and is provided coaxially with the rotation shaft 11 in a state in which the rotation shaft 11 is inserted therein. The resolver stator has a stator core and a stator coil, and is fixed to the housing cover 242.

Figure 10:
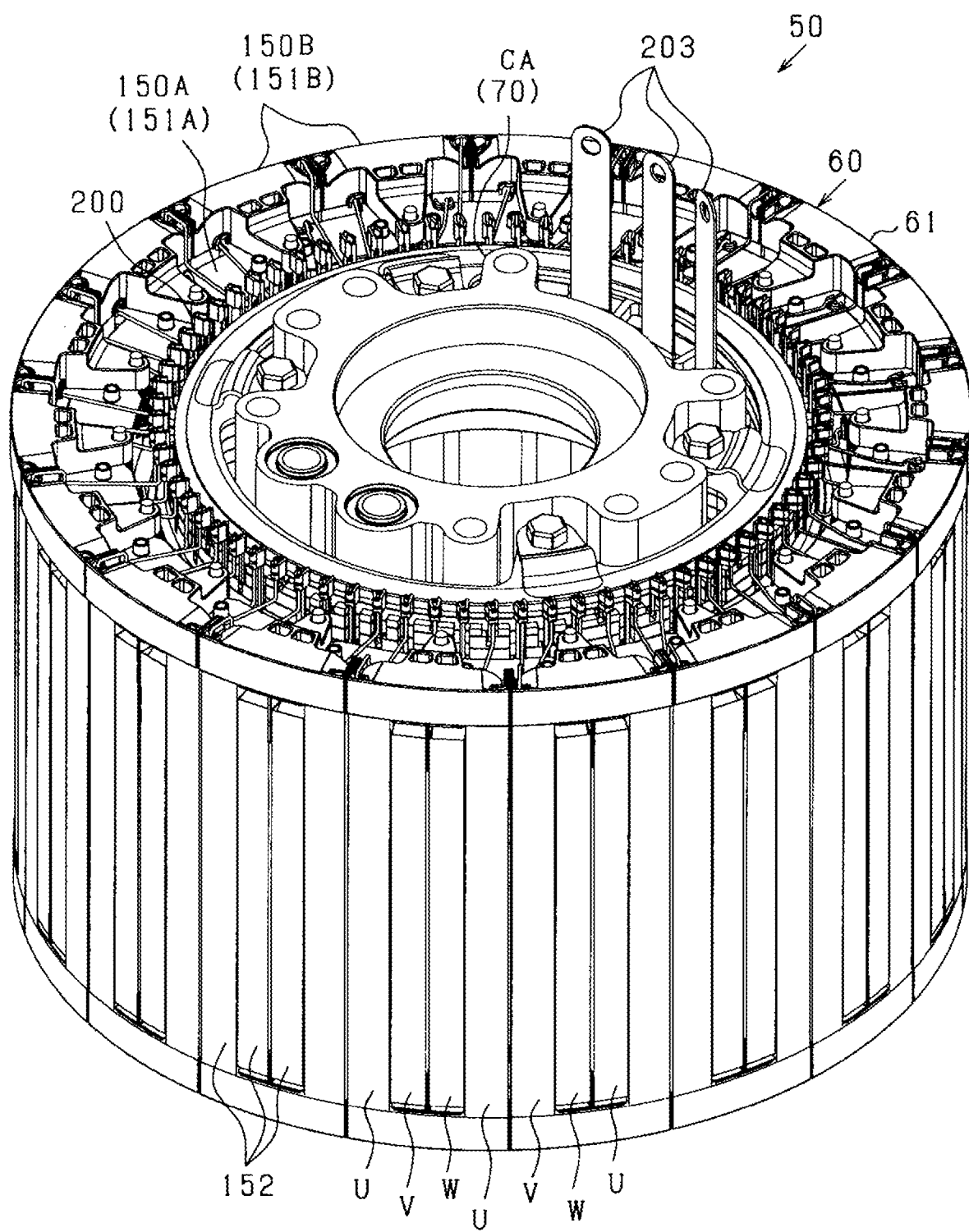
FIG. 10 is a perspective view of a stator unit.
Figure 11:
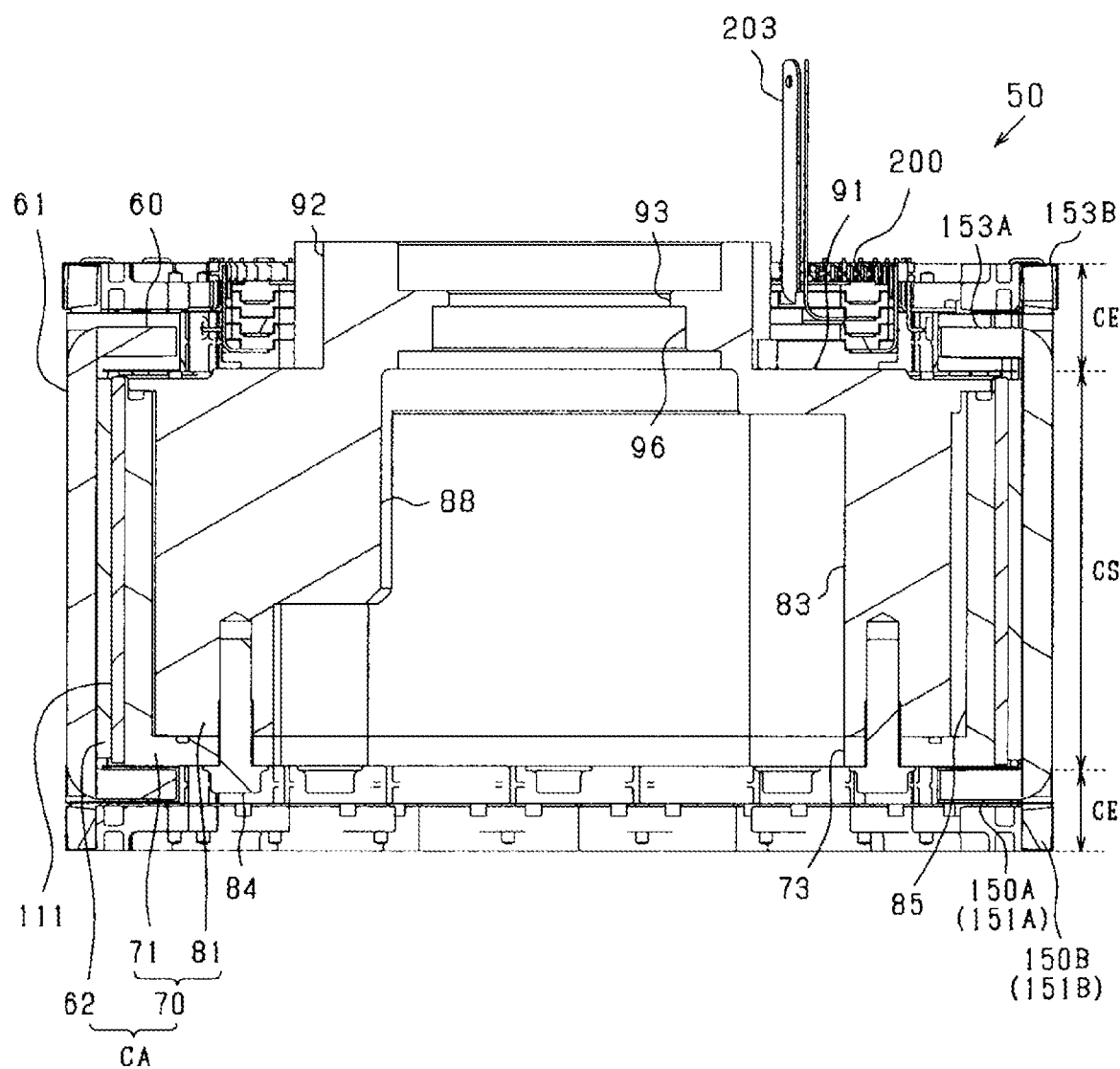
FIG. 11 is a longitudinal cross-sectional view of the stator unit.

Next, a configuration of the stator unit 50 will be described. FIG. 10 is a perspective view of the stator unit 50. FIG. 11 is a longitudinal cross-sectional view of the stator unit 50. Here, FIG. 11 is a longitudinal cross-sectional view in the same position as that in FIG. 3.

As an overview, the stator unit 50 includes the stator 60 and the stator holder 70 that is on the inner side in the radial direction of the stator 60. In addition, the stator 60 includes the stator winding 61 and a stator core 62. Furthermore, the stator core 62 and the stator holder 70 are integrated and provided as a core assembly CA. A plurality of partial windings 151 that configure the stator winding 61 are assembled to the core assembly CA. Here, the stator winding 61 corresponds to an "armature winding." The stator core 62 corresponds to an "armature core." The stator holder 70 corresponds to an "armature holding member." In addition, the core assembly CA corresponds to a "supporting member."

Figure 12:
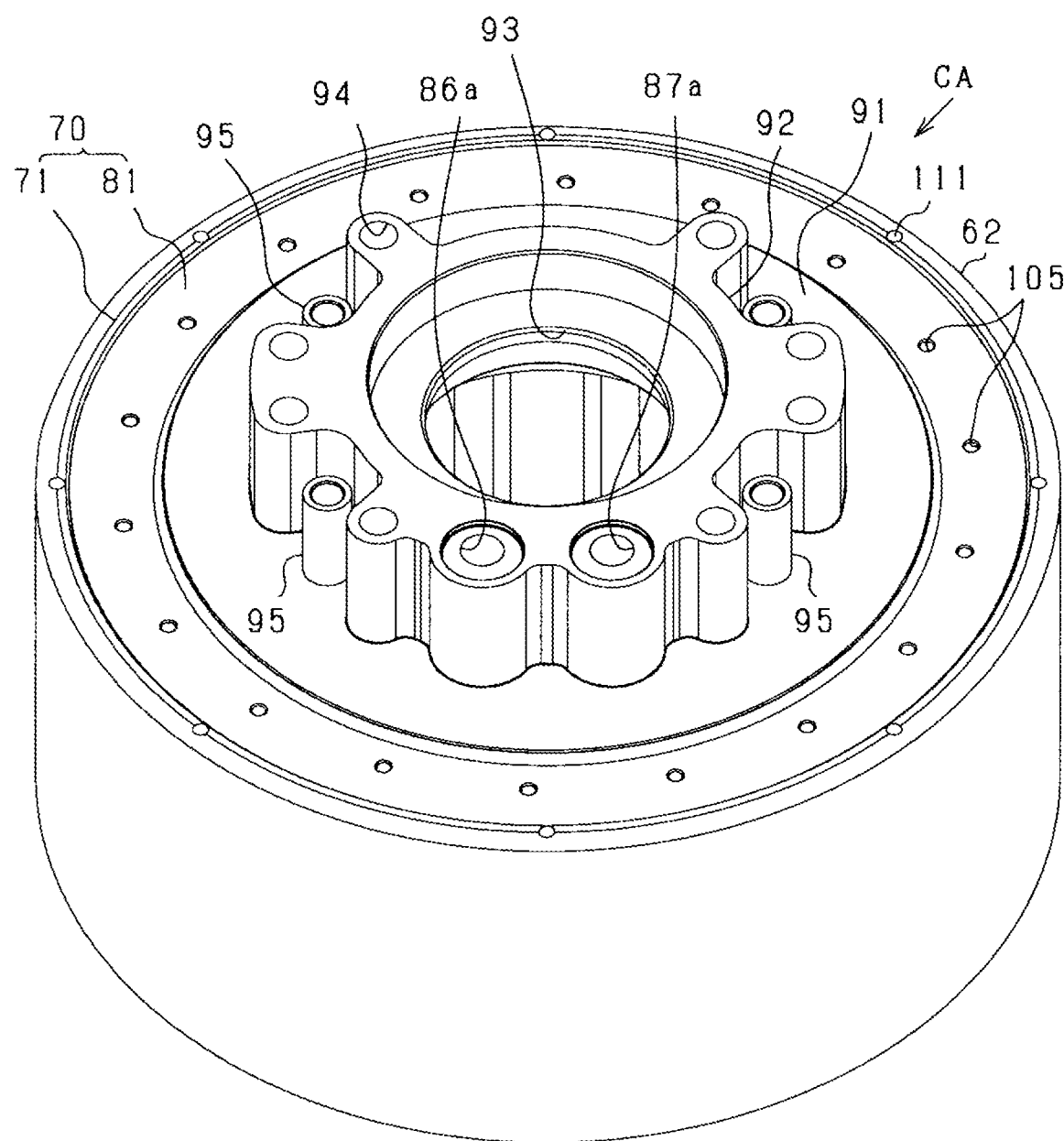
FIG. 12 is a perspective view of a core assembly viewed from one side in an axial direction.
Figure 13:
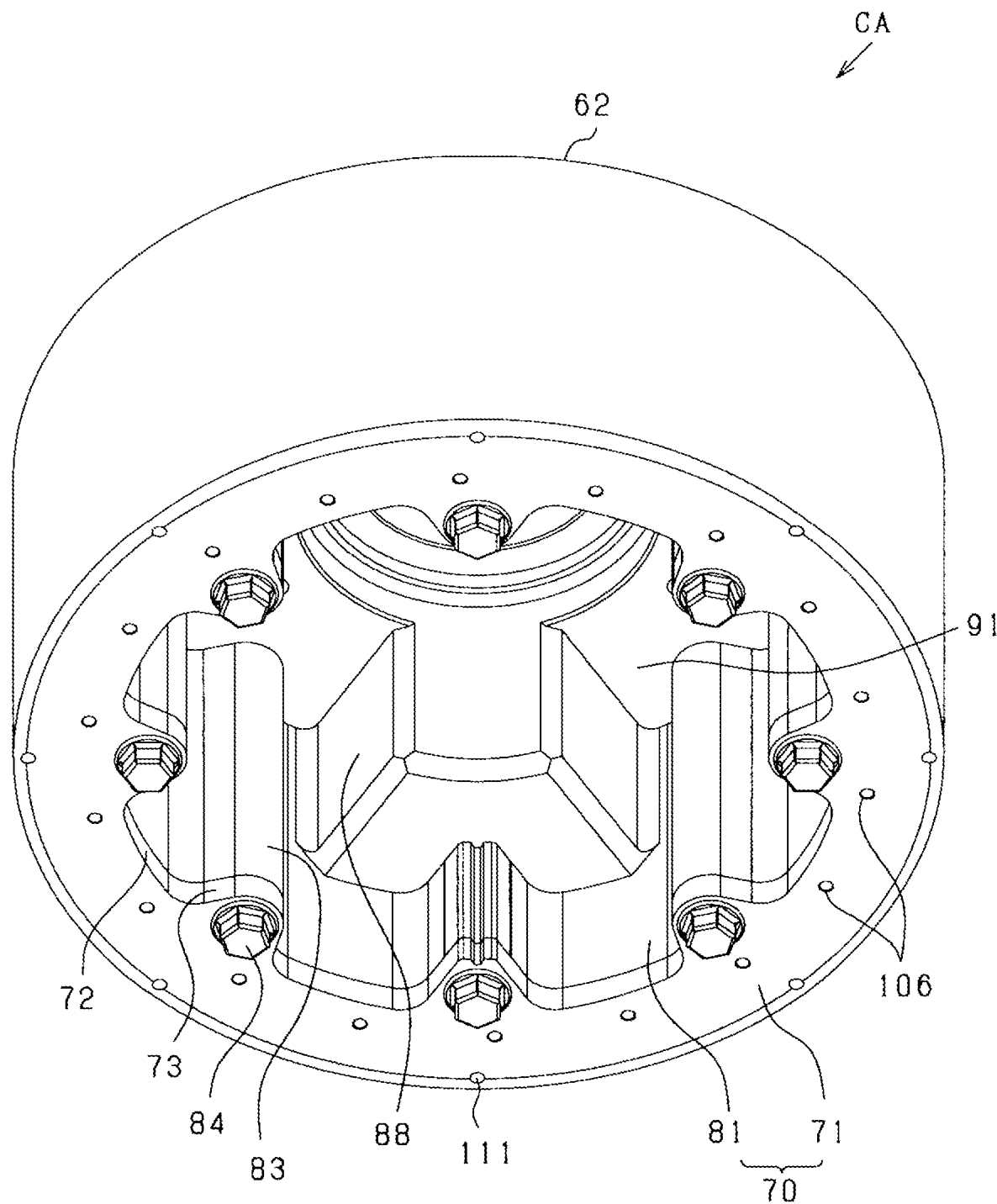
FIG. 13 is a perspective view of the core assembly viewed from the other side in the axial direction.
Figure 14:
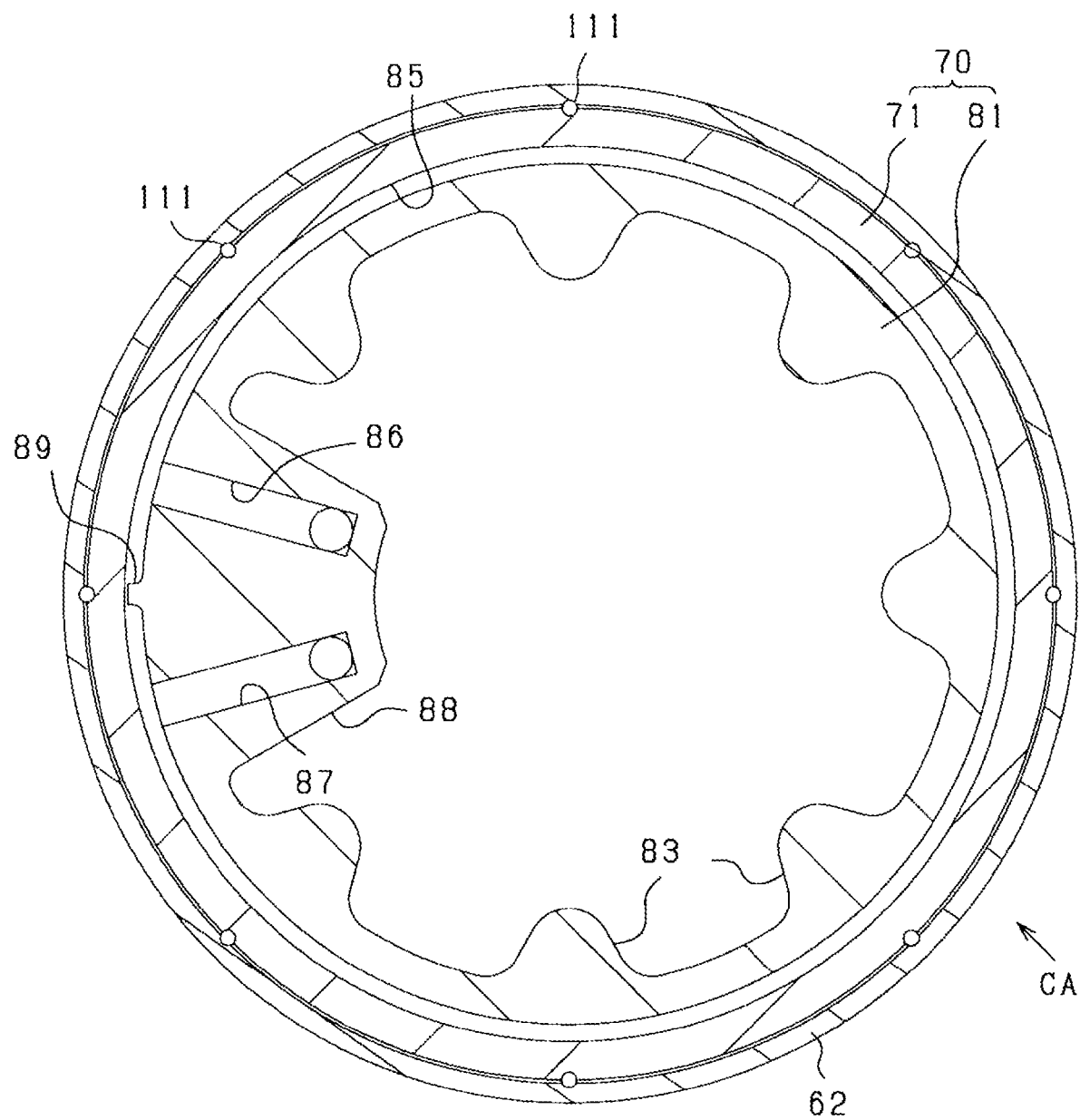
FIG. 14 is a lateral cross-sectional view of the core assembly.
Figure 15:
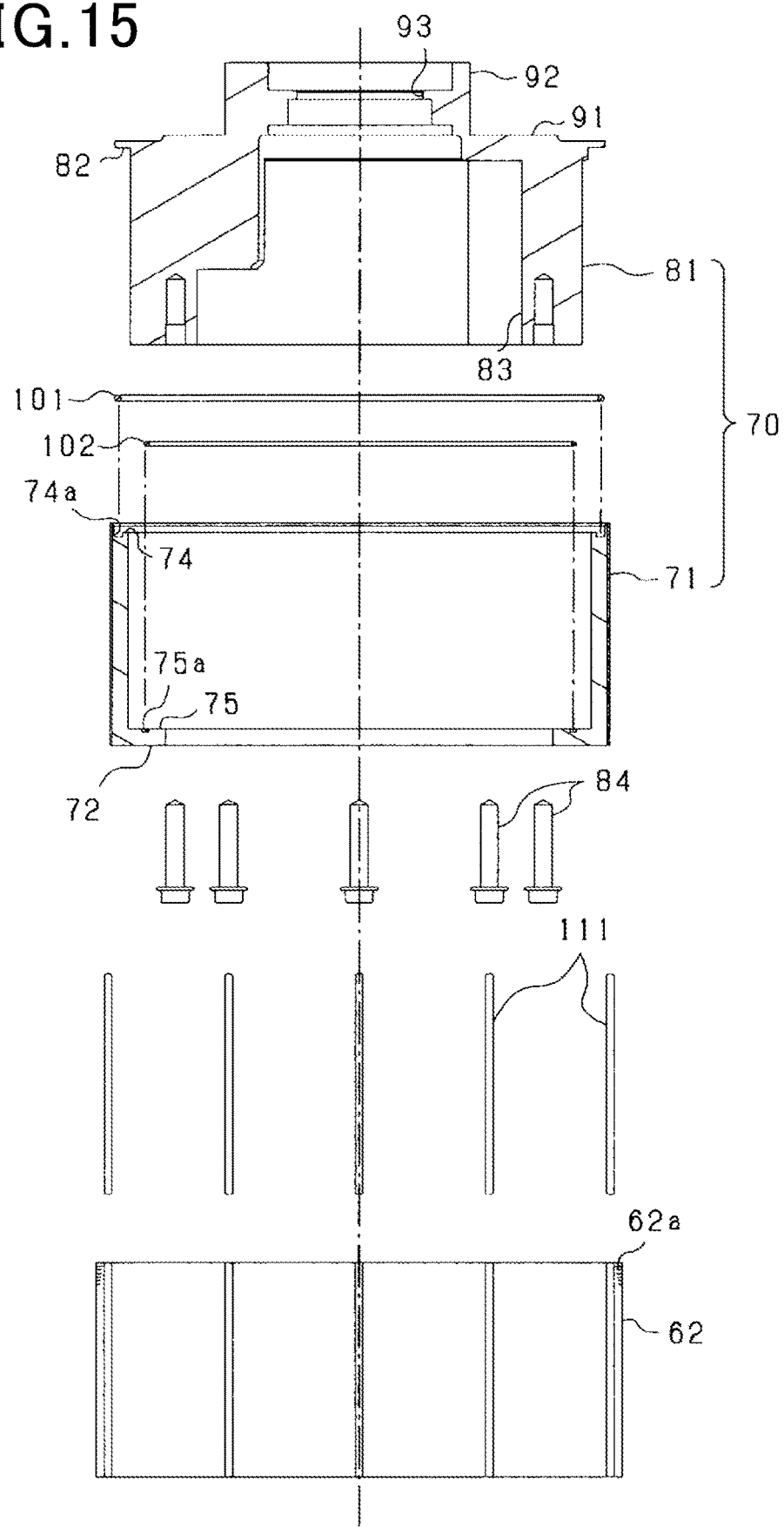
FIG. 15 is an exploded cross-sectional view of the core assembly.

Here, first, the core assembly CA will be described. FIG. 12 is a perspective view of the core assembly CA viewed from one side in the axial direction. FIG. 13 is a perspective view of the core assembly CA viewed from the other side in the axial direction. FIG. 14 is a lateral cross-sectional view of the core assembly CA. FIG. 15 is an exploded cross-sectional view of the core assembly CA.

As described above, the core assembly CA includes the stator core 62 and the stator holder 70 that is assembled on the inner side in the radial direction of the stator core 62. In a way, the core assembly CA is configured by the stator core 62 being integrally assembled to an outer circumferential surface of the stator holder 70.

The stator core 62 is configured as a core-sheet lamination body in which core sheets 62a that are made of electromagnetic steel sheets that are magnetic bodies are laminated in the axial direction. The stator core 62 is formed into a circular cylindrical shape that has a predetermined thickness in the radial direction. The stator winding 61 is assembled on the outer side in the radial direction that is the rotor 20 side of the stator core 62. An outer circumferential surface of the stator core 62 is formed into a curved surface with no unevenness. The stator core 62 functions as a back yoke. For example, the stator core 62 may be configured by the plurality of core sheets 62a that are formed into a circular annular plate shape by punching being laminated in the axial direction. However, a stator core that has a helical core structure may also be used as the stator core 62. In the stator core 62 that has the helical core structure, a band-shaped core sheet is used. As a result of the core sheets being formed into an annular shape by winding and being laminated in the axial direction, the stator core 62 that has an overall circular cylindrical shape is configured.

In the present example, the stator 60 has a slot-less structure in which teeth for forming slots are not provided. This structure may be configured by using any of (A) to (C), below.

(A) In the stator 60, a conductor-to-conductor member is provided between conductor portions (intermediate conductor portions 152, described hereafter) in the circumferential direction, and when a width dimension in the circumferential direction of the conductor-to-conductor member in a single magnetic pole is Wt, a saturation magnetic density of the conductor-to-conductor member is Bs, a width dimension in the circumferential direction of the magnet 32 in a single magnetic pole is Wm, and a residual magnetic flux density of the magnet 32 is Br, a magnetic material in which a relationship Wt×Bs≤Wm×Br is satisfied is used as the conductor-to-conductor member.

(B) In the stator 60, the conductor-to-conductor member is provided between the conductor portions (intermediate conductor portions 152) in the circumferential direction, and a non-magnetic material is used as the conductor-to-conductor member.

(C) In the stator 60, the conductor-to-conductor member is not provided between the conductor portions (intermediate conductor portions 152) in the circumferential direction.

In addition, as shown in FIG. 15, the stator holder 70 includes an outer cylindrical member 71 and an inner cylindrical member 81. The stator holder 70 is configured by the outer cylindrical member 71 being set on the outer side in the radial direction, the inner cylindrical member 81 being set on the inner side in the radial direction, and the outer cylindrical member 71 and the inner cylindrical member 81 being integrally assembled. For example, the members 71 and 81 may be made of a metal such as aluminum or cast iron, or a carbon fiber-reinforced plastic (CFRP).

The outer cylindrical member 71 is a circular cylindrical member of which an outer circumferential surface and an inner circumferential surface are both curved surfaces of a perfectly circular shape. An annular flange 72 that extends towards the inner side in the radial direction is formed on one end side in the axial direction. A plurality of protruding portions 73 that extend towards the inner side in the radial direction are formed in the flange 72 at predetermined intervals in the circumferential direction (see FIG. 13). In addition, opposing surfaces 74 and 75 that oppose the inner cylindrical member 81 in the axial direction are respectively formed on one end side and the other end side in the axial direction in the outer cylindrical member 71. Annular grooves 74a and 75a that extend in an annular shape are formed in the opposing surfaces 74 and 75.

In addition, the inner cylindrical member 81 is a circular cylindrical member that has an outer diameter dimension that is smaller than an inner diameter dimension of the outer cylindrical member 71. An outer circumferential surface of the inner cylindrical member 81 is a curved surface of a perfectly circular shape that is concentric with the outer cylindrical member 71. An annular flange 82 that extends towards the outer side in the radial direction is formed on one end side in the axial direction in the inner cylindrical member 81. The inner cylindrical member 81 is assembled to the outer cylindrical member 71 in a state in which the inner cylindrical member 81 is in contact in the axial direction with the opposing surfaces 74 and 75 of the outer cylindrical member 71. As shown in FIG. 13, the outer cylindrical member 71 and the inner cylindrical member 81 are assembled to each other by a fastener 84 such as a bolt. Specifically, a plurality of protruding portions 83 that extend towards the inner side in the radial direction are formed at predetermined intervals in the circumferential direction on the inner circumferential side of the inner cylindrical member 81. In a state in which an end surface in the axial direction of the protruding portion 83 and the protruding portion 73 of the outer cylindrical member 71 overlap, the protruding portions 73 and 83 are fastened together by the fastener 84.

As shown in FIG. 14, in the state in which the outer cylindrical member 71 and the inner cylindrical member 81 are assembled to each other, an annular gap is formed between the inner circumferential surface of the outer cylindrical member 71 and the outer circumferential surface of the inner cylindrical member 81. This gap space serves as a coolant passage 85 through which a coolant such as cooling water flows. The coolant passage 85 is provided in an annular shape in the circumferential direction of the stator holder 70. More specifically, in the inner cylindrical member 81, a passage forming portion 88 that protrudes towards the inner side in the radial direction, and inside which an inlet-side passage 86 and an outlet-side passage 87 are formed, is provided on the inner circumferential side thereof. The passages 86 and 87 are open on the outer circumferential surface of the inner cylindrical member 81. In addition, on the outer circumferential surface of the inner cylindrical member 81, a partitioning portion 89 for partitioning the coolant passage 85 into an inlet side and an outlet side is provided. As a result, the coolant that flows in from the inlet-side passage 86 flows through the coolant passage 85 in the circumferential direction and subsequently flows out from the outlet-side passage 87.

The inlet-side passage 86 and the outlet-side passage 87 are such that one end side extends in the radial direction and opens on the outer circumferential surface of the inner cylindrical member 81 and the other end side extends in the axial direction and opens on an end surface in the axial direction of the inner cylindrical member 81. FIG. 83 shows an inlet opening 86a that is connected to the inlet-side passage 86 and an outlet opening 87a that is connected to the outlet-side passage 87. Here, the inlet-side passage 86 and the outlet-side passage 87 are connected to an inlet port 244 and an outlet port 245 (see FIG. 1) that are attached to the housing cover 242. The coolant enters and exits through the ports 244 and 245.

In a joining portion of the outer cylindrical member 71 and the inner cylindrical member 81, sealing members 101 and 102 for suppressing leakage of the coolant in the coolant passage 85 are provided (see FIG. 15). Specifically, for example, the sealing members 101 and 102 may be O-rings. The sealing members 101 and 102 are provided in a state in which the sealing members 101 and 102 are housed in the annular grooves 74a and 75a of the outer cylindrical member 71, and compressed by the outer cylindrical member 71 and the inner cylindrical member 81.

In addition, as shown in FIG. 12, the inner cylindrical member 81 has an end plate portion 91 on one end side in the axial direction. A boss portion 92 that has a hollow cylindrical shape and extends in the axial direction is provided in the end plate portion 91. The boss portion 92 is provided so as to surround an insertion hole 93 for insertion of the rotation shaft 11. A plurality of fastening portions 94 for fixing the housing cover 242 are provided in the boss portion 92. Furthermore, a plurality of column portions 95 that extend in the axial direction are provided in the end plate portion 91 on the outer side in the radial direction of the boss portion 92. The column portion 95 is a portion that serves as a fixing portion for fixing the bus bar module 200. Details thereof will be described hereafter. Moreover, the boss portion 92 serves as a bearing holding member that holds the bearing 12. The bearing 12 is fixed to a bearing fixing portion 96 that is provided in an inner circumferential portion of the boss portion 92 (see FIG. 3).

In addition, as shown in FIG. 12 and FIG. 13, recess portions 105 and 106 that are used to fix a plurality of coil modules 150, described hereafter, are formed in the outer cylindrical member 71 and the inner cylindrical member 81.

Specifically, as shown in FIG. 12, a plurality of recess portions 105 are formed at even intervals in the circumferential direction on the end surface in the axial direction of the inner cylindrical member 81, or specifically, an end surface on the outer side in the axial direction of the end plate portion 91 that surrounds the boss portion 92. In addition, as shown in FIG. 13, a plurality of recess portions 106 are formed at even intervals in the circumferential direction on an end surface in the axial direction of the outer cylindrical member 71, or specifically, an end surface on the outer side in the axial direction of the flange 72. These recess portions 105 and 106 are provided so as to be arrayed on a virtual circle that is concentric with the core assembly CA. The recess portions 105 and 106 are each provided in the same position in the circumferential direction. Intervals and quantities of the recess portions 105 and 106 are also the same.

Here, the stator core 62 is assembled in a state in which compressive force in the radial direction against the stator holder 70 is generated to ensure strength of assembly to the stator holder 70. Specifically, the stator core 62 is fitted and fixed to the stator holder 70 with a predetermined tightening margin by shrink-fitting or press-fitting. In this case, it can be said that the stator core 62 and the stator holder 70 are assembled in a state in which stress in the radial direction from either of the stator core 62 and the stator holder 70 to the other is generated. In addition, when torque is increased in the rotating electric machine 10, for example, increase in diameter of the stator 60 can be considered. In this case, tightening force of the stator core 62 is increased to strengthen coupling of the stator core 62 to the stator holder 70. However, when compression stress (in other words, residual stress) of the stator core 62 is increased, damage to the stator core 62 may occur.

Therefore, in the present example, the stator core 62 and the stator holder 70 are fitted and fixed to each other with a predetermined tightening margin. In this configuration, a regulating portion is provided in portions of the stator core 62 and the stator holder 70 that oppose each other in the radial direction. The regulating portion regulates displacement in the circumferential direction of the stator core 62 by engagement in the circumferential direction. That is, as shown in FIG. 12 to FIG. 14, a plurality of engaging members 111 that serve as the regulating portion are provided at predetermined intervals in the circumferential direction between the stator core 62 and the outer cylindrical member 71 of the stator holder 70 in the radial direction. Positional misalignment in the circumferential direction between the stator core 62 and the stator holder 70 is suppressed by the engaging members 111. Here, in this case, a recess portion may be provided in at least either of the stator core 62 and the outer cylindrical member 71 and the engaging member 111 may be engaged in the recess portion. Instead of the engaging member 11, a protruding portion may be provided in either of the stator core 62 and the outer cylindrical member 71.

In the above-described configuration, in addition to the stator core 62 and the stator holder 70 (outer cylindrical member 71) being fitted and fixed with a predetermined tightening margin, the stator core 62 and the stator holder 70 are provided in a state in which mutual displacement in the circumferential direction is suppressed through regulation by the engaging member 111. Therefore, even if the tightening margin of the stator core 62 and the stator holder 70 are relatively small, displacement in the circumferential direction of the stator core 62 can be suppressed. In addition, because a desired displacement suppression effect can be achieved even when the tightening margin is relatively small, damage to the stator core 62 attributed to the tightening margin being excessively large can be suppressed. Consequently, displacement of the stator core 62 can be appropriately suppressed.

On the inner circumferential side of the inner cylindrical member 81, an annular interior space is formed so as to surround the rotation shaft 11. For example, an electrical component that configures an inverter that serves as a power converter may be arranged in the interior space. For example, the electrical component may be an electrical module in which a semiconductor switching element or a capacitor is packaged. As a result of the electrical module being arranged in a state in which the electrical module is in contact with the inner circumferential surface of the inner cylindrical member 81, cooling of the electrical module by the coolant that flows through the coolant passage 85 can be performed. Here, on the inner circumferential side of the inner cylindrical member 81, the plurality of protruding portions 83 may be eliminated or a protrusion height of the protruding portions 83 may be decreased. The interior space on the inner circumferential side of the inner cylindrical member 81 may thereby be expanded.

Next, a configuration of the stator winding 61 that is assembled to the core assembly CA will be described in detail. A state in which the stator winding 61 is assembled to the core assembly CA is as shown in FIG. 10 and FIG. 11. The stator winding 61 is assembled in a state in which a plurality of partial windings 151 that configure the stator winding 61 arrayed in the circumferential direction on the outer side in the radial direction of the core assembly CA, that is, the outer side in the radial direction of the stator core 62.

The stator winding 61 has a plurality of phase windings. The stator winding 61 is formed into a circular cylindrical shape (annular shape) by the phase windings of the phases being arranged in a predetermined order in the circumferential direction. According to the present embodiment, the stator winding 61 is configured to have phase windings of three phases through use of the phase windings of a U-phase, a V-phase, and a W-phase.

As shown in FIG. 11, the stator 60 has, in the axial direction, a portion that corresponds to a coil side CS that opposes the magnet unit 22 of the rotor 20 in the radial direction, and a portion that corresponds to a coil end CE that is on the outer side in the axial direction of the coil side CS. In this case, the stator core 62 is provided over an area that corresponds to the coil side CS in the axial direction.

Figure 16:
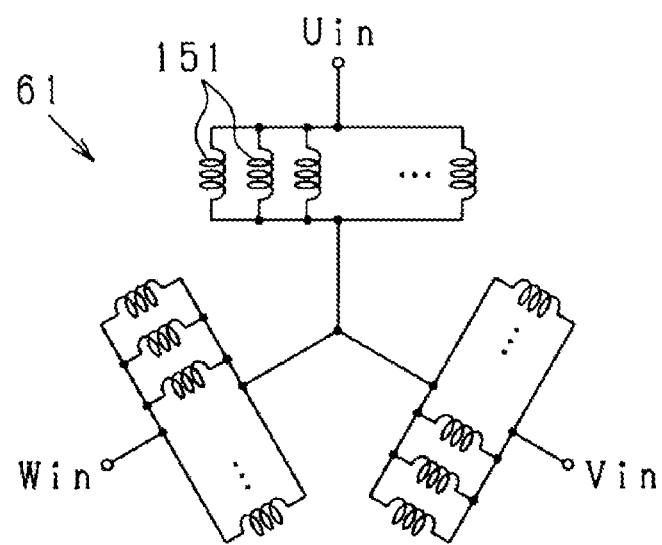
FIG. 16 is a circuit diagram illustrating a connection state of partial windings in phase windings of three phases.

In the stator winding 61, the phase winding of each phase has a plurality of partial windings 151 (see FIG. 16). The partial windings 151 are individually provided as coil modules 150. That is, the coil module 150 is configured by the partial winding 151 of the phase winding of each phase being integrally provided. The stator winding 61 is configured by a predetermined number of coil modules 150 that is based on the number of poles. The coil modules 150 (partial windings 151) of the phases are arranged so as to be arrayed in a predetermined order in the circumferential direction. As a result, conductor portions of the phases are arranged so as to be arrayed in a predetermined order in the coil side CS of the stator winding 61. FIG. 10 shows an order of array of the conductor portions of the U-phase, the V-phase, and the W-phase in the coil side CS. According to the present embodiment, the number of magnetic poles is twenty-four. However, this number is arbitrary.

In the stator winding 61, the phase winding of each phase is configured by the partial windings 151 of the coil modules 150 being connected in parallel or in series for each phase. FIG. 16 is a circuit diagram illustrating a connection state of the partial windings 151 of the phase windings of the three phases. FIG. 16 shows a state in which the partial windings 151 of the phase windings of the phases are connected in parallel.

As shown in FIG. 11, the coil module 150 is assembled on the outer side in the radial direction of the stator core 62. In this case, the coil module 150 is assembled in a state in which both end portions in the axial direction thereof protrude further towards the outer sides in the axial direction (that is, the coil end CE sides) than the stator core 62. That is, the stator winding 61 includes a portion that corresponds to the coil end CE that protrudes further towards the outer side in the axial direction than the stator core 62 and a portion that corresponds to the coil side CS further towards the inner side in the axial direction than the portion that corresponds to the coil end CE.

The coil module 150 has two types of shapes. One has a shape in which the partial winding 151 is bent towards the inner side in the radial direction, that is, towards the stator core 62 side in the coil end CE. The other has a shape in which the partial winding 151 is not bent towards the inner side in the radial direction, but rather, extends in a linear shape in the axial direction in the coil end CE. In the description below, for convenience, the partial winding 151 that has the bent shape on both end sides in the axial direction is also referred to as a "first partial winding 151A" and the coil module 150 that has the first partial winding 151A is also referred to as a "first coil module 150A." In addition, the partial winding 151 that does not have the bent shape on both end sides in the axial direction is also referred to as a "second partial winding 151B" and the coil module 150 that has the second partial winding 151B is also referred to as a "second coil module 150B."

Figure 17:
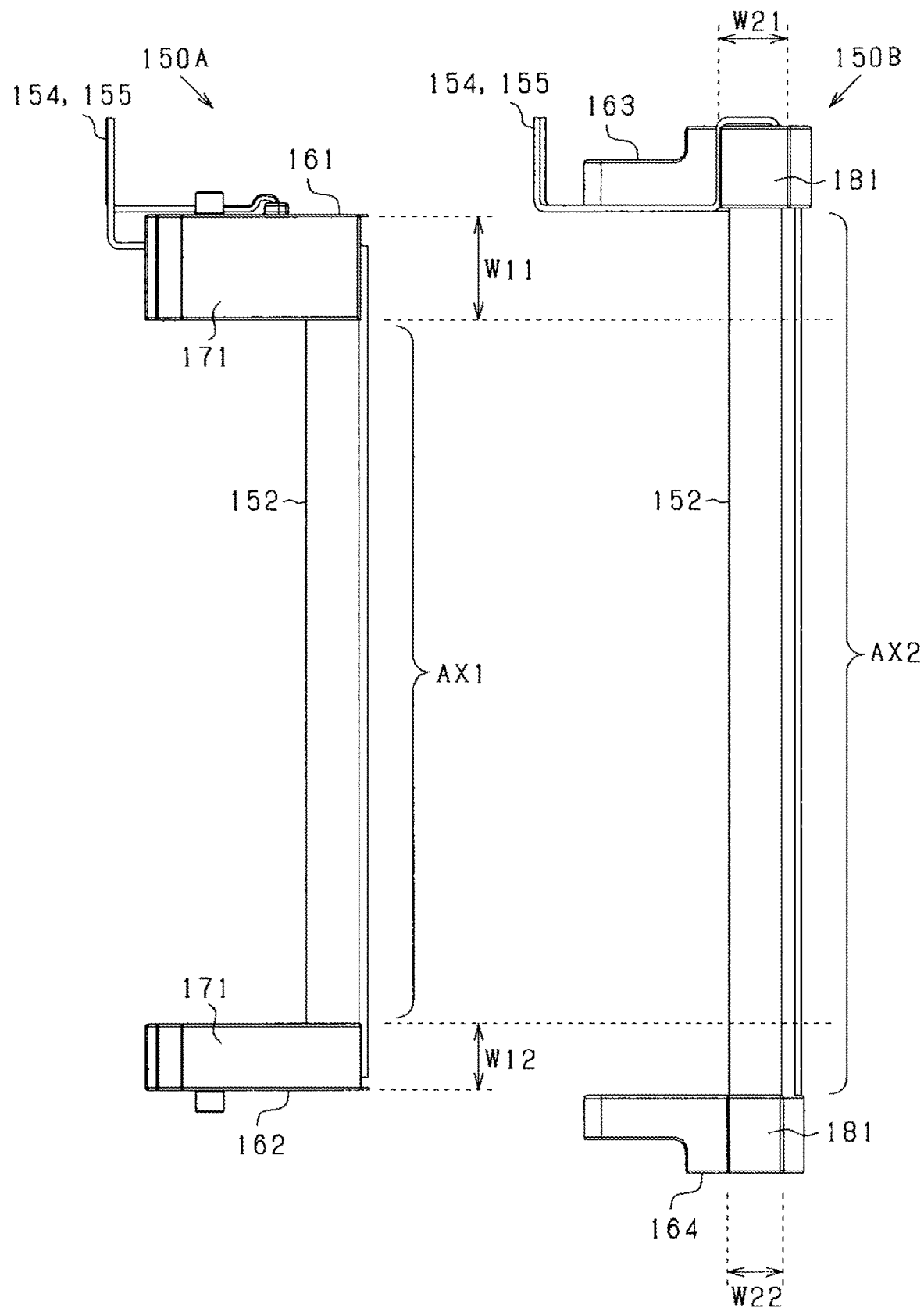
FIG. 17 is a side view in which a first coil module and a second coil module are arrayed side-by-side for comparison.
Figure 18:
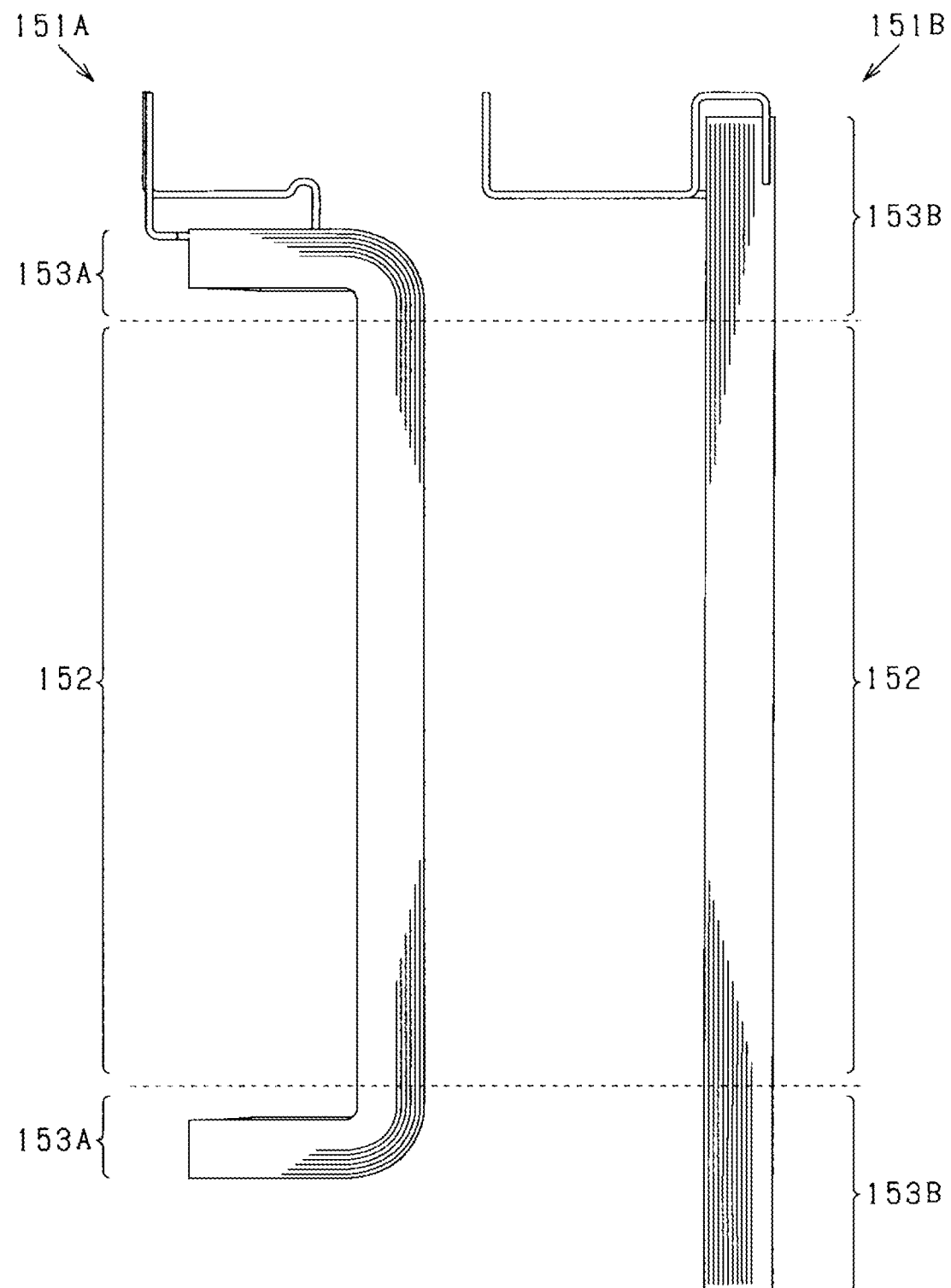
FIG. 18 is a side view in which a first partial winding and a second partial winding are arrayed side-by-side for comparison.

FIG. 17 is a side view in which the first coil module 150A and the second coil module 150B are arrayed side-by-side for comparison. FIG. 18 is a side view in which the first partial winding 151A and the second partial winding 151B are arrayed side-by-side for comparison. As shown in these drawings, in the coil modules 150A and 150B and the partial windings 151A and 151B, axial-direction lengths differ from each other, and end portion shapes on both sides in the axial direction differ from each other. The first partial winding 151A has a substantially C-like shape from a side view. The second partial winding 151B has a substantially I-like shape from a side view. Insulation covers 161 and 162 that serve as a "first insulation cover" are mounted on both sides in the axial direction of the first partial winding 151A. Insulation covers 163 and 164 that serve as a "second insulation cover" are mounted on both sides in the axial direction of the second partial winding 151B. Details thereof will be described hereafter.

Next, configurations of the coil modules 150A and 150B will be described in detail.

Figure 19A:
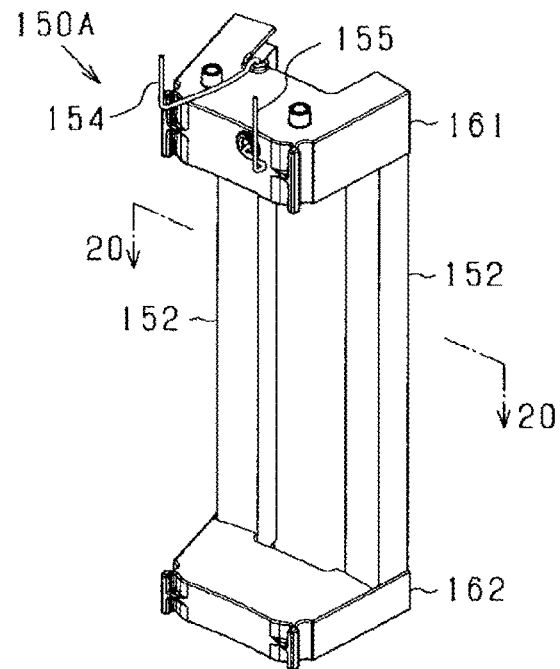
FIG. 19($a$) and FIG. 19($b$) are diagrams illustrating a configuration of the first coil module.

Here, first, the first coil module 150A of the coil modules 150A and 150B will be described. FIG. 19(*a*) is a perspective view of the configuration of the first coil module 150A. FIG. 19(*b*) is a perspective view in which constituent components of the first coil module 150A are exploded. In addition, FIG. 20 is a cross-sectional view taken along line 20-20 in FIG. 19(*a*).

As shown in FIG. 19(*a*) and FIG. 19(*b*), the first coil module 150A includes the first partial winding 151A that is configured by a conductor material CR being wound in multiple layers, and the insulation covers 161 and 162 that are attached to one end side and the other end side in the axial direction of the first partial winding 151A. The insulation covers 161 and 162 are molded by an insulating material such as synthetic resin.

The first partial winding 151A has a pair of intermediate conductor portions 152 that are provided parallel to each other and in a linear shape, and a pair of crossover portions 153A that respectively connect the pair of intermediate conductor portions 152 on both ends in the axial direction. The first partial winding 151A is formed into an annular shape by the pair of intermediate conductor portions 801 and the pair of crossover portions 153A. The pair of intermediate conductor portions 152 are provided so as to be separated by a predetermined coil pitch. The intermediate conductor portion 152 of the partial winding 151 of another phase can be arranged between the pair of intermediate conductor portions 152 in the circumferential direction. According to the present embodiment, the pair of intermediate conductor portions 152 are provided so as to be separated by two coil pitches. One intermediate conductor portion 152 each of the partial windings 151 of the other two phases is arranged between the pair of intermediate conductor portions 152.

The pair of crossover portions 153A have the same shape on both sides in the axial direction and are both provided as portions that correspond to the coil end CE (see FIG. 11). The crossover portion 153A is provided so as to be bent in a direction that is orthogonal to the intermediate conductor portion 152, that is, a direction that is orthogonal to the axial direction.

As shown in FIG. 18, the first partial winding 151A has the crossover portions 153A on both sides in the axial direction, and the second partial winding 151B has crossover portions 153B on both sides in the axial direction. Here, the crossover portions 153A and 153B of the partial windings 151A and 151B differ from each other in shape. To clarify this distinction, the crossover portion 153A of the first partial winding 151A is also referred to as a "first crossover portion 153A." The crossover portion 153B of the second partial winding 151B is also referred to as a "second crossover portion 153B."

In the partial windings 151A and 151B, the intermediate conductor portions 152 are provided as coil-side conductor portions that are arrayed one by one in the circumferential direction in the coil side CS. In addition, the crossover portions 153A and 153B are provided as coil-end conductor portions that connect the intermediate conductor portions 152 of the same phase that are in in two positions that differ in the circumferential direction in the col end CE.

As shown in FIG. 20, the first partial winding 151A is formed by the conductor material CR being wound in multiple layers such that a lateral cross-section of a conductor bundle portion is quadrangular. FIG. 20 shows a lateral cross-section of the intermediate conductor portion 152. The conductor material CR is wound in multiple layers so as to be arrayed in the circumferential direction and the radial direction in the intermediate conductor portion 152. That is, the first partial winding 151A is formed such that the lateral cross-section has a substantially rectangular shape by the conductor material CR being arrayed in a plurality of rows in the circumferential direction and arrayed in a plurality of rows in the radial direction in the intermediate conductor portion 152. Here, in a tip end portion of the first crossover portion 153A, the conductor material CR is wound in multiple layers so as to be arrayed in the axial direction and the radial direction as a result of being bent in the radial direction. According to the present embodiment, the first partial winding 151A is configured by the conductor material CR being wound by concentric winding. However, a manner of winding of the conductor material CR is arbitrary. Instead of concentric winding, the conductor material CR may be wound in multiple layers by alpha winding.

Figure 19B:
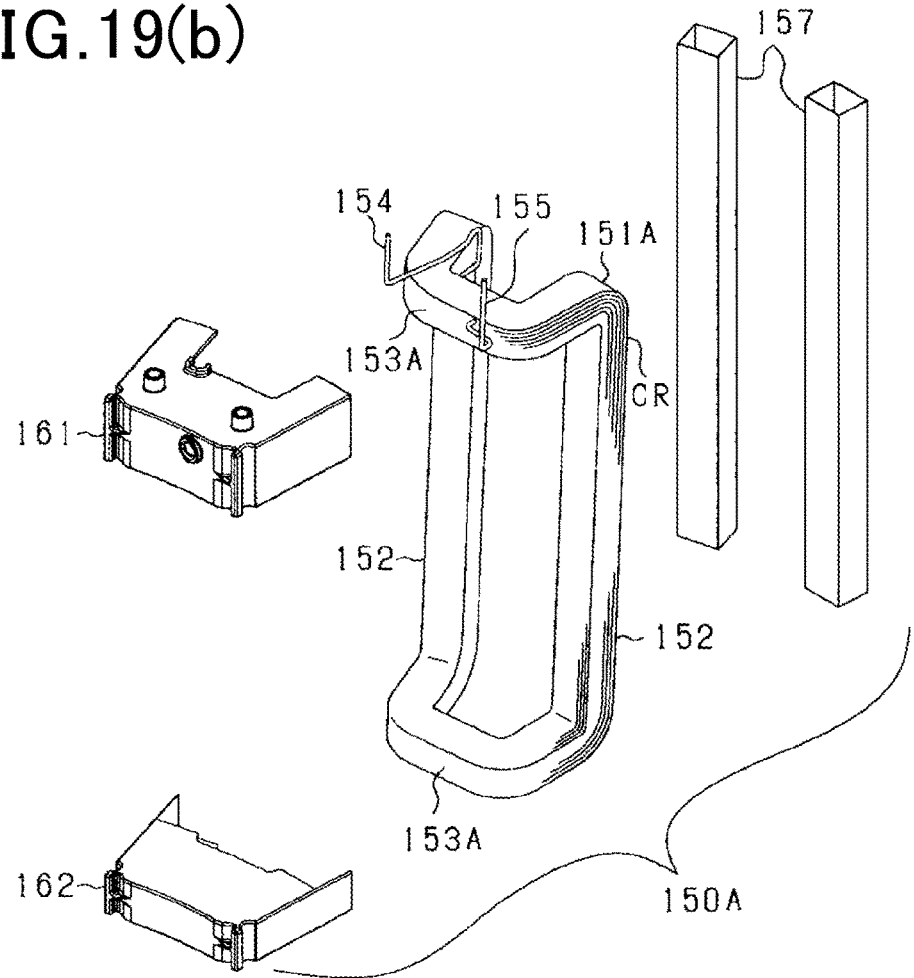
Figure 20:
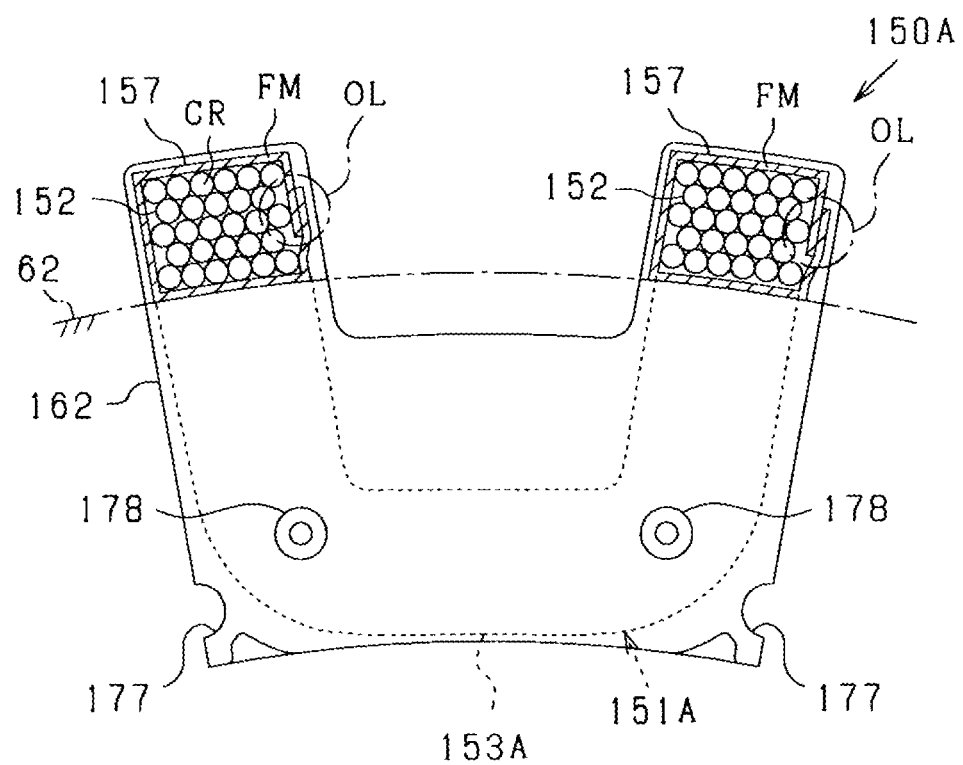
FIG. 20 is a cross-sectional view taken along line 20-20 in FIG. 19($a$)

In the first partial winding 151A, end portions of the conductor material CR are drawn out from one first crossover portion 153A (the first crossover portion 153A on an upper side in FIG. 19(b)), of the first crossover portions 153A on both sides in the axial direction, and the end portions serve as winding end portions 154 and 155. The winding end portions 154 and 155 are portions that are a winding start and a winding end of the conductor material CR. Either of the winding end portions 154 and 155 is connected to a current input/output terminal and the other is connected to a neutral point.

A sheet-like insulation covering body 157 is provided in the intermediate conductor portion 152 so as to cover the intermediate conductor portion 152 in the first partial winding 151A. Here, in FIG. 19(a), the first coil module 150A is shown in a state in which the insulation covering body 157 covers the intermediate conductor portion 152, and the intermediate conductor portion 152 is present on an inner side of the insulation covering body 157. However, for convenience, this portion is indicated as the intermediate conductor portion 152 (this similarly applies to FIG. 22(b), described hereafter).

The insulation covering body 157 uses a film material FM that has at least a length of an insulation covering area in the axial direction of the intermediate conductor portion 152 as an axial-direction dimension, and is provided by the film material FM being wound around the intermediate conductor portion 152. For example, the film material FM may be made of a polyethylene naphthalate (PEN) film. More specifically, the film material FM includes a film substrate and an adhesive layer that is provided on one of both surfaces of the film substrate and has foamability. In addition, the film member FM is wound around the intermediate conductor portion 152 in a state in which the film material FM is bonded by the adhesive layer. Here, a non-foaming adhesive layer can also be used as the adhesive layer.

As shown in FIG. 20, in the intermediate conductor portion 152, the lateral cross-section is formed into a substantially rectangular shape by the conductor material CR being arrayed in the circumferential direction and the radial direction. The insulation covering body 157 is provided by the film material FM covering a periphery of the intermediate conductor portion 152 such that the end portions thereof in the circumferential direction overlap. The film material FM is a rectangular sheet in which a vertical dimension is longer than the axial-direction length of the intermediate conductor portion 152 and a lateral dimension is longer than a length of a single lap around the intermediate conductor portion 152. The film material FM is wound around the intermediate conductor portion 152 in a state in which creases are formed to match the cross-sectional shape of the intermediate conductor portion 152. In the state in which the film FM is wound around the intermediate conductor portion 152, a gap between the conductor material CR of the intermediate conductor portion 152 and the film substrate is filled by the foaming of the adhesive layer. In addition, in an overlap portion OL of the film material FM, the end portions in the circumferential direction of the film material FM are bonded together by the adhesive layer.

In the intermediate conductor portion 152, the insulation covering body 157 is provided so as to cover two circumferential-direction side surfaces and two radial-direction side surfaces in their entirety. In this case, in the insulation covering body 157 that surrounds the intermediate conductor portion 152, the overlap portion OL in which the film member FM overlaps is provided in a portion that opposes the intermediate conductor portion 152 of the partial winding 151 of another phase, that is, one of the two circumferential-direction side surfaces of the intermediate conductor portion 152. According to the present embodiment, the overlap portions OL are provided on the same side in the circumferential direction in the pair of intermediate conductor portions 152.

In the first partial winding 151A, the insulation covering body 157 is provided over an area from the intermediate conductor portion 152 to portions that are covered by the insulation covers 161 and 162 (that is, portions on the inner side of the insulation covers 161 and 162) in the first crossover portions 153A on both sides in the axial direction. With reference to FIG. 17, an area AX1 in the first coil module 150A is a portion that is not covered by the insulation covers 161 and 162. The insulation covering body 157 is provided over an area that extends above and below the area AX1.

Next, a configuration of the insulation covers 161 and 162 will be described.

Figure 21A:
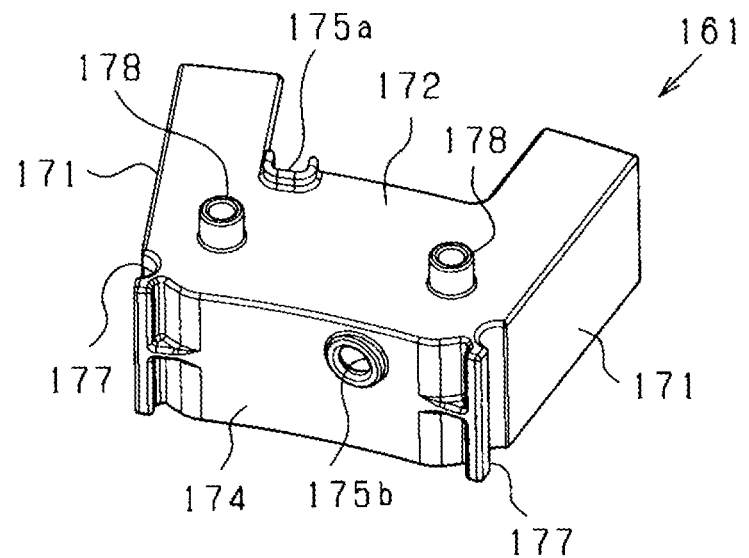
FIG. 21($a$) and FIG. 21($b$) are perspective views of a configuration of an insulation cover.
Figure 21B:
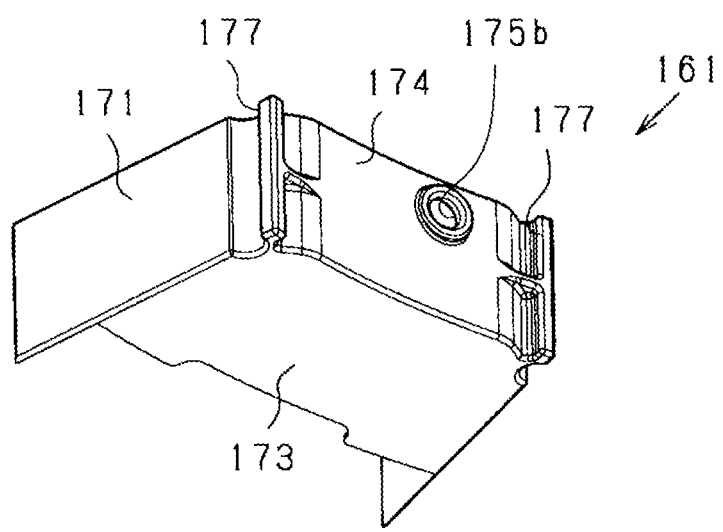

The insulation cover 161 is mounted in the first crossover portion 153A on one side in the axial direction of the first partial winding 151A. The insulation cover 162 is mounted in the first crossover portion 153A on the other side in the axial direction of the first partial winding 151A. FIG. 21(a) and FIG. 21(b) shows the configuration of the insulation cover 161, of the insulation covers 161 and 162. FIG. 21(a)

and FIG. 21(b) are perspective views of the insulation cover 161 viewed from two differing directions.

As shown in FIG. 21(a) and FIG. 21(b), the insulation cover 161 has a pair of side surface portions 171 that are side surfaces in the circumferential direction, an outer surface portion 172 on the outer side in the axial direction, an inner surface portion 173 on the inner side in the axial direction, and a front surface portion 174 on the inner side in the radial direction. These portions 171 to 174 are each formed into a plate shape and are connected to one another in a three-dimensional shape such that only the outer side in the radial direction is open. Each of the pair of side surface portions 171 is provided so as to be oriented to extend towards an axial center of the core assembly CA in a state of assembly to the core assembly CA. Therefore, in a state in which the plurality of first coil modules 150A are arranged in an array in the circumferential direction, the side surface portions 171 of the insulation covers 161 of the first coil modules 150A that are adjacent to each other oppose each other in a state of contact or proximity. As a result, a favorable annular arrangement can be achieved while mutual insulation is achieved between the first coil modules 150A that are adjacent in the circumferential direction.

In the insulation cover 161, an opening portion 175a for drawing out the winding end portion 154 of the first partial winding 151A is provided in the outer surface portion 172. An opening portion 175b for drawing out the winding end portion 155 of the first partial winding 151A is provided in the front surface portion 174. In this case, whereas one winding end portion 154 is drawn out from the outer surface portion 172 in the axial direction, the other winding end portion 155 is drawn out from the front surface portion 174 in the radial direction.

In addition, in the insulation cover 161, in the pair of side surface portions 171, recess portions 177 that have a semicircular shape and extend in the axial direction are provided in positions on both ends in the circumferential direction of the front surface portion 174, that is, positions at which the side surface portions 171 and the front surface portion 174 intersect. Furthermore, in the outer surface portion 172, a pair of protruding portions 178 that extend in the axial direction are provided in symmetrical positions on both sides in the circumferential direction with reference to a center line of the insulation cover 161 in the circumferential direction.

The description of the recess portion 177 of the insulation cover 161 will be supplemented. As shown in FIG. 20, the first crossover portion 153A of the first partial winding 151A forms a curved shape that protrudes towards the inner side in the radial direction, of the inner and outer sides in the radial direction, that is, towards the core assembly CA side. In this configuration, a gap that widens towards the tip end side of the first crossover portion 153A is formed between the first crossover portions 153A that are adjacent to each other in the circumferential direction. Therefore, according to the present embodiment, using the gap between the first crossover portions 153A that are arrayed in the circumferential direction, the recess portion 177 is provided in a position on the outer side of the curved portion of the first crossover portion 153A in the side surface portion 171 of the insulation cover 161.

Here, a temperature detecting unit (thermistor) may be provided in the first partial winding 151A. In this configuration, an opening for drawing out a signal line that extends from the temperature detecting unit may be provided in the insulation cover 161. In this case, the temperature detecting unit can be favorably housed inside the insulation cover 161.

Although a detailed description with reference to the drawings is be omitted, the insulation cover 162 on the other side in the axial direction has a configuration that is substantially similar to that of the insulation cover 161. In a manner similar to the insulation cover 161, the insulation cover 162 has the pair of side surface portions 171, the outer surface portion 172 on the outer side in the axial direction, the inner surface portion 173 on the inner side in the axial direction, and the front surface portion 174 on the inner side in the radial direction. In addition, in the insulation cover 162, the recess portions 177 that have a semicircular shape are provided in the pair of side surface portions 171 in positions on both ends in the circumferential direction of the front surface portion 174. Furthermore, the pair of protruding portions 178 are provided in the outer surface portion 172. As a difference with the insulation cover 161, the insulation cover 162 is configured to not have the opening portions for drawing out the winding end portions 154 and 155 of the first partial winding 151A.

Height dimensions in the axial direction (that is, width dimensions in the axial direction of the pair of side surface portions 171 and the front surface portion 174) differ between the insulation covers 161 and 162. Specifically, as shown in FIG. 17, a height dimension W11 in the axial direction of the insulation cover 161 and a height dimension W12 in the axial direction of the insulation cover 162 are W11>W12. That is, when the conductor material CR is wound in multiple layers, a winding layer of the conductor material CR is required to be switched (change lanes) in a direction that is orthogonal to the winding direction (lap direction) of the winding. A winding width is thought to increase as a result of the switching. To supplement, the insulation cover 161, of the insulation covers 161 and 162, is a portion that covers the first crossover portion 153A on a side that includes the winding start and the winding end of the conductor material CR. As a result of the winding start and the winding end of the conductor material CR being included, a winding margin (overlap margin) of the conductor material CR is greater than that in other portions. Increase in the winding width occurs as a result. Taking this into consideration, the height dimension W11 in the axial direction of the insulation cover 161 is greater than the height dimension W12 in the axial direction of the insulation cover 162. Consequently, unlike that in a case in which the height dimensions W11 and W12 of the insulation covers 161 and 162 are the same, an issue in which the number of turns of the conductor material CR is restricted by the insulation covers 161 and 162 is suppressed.

Next, the second coil module 150B will be described.

Figure 22A:
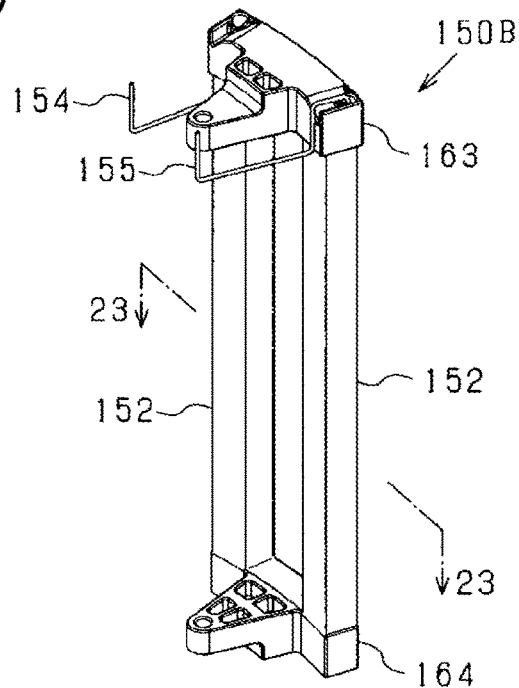
FIG. 22($a$) and FIG. 22($b$) are diagrams illustrating a configuration of the second coil module.
Figure 22B:
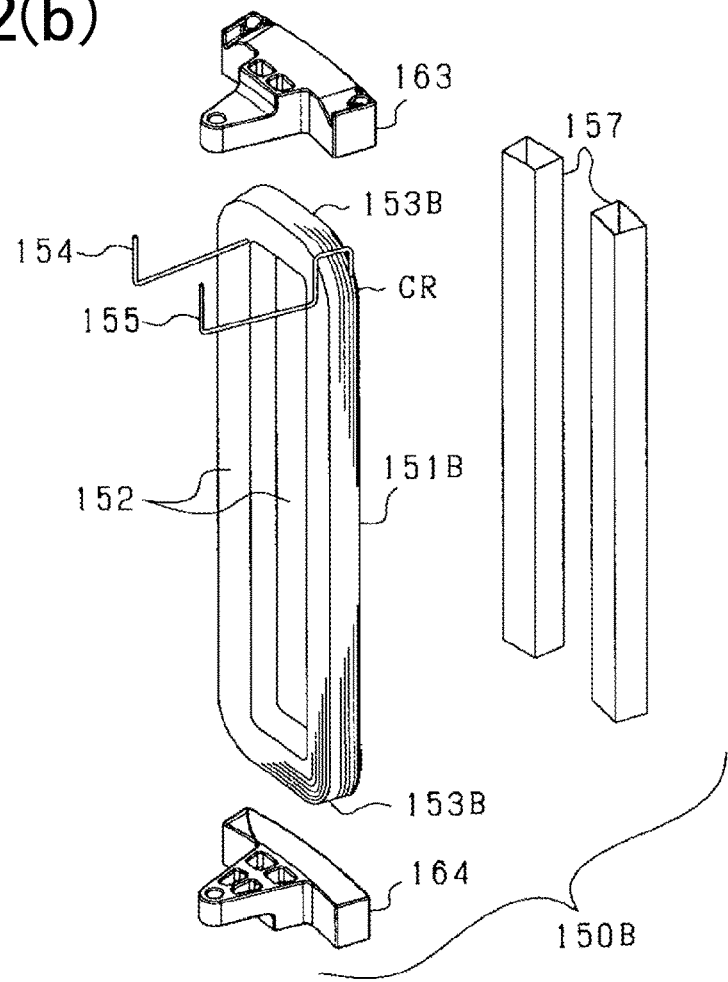
Figure 23:
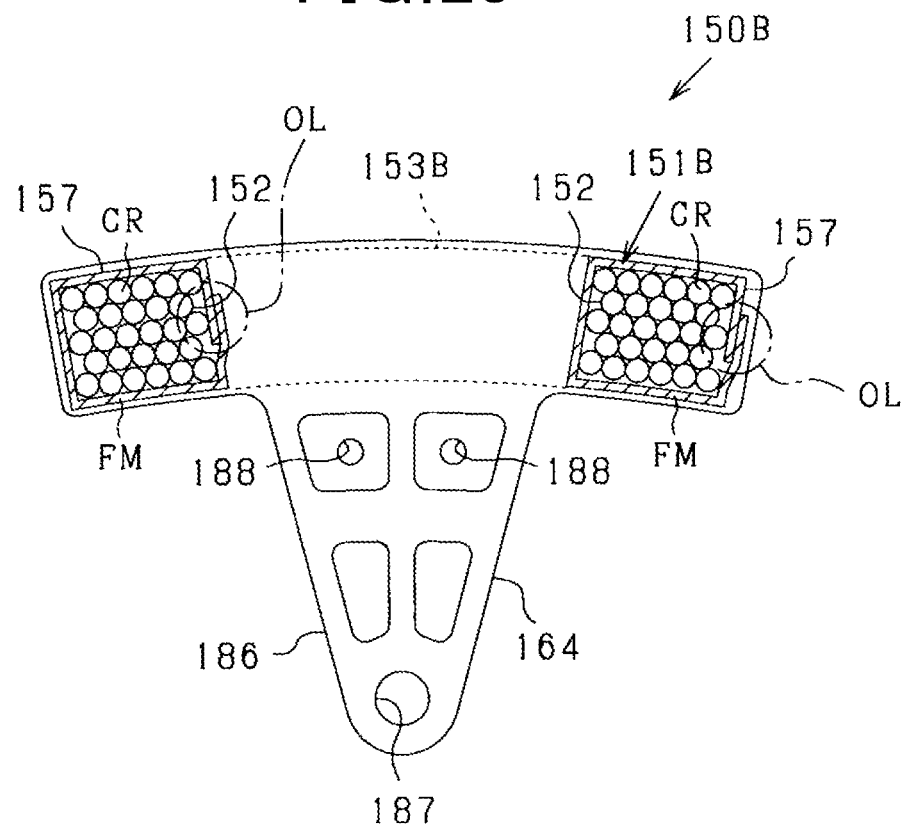
FIG. 23 is cross-sectional view taken along line 23-23 in FIG. 22($a$)

FIG. 22(a) is a perspective view of a configuration of the second coil module 150B. FIG. 22(b) is perspective view in which constituent components of the second coil module 150B are exploded. In addition, FIG. 23 is a cross-sectional view taken along line 23-23 in FIG. 22(a).

As shown in FIG. 22(a) and FIG. 22(b), the second coil module 150B includes the second partial winding 151B that is configured by the conductor material CR being wound in multiple layers in a manner similar to the first partial winding 151A, and the insulation covers 163 and 164 that are attached on one end side and the other end side in the axial direction of the second partial winding 151B. The insulation covers 163 and 164 are molded by an insulating material such as synthetic resin.

The second partial winding 151B has a pair of intermediate conductor portions 152 that are provided parallel to each other and in a linear shape, and a pair of second crossover portions 153B that respectively connect the pair of intermediate conductor portions 152 on both ends in the axial direction. The second partial winding 151B is formed into an annular shape by the pair of intermediate conductor portions 152 and the pair of second crossover portions 153B. The pair of intermediate conductor portions 152 in the second partial winding 151B have the same configuration as the intermediate conductor portions 152 in the first partial winding 151A. In contrast, the configuration of the pair of second crossover portions 153B differs from that of the first crossover portions 153A in the first partial winding 151A. The second crossover portion 153B of the second partial winding 151B is provided so as to extend in the axial direction in a linear shape from the intermediate conductor portion 152, without being bent in the radial direction. FIG. 18 clearly shows the differences between the partial windings 151A and 151B in comparison.

In the second partial winding 151B, the end portions of the conductor material CR are drawn out from one second crossover portion 153B (the second crossover portion 153B on an upper side in FIG. 22(b)), of the second crossover portions 153B on both sides in the axial direction, and the end portions serve as the winding end portions 154 and 155. In addition, in the second partial winding 151B as well, in a manner similar to that in the first partial winding 151A, either of the winding end portions 154 and 155 is connected to the current input/output terminal and the other is connected to the neutral point.

In the second partial winding 151B, in a manner similar to that in the first partial winding 151A, the sheet-like insulation covering body 157 is provided so as to cover the intermediate conductor portion 152. The insulation covering body 157 uses the film material FM that has at least the length of the insulation covering area in the axial direction of the intermediate conductor portion 152 as the axial-direction dimension, and is provided by the film material FM being wound around the intermediate conductor portion 152.

The configuration related to the insulation covering body 157 is also substantially similar in the partial windings 151A and 151B. That is, as shown in FIG. 23, the film material FM covers the periphery of the intermediate conductor portion 152 in a state in which the end portions thereof in the circumferential direction overlap. In the intermediate conductor portion 152, the insulation covering body 157 is provided so as to cover two circumferential-direction side surfaces and two radial-direction side surfaces in their entirety. In this case, in the insulation covering body 157 that covers the intermediate conductor portion 152, the overlap portion OL in which the film member FM overlaps is provided in a portion that opposes the intermediate conductor portion 152 of the partial winding 151 of another phase, that is, one of the two circumferential-direction side surface of the intermediate conductor portion 152. According to the present embodiment, the overlap portions OL are provided on the same side in the circumferential direction in the pair of intermediate conductor portions 152.

In the second partial winding 151B, the insulation covering body 157 is provided over an area from the intermediate conductor portion 152 to portions that are covered by the insulation covers 163 and 164 (that is, portions on the inner side of the insulation covers 163 and 164) in the second crossover portions 153B on both sides in the axial direction. With reference to FIG. 17, an area AX2 in the second coil module 150B is a portion that is not covered by the insulation covers 163 and 164. The insulation covering body 157 is provided over an area that extends above and below the area AX2.

In both of the partial windings 151A and 151B, the insulation covering bodies 157 are provided over areas that include portions of the crossover portions 153A and 153B. That is, in the partial windings 151A and 151B, the insulation covering bodies 157 are provided in the intermediate conductor portions 152 and portions of the cross-over portions 153A and 153B that extend continuously in a linear manner from the intermediate conductor portions 152. However, because the axial-direction lengths differ between the partial windings 151A and 151B, axial-direction areas of the insulation covering bodies 157 also differ.

Next, configurations of the insulation covers 163 and 164 will be described.

Figure 24A:
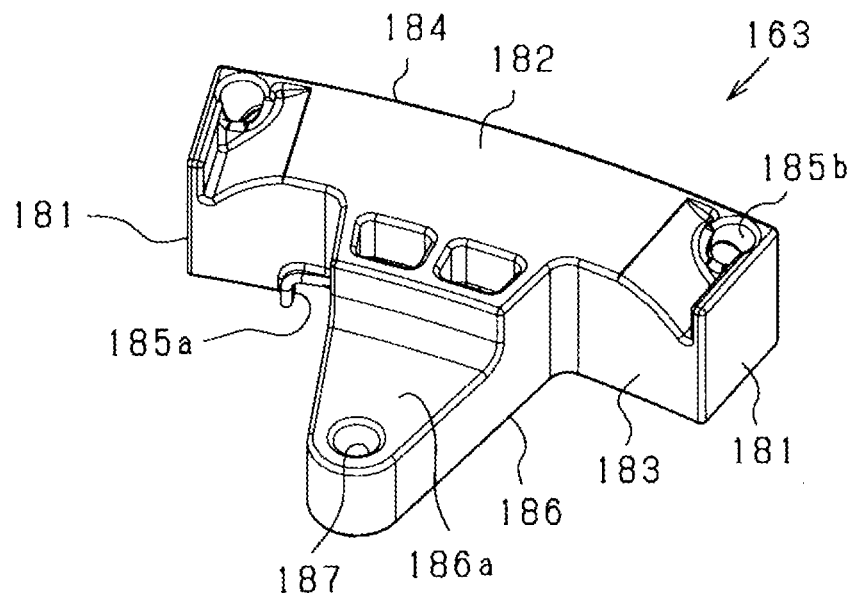
FIG. 24($a$) and FIG. 24($b$) are perspective views of a configuration of an insulation cover.
Figure 24B:
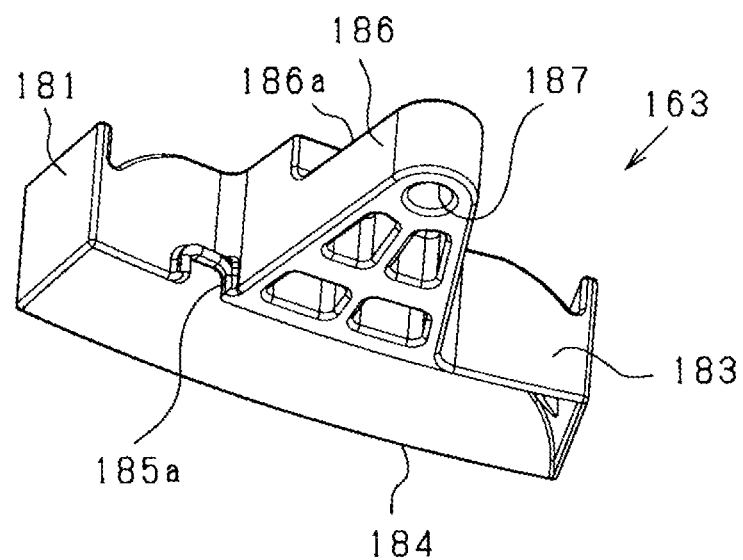

The insulation cover 163 is mounted in the second crossover portion 153B on one side in the axial direction of the second partial winding 151B. The insulation cover 164 is mounted in the second crossover portion 153B on the other side in the axial direction of the second partial winding 151B. FIG. 24(a) and FIG. 24(b) show the configuration of the insulation cover 163, of the insulation covers 163 and 164. FIG. 24(a) and FIG. 24(b) are perspective views of the insulation cover 163 viewed from two differing directions.

As shown in FIG. 24(a) and FIG. 24(b), the insulation cover 163 has a pair of side surface portions 181 that are side surfaces in the circumferential direction, an outer surface portion 182 on the outer side in the axial direction, a front surface portion 183 on the inner side in the radial direction, and a rear surface portion 184 on the outer side in the radial direction. These portions 181 to 184 are each formed into a plate shape and are connected to one another in a three-dimensional shape such that only the inner side in the axial direction is open. Each of the pair of side surface portions 181 is provided so as to be oriented to extend towards an axial center of the core assembly CA in a state of assembly to the core assembly CA. Therefore, in a state in which the plurality of second coil modules 150B are arranged in an array in the circumferential direction, the side surface portions 181 of the insulation covers 163 of the second coil modules 150A that are adjacent to each other oppose each other in a state of contact or proximity. As a result, a favorable annular arrangement can be achieved while mutual insulation is achieved between the second coil modules 150B that are adjacent in the circumferential direction.

In the insulation cover 163, an opening portion 185a for drawing out the winding end portion 154 of the second partial winding 151B is provided in the front surface portion 183. An opening portion 185b for drawing out the winding end portion 155 of the second partial winding 151B is provided in the outer surface portion 182.

A protruding portion 186 that protrudes towards the inner side in the radial direction is provided in the front surface portion 183 of the insulation cover 163. The protruding portion 186 is provided so as to protrude further towards the inner side in the radial direction than the second crossover portion 153B in a position that is a center between one end and the other end in the circumferential direction of the insulation cover 163. The protruding portion 186 has a tapered shape that becomes narrower towards the inner side in the radial direction, from a plan view. A through hole 187 that extends in the axial direction is provided in a tip end portion of the protruding portion 186. Here, a configuration of the protruding portion 186 is arbitrary as long as the protruding portion 186 protrudes further towards the inner side in the radial direction than the second crossover portion 153B and the through hole 187 is provided in the position that is the center between one end and the other end in the circumferential direction of the insulation cover 163. However, when a state of overlap with the insulation cover 161 on the inner side in the axial direction is assumed, the protruding portion 186 is preferably formed so as to have a narrow width in the circumferential direction to prevent interference with the winding end portions 154 and 155.

A thickness in the axial direction in the tip end portion on the inner side in the radial direction of the protruding portion 186 becomes thinner in steps. The through hole 187 is provided in a lower step portion 186a that is the thinner portion. In the state of assembly of the second coil module 150B to the core assembly CA, the lower step portion 186a corresponds to a portion in which a height from the end surface in the axial direction of the inner cylindrical member 81 is lower than a height of the second crossover portion 153B.

In addition, as shown in FIG. 23, a through hole 188 that passes through in the axial direction is provided in the protruding portion 186. As a result, in a state in which the insulation covers 161 and 163 overlap in the axial direction, filling with an adhesive between the insulation covers 161 and 163 can be performed through the through hole 188.

Although a detailed description with reference to the drawings is be omitted, the insulation cover 164 on the other side in the axial direction has a configuration that is substantially similar to that of the insulation cover 163. In a manner similar to the insulation cover 163, the insulation cover 164 has the pair of side surface portions 181, the outer surface portion 182 on the outer side in the axial direction, the front surface portion 183 on the inner side in the radial direction, and the rear surface portion 184 on the outer side in the radial direction. In addition, the insulation cover 164 has the through hole 187 that is provided in the tip end portion of the protruding portion 186. Furthermore, as a difference with the insulation cover 163, the insulation cover 164 is configured to not include an opening portion for drawing out the winding end portions 154 and 156 of the second partial winding 151B.

Width dimensions in the radial direction of the pair of side surface portions 181 differ between the insulation covers 163 and 164. Specifically, as shown in FIG. 17, a width dimension W21 in the radial direction of the side surface portion 181 in the insulation cover 163 and a width dimension W22 in the radial direction of the side surface portion 181 in the insulation cover 164 are W21>W22. That is, the insulation cover 163, of the insulation covers 163 and 164, is a portion that covers the second crossover portion 153B on the side that includes the winding start and the winding end of the conductor material CR. As a result of the winding start and the winding end of the conductor material CR being included, the winding margin (overlapping margin) of the conductor material CR is greater than that in other portions. Increase in the winding width occurs as a result. Taking this into consideration, the width dimension W21 in the radial direction of the insulation cover 163 is greater than the width dimension W22 in the radial direction of the insulation cover 164. Consequently, unlike that in a case in which the width dimensions W21 and W22 of the insulation covers 163 and 164 are the same, an issue in which the number of turns of the conductor material CR is restricted by the insulation covers 163 and 164 is suppressed.

Figure 25:
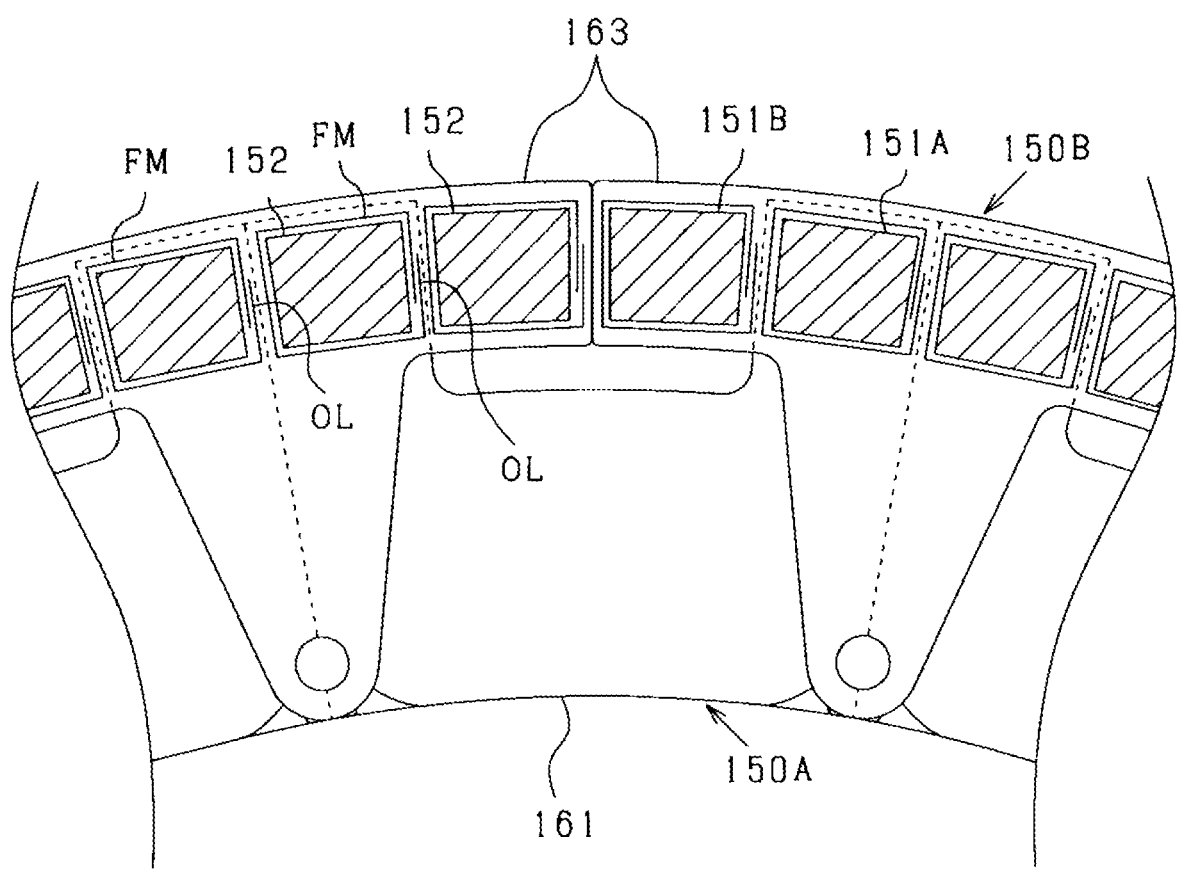
FIG. 25 is a diagram illustrating an overlap position of a film material in a state in which the coil modules are arrayed in a circumferential direction.

FIG. 25 is a diagram illustrating an overlap position of the film material FM in a state in which the coil modules 150A and 150B are arrayed in the circumferential direction. As described above, in the coil modules 150A and 150B, the film material FM covers the periphery of the intermediate conductor portion 152 so as to overlap in a portion that opposes the intermediate conductor portion 152 of the partial winding 151 of another phase, that is, the side surface in the circumferential direction of the intermediate conductor portion 152 (see FIG. 20 and FIG. 23). In addition, in the state in which the coil modules 150A and 150B are arrayed in the circumferential direction, the overlap portions OL of the film material FM are arranged on the same side (a right side in the circumferential direction in the drawing), of both sides in the circumferential direction. As a result, in the intermediate conductor portions 152 of the partial windings 151A and 151B of differing phases that are adjacent to each other in the circumferential direction, the overlap portions OL of the film material FM do not overlap each other in the circumferential direction. In this case, a maximum of three layers of the film material FM overlap between the intermediate conductor portions 152 that are arrayed in the circumferential direction.

Next, a configuration that is related to assembly of the coil modules 150A and 150B to the core assembly CA will be described.

The coil modules 150A and 150B are configured such that the axial-direction lengths differ from each other, and the shapes of the crossover portions 153A and 153B of the partial windings 151A and 151B differ from each other. The coil modules 150A and 150B are attached to the core assembly CA in a state in which the first crossover portion 153A of the first coil module 150A is on the inner side in the axial direction and the second crossover portion 153B of the second coil module 150B is on the outer side in the axial direction. Regarding the insulation covers 161 to 164, the insulation covers 161 to 164 are fixed to the core assembly CA in a state in which the insulation covers 161 and 163 overlap in the axial direction on one end side in the axial direction of the coil modules 150A and 150B, and the insulation covers 162 and 164 overlap in the axial direction on the other end side in the axial direction.

Figure 26:
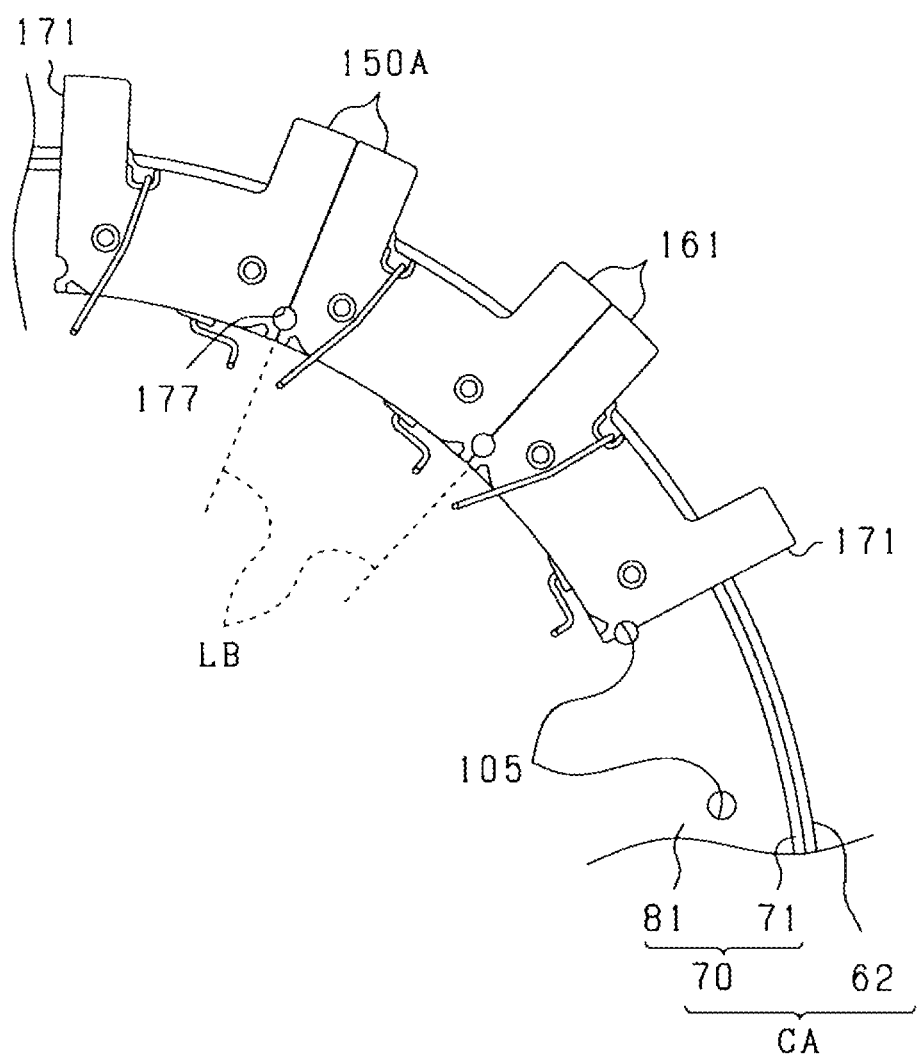
FIG. 26 is a plan view of a state of assembly of the first coil module to the core assembly.
Figure 27:
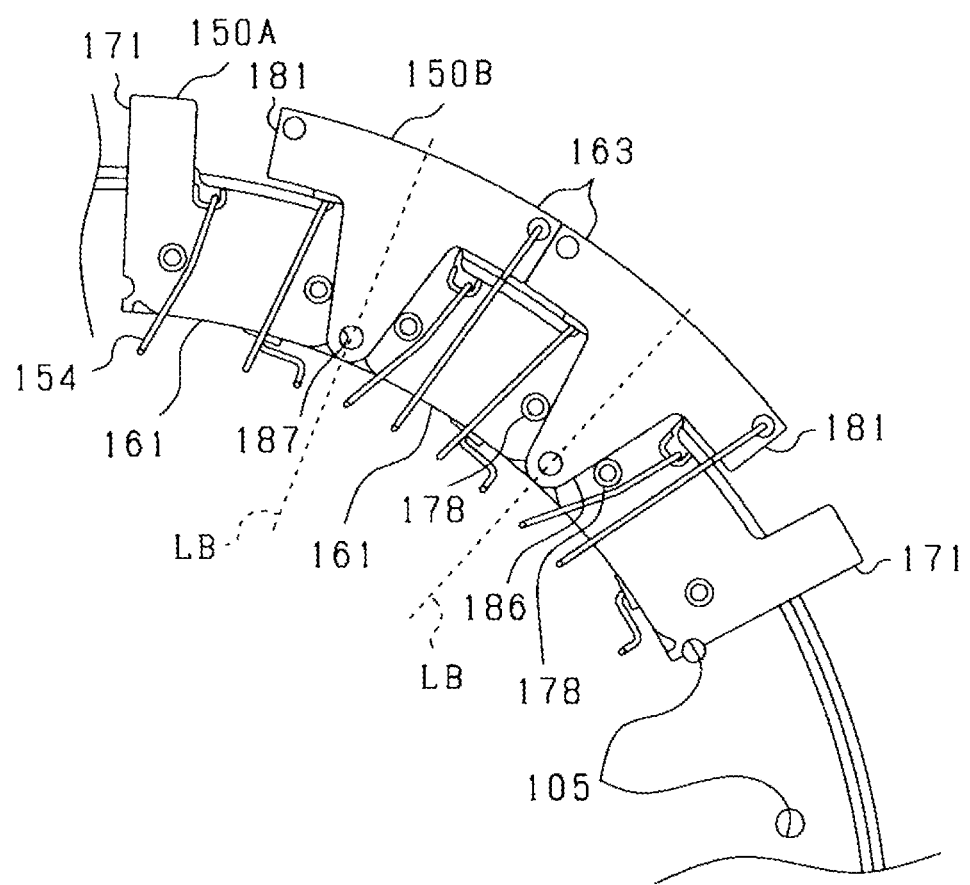
FIG. 27 is a plan view of a state of assembly of the first coil module and the second coil module to the core assembly.
Figure 28A:
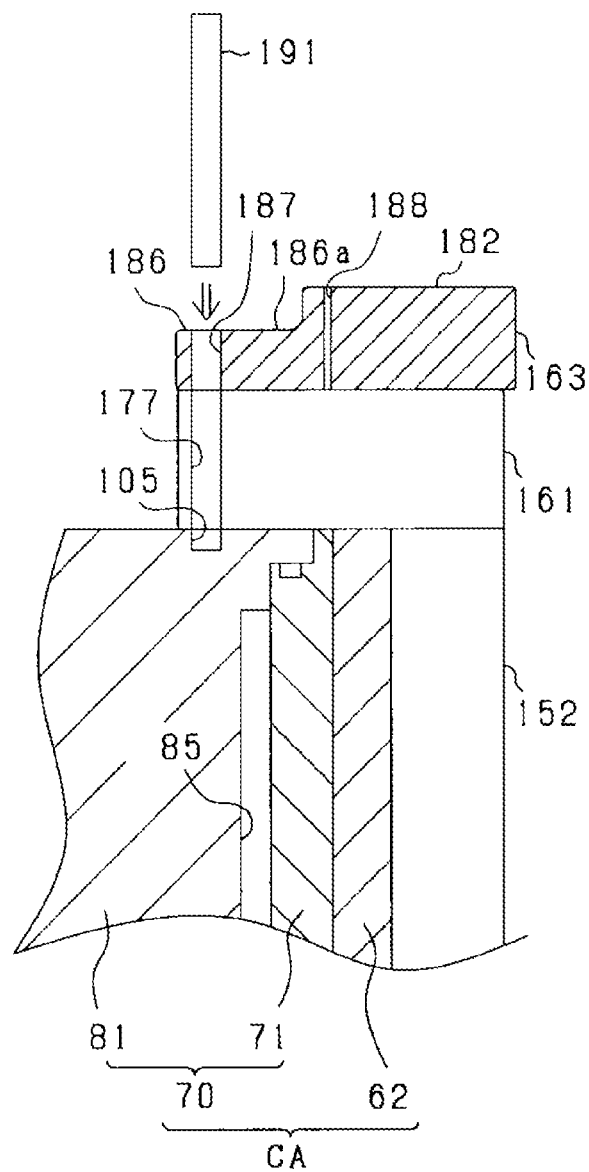
FIG. 28($a$) and FIG. 28($b$) are longitudinal cross-sectional views of a state of fixing by a fixing pin.
Figure 28B:
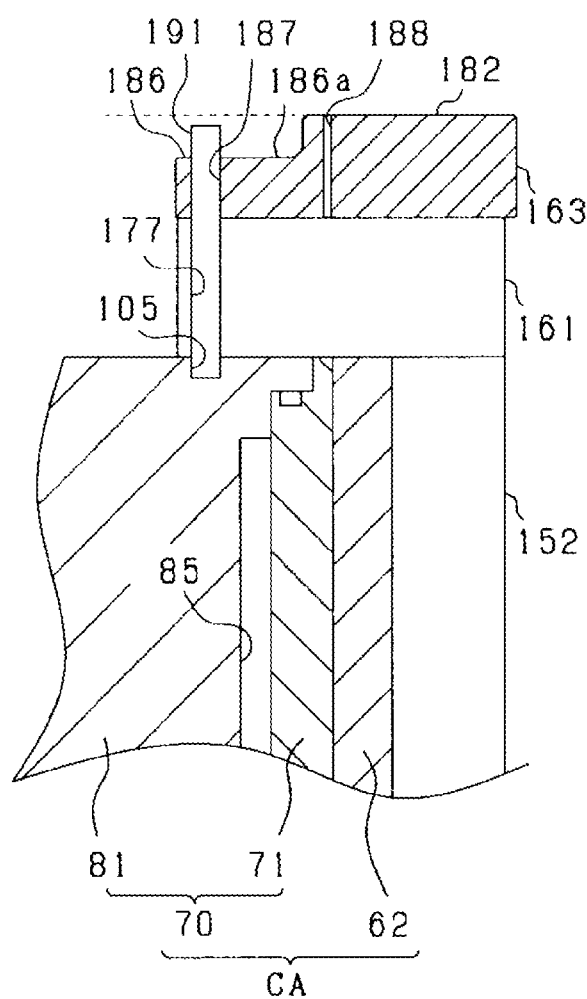

FIG. 26 is a plan view of a state in which a plurality of insulation covers 161 are arrayed in the circumferential direction in a state of assembly of the first coil modules 150A to the core assembly CA. FIG. 27 is a plan view of a state in which a plurality of insulation covers 161 and 163 are arrayed in the circumferential direction in a state of assembly of first coil module 150A and the second coil module 150B to the core assembly CA. In addition, FIG. 28(a) is a longitudinal cross-sectional view of a state before fixing by a fixing pin 191 in the state of assembly of the coil modules 150A and 150B to the core assembly CA. FIG. 28(b) is a longitudinal cross-sectional view of a state after fixing by the fixing pin 191 in the state of assembly of the coil modules 150A and 150B to the core assembly CA.

As shown in FIG. 26, in the state in which the plurality of coil modules 150A are assembled to the core assembly CA, the plurality of insulation covers 161 are each arranged such that the side surface portions 171 are in a state of contact or proximity with each other. The insulation covers 161 are arranged such that a boundary line LB at which the side surface portions 171 oppose each other and the recess portion 105 on the end surface in the axial direction of the inner cylindrical member 81 coincide. In this case, as a result of the side surface portions 171 of the insulation covers 161 that are adjacent to each other in the circumferential direction being in a state of contact or proximity with each other, a through hole portion that extends in the axial direction is formed by the recess portions 177 of the insulation covers 161, and the positions of the through hole portion and the recess portion 105 are in a coinciding state.

In addition, as shown in FIG. 27, the second coil modules 150B are further assembled to an integrated body of the core assembly CA and the first coil modules 150A. In accompaniment with this assembly, the plurality of insulation covers 163 are arranged such that the side surface portions 171 are in a state of contact or proximity with each other. In this state, the crossover portions 153A and 153B are arranged so as to intersect each other on a circle on which the intermediate conductor portions 152 are arrayed in the circumferential direction. The insulation cover 163 is arranged such that the protruding portion 186 overlaps the insulation covers 161 in the axial direction, and the through hole 187 in the protruding portion 186 is connected in the axial direction to the through hole portion that is formed by the recess portions 177 in the insulation covers 161.

At this time, the protruding portion 186 of the insulation cover 163 is guided to a predetermined position by the pair of protruding portions 178 that are provided in the insulation covers 161. As a result, the position of the through hole 187 on the insulation cover 163 side matches the through hole portion on the insulation cover 161 side and the recess portion 105 of the inner cylindrical member 81. That is, in the state in which the coil modules 150A and 150B are assembled to the core assembly CA, the recess portion 177 of the insulation cover 161 is positioned towards the backside of the insulation cover 163. Therefore, positioning of the through hole 187 of the protruding portion 186 to the recess portions 177 of the insulation covers 161 may be difficult to perform. In this regard, as a result of the protruding portion 186 of the insulation cover 163 being guided by the pair of protruding portions 178 of the insulation covers 161, positioning of the insulation cover 163 to the insulation covers 161 is facilitated.

Then, as shown in FIG. 28(a) and FIG. 28(b), in the portion in which the insulation covers 161 and the protruding portion 186 of the insulation cover 163 overlap, fixing by the fixing pin 191 that serves as a fixing member is performed in a state in which the insulation covers 161 and the protruding portion 186 are engaged. More specifically, in a state in which the recess portion 105 of the inner cylindrical member 81, the recess portions 177 of the insulation covers 161, and the through hole 187 of the insulation cover 163 are aligned, the fixing pin 191 is inserted into the recess portions 105 and 177 and the through hole 187. As a result, the insulation covers 161 and 163 are integrally fixed to the inner cylindrical member 81. As a result of the present configuration, the coil modules 150A and 150B that are adjacent to each other in the circumferential direction are fixed to the core assembly CA in the coil end CE by the shared fixing pin 191. The fixing pin 191 may be preferably made of a material that has favorable heat conductivity. For example, the fixing pin 191 may be a metal pin.

As shown in FIG. 28(b), the fixing pin 191 is assembled to the lower step portion 186a of the protruding portion 186 of the insulation cover 163. In this state, an upper end portion of the fixing pin 191 protrudes above the lower step portion 186a but does not protrude above an upper surface (outer surface portion 182) of the insulation cover 163. In this case, the fixing pin 191 is longer than an axial-direction height dimension of the overlapping portion between the insulation cover 161 and the protruding portion 186 (lower step portion 186a) of the insulation cover 163 and has a margin that protrudes upward. Therefore, when the fixing pin 191 is inserted into the recess portions 105 and 177 and the through hole 187 (that is, during a fixing operation of the fixing pin 191), the operation is thought to be more easily performed. In addition, because the upper end portion of the fixing pin 191 does not protrude above the upper surface (outer surface portion 182) of the insulation cover 163, an issue in which an axial length of the stator 60 becomes long as a result of the protrusion of the fixing pin 191 can be suppressed.

After fixing of the insulation covers 161 and 163 by the fixing pin 191, filling with the adhesive is performed through the through hole 188 that is provided in the insulation cover 163. As a result, the insulation covers 161 and 163 that overlap in the axial direction are firmly coupled to each other. Here, in FIG. 28(a) and FIG. 28(b), for convenience, the through hole 188 is shown over an area from the upper surface to a lower surface of the insulation cover 163. However, in actuality, the through hole 188 is provided in a thin plate portion that is formed by punching or the like.

As shown in FIG. 28(b), a fixing position of the insulation covers 161 and 163 by the fixing pin 191 is an end surface in the axial direction of the stator holder 70 that is further towards the inner side in the radial direction (left side in the drawing) than the stator core 62. Fixing by the fixing pin 191 is performed to the stator holder 70. That is, the first crossover portion 153A is fixed to the end surface in the axial direction of the stator holder 70. In this case, the coolant passage 85 is provided in the stator holder 70. Thus, heat that is generated in the first partial winding 151A is directly transferred near the coolant passage 85 in the stator holder 70 from the first crossover portion 153A. In addition, the fixing pin 191 is inserted into the recess portion 105 of the stator holder 70, and transfer of heat to the stator holder 70 side is promoted through the fixing pin 191. As a result of this configuration, improvement in cooling performance of the stator winding 61 is achieved.

According to the present embodiment, eighteen each of the insulation covers 161 and 163 are arranged so as to overlap on the inner and outer sides in the axial direction in the coil end CE. Meanwhile, the recess portions 105 are provided in eighteen location that is the same number as the number of insulation covers 161 and 163, on the end surface in the axial direction of the stator holder 70. In addition, the fixing by the fixing pin 191 is performed in the recess portions 105 in the eighteen locations.

Although not shown, this similarly applies to the insulation covers 162 and 164 on the opposite side in the axial direction. That is, first, in assembly of the first coil modules 150A, as a result of the side surface portions 171 of the insulation covers 162 that are adjacent to each other in the circumferential direction being in a state of contact or proximity with each other, a through hole portion that extends in the axial direction is formed by the recess portions 177 of the insulation covers 162. The positions of the through hole portion and the recess portion 106 on the end surface in the axial direction of the outer cylindrical member 71 are in a coinciding state. In addition, as a result of assembly of the second coil modules 150B, the position of the through hole 187 on the insulation cover 164 side matches the through hole portion on the insulation cover 163 side and the recess portion 106 of the outer cylindrical member 71. As a result of the fixing pin 191 being inserted into the recess portions 106 and 107 and the through hole 187, the insulation covers 162 and 164 are integrally fixed to the outer cylindrical member 71.

During assembly of the coil modules 150A and 150B to the core assembly CA, all of the first coil modules 150A may be attached first to the outer circumferential side of the core assembly CA. Subsequently, assembly of all of the second coil modules 150B and fixing by the fixing pins 841 may be performed. Alternatively, two first coil modules 150A and a single second coil module 150B may first be fixed to the core assembly CA by a single fixing pin 191. Subsequently, assembly of the first coil module 150A, assembly of the second coil module 150B, and fixing by the fixing pin 191 may be repeatedly performed in this order.

Next, the bus bar module 200 will be described.

Figure 29:
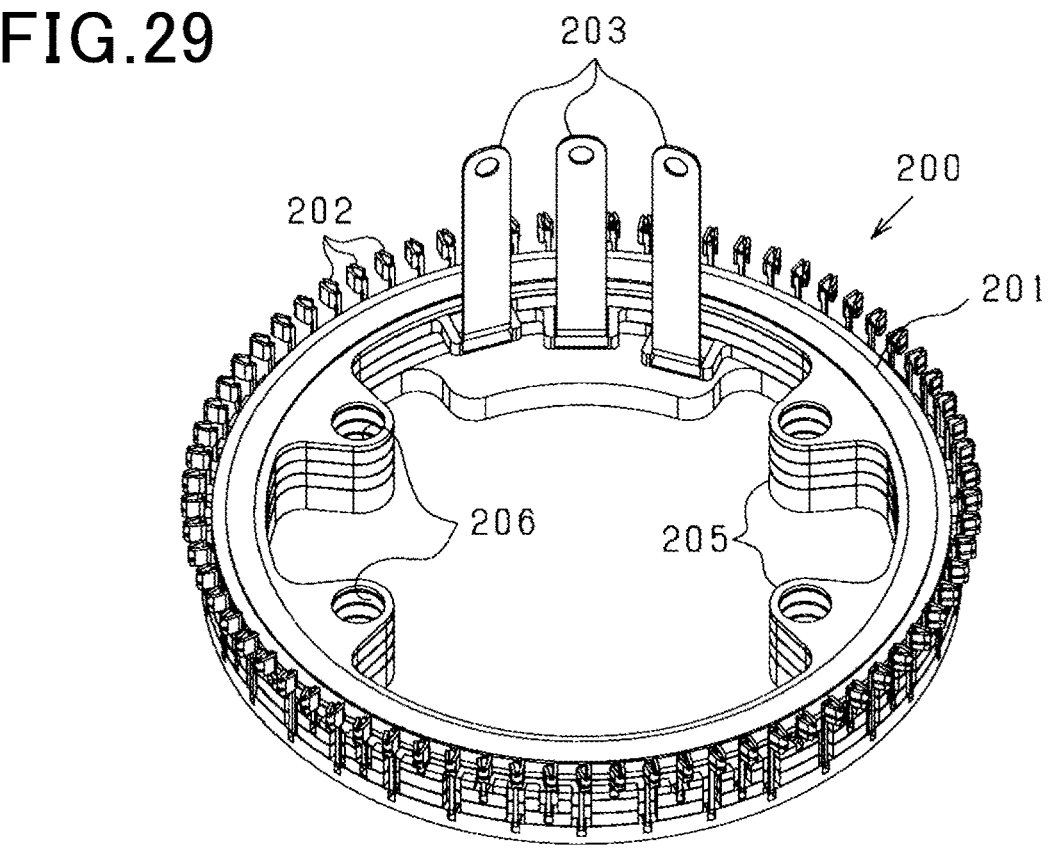
FIG. 29 is a perspective view of a bus bar module.
Figure 30:
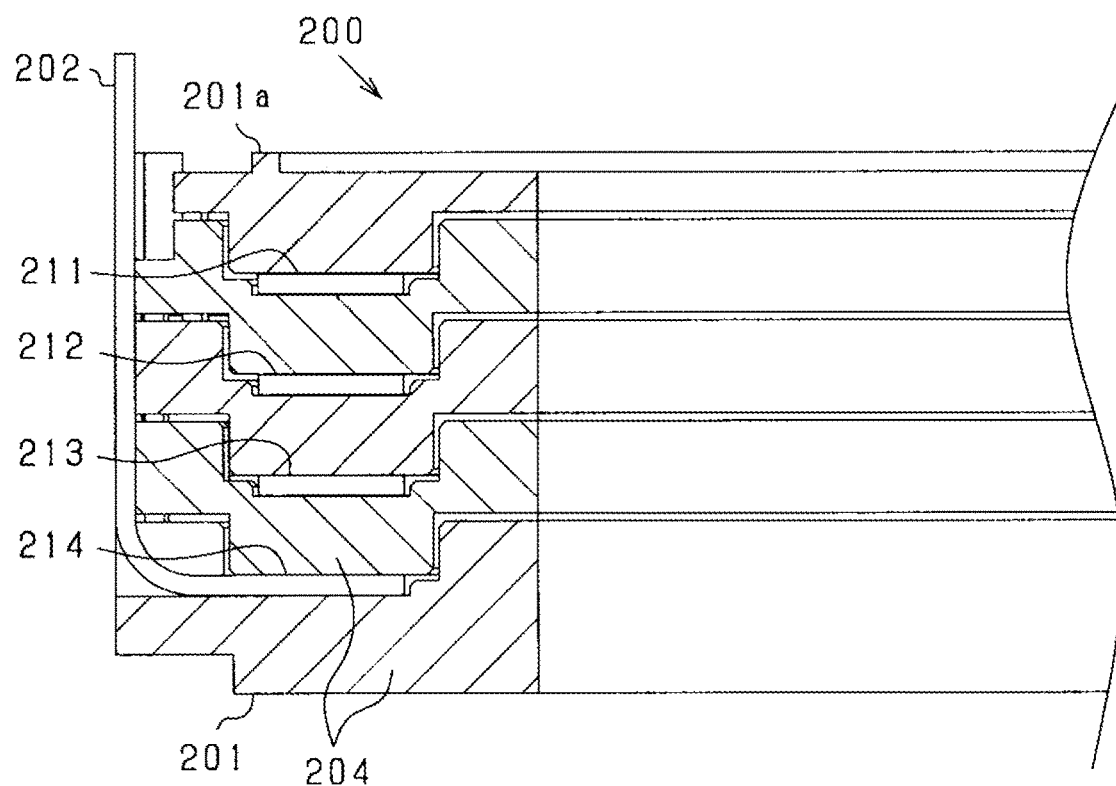
FIG. 30 is a cross-sectional view of a portion of a vertical cross-section of the bus bar module.

The bus bar module 200 is a winding connection member that is electrically connected to the partial winding 151 of each coil module 150 in the stator winding 61, connects one end of the partial winding 151 of each phase in parallel for each phase, and connects the other end of each partial winding 151 by a neutral point. FIG. 29 is a perspective view of the bus bar module 200. FIG. 30 is a cross-sectional view of a portion of a vertical cross-section of the bus bar module 200.

The bus bar module 200 includes an annular portion 201 that has a circular annular shape, a plurality of connection terminals 202 that extend from the annular portion 201, and three input/output terminals 203 that are provided for each phase winding. For example, the annular portion 201 may be formed into the circular annular shape by an insulating member such as resin.

As shown in FIG. 30, the annular portion 201 has a laminated plate 204 that is formed into a substantially circular annular plate shape and laminated in multiple layers (five layers according to the present embodiment) in the axial direction. Four bus bars 211 to 214 are provided in a state in which the bus bars 211 to 214 are sandwiched between the laminated plates 204. The bus bars 211 to 214 each have a circular annular shape and are made of the bus bar 211 for the U-phase, the bus bar 212 for the V-phase, the bus bar 213 for the W-phase, and the bus bar 214 for the neutral point. These bus bars 211 to 214 are arranged inside the annular portion 201 in an array in the axial direction such that plate surfaces oppose each other. The laminated plates 204 and the bus bars 211 to 214 are joined to one another by an adhesive. An adhesive sheet is preferably used as the adhesive. However, a configuration in which a liquid or semi-liquid adhesive is applied is also possible. In addition, in each of the bus bars 211 to 214, the connection terminal 202 is connected so as to protrude towards the outer side in the radial direction from the annular portion 201.

A protruding portion 201a that extends in an annular shape is provided on an upper surface of the annular portion 201, that is, an upper surface of the laminated plate 204 on a most surface side among the laminated plates 204 that are provided in five layers.

Here, the bus bar module 200 is merely required to be that in which the bus bars 211 to 214 are provided so as to be embedded inside the annular portion 201. The bus bars 211 to 214 that are arranged at predetermined intervals may be integrally insert-molded. In addition, the arrangement of the bus bars 211 to 214 is not limited to the configuration in which all of the bus bars 211 to 214 are arrayed in the axial direction and all of the plate surfaces are oriented in the same direction. The bus bars 211 to 214 may be arrayed in the radial direction. The bus bars 211 to 214 may be arrayed in two rows in the axial direction and two rows in the radial direction. At least one of the bus bars 211 to 214 may differ in direction in which the plate surface extend.

In FIG. 29, the connection terminals 202 are provided so as to be arrayed in the circumferential direction of the annular portion 201 and extend in the axial direction on the outer side in the radial direction. The connection terminals 202 include a connection terminal that is connected to the bus bar 211 for the U-phase, a connection terminal that is connected to the bus bar 212 for the V-phase, a connection terminal that is connected to the bus bar 213 for the W-phase, and a connection terminal that is connected to the bus bar 214 for the neutral point. The same number of connection terminals 202 as the number of winding end portions 154 and 155 of the partial windings 151 of the coil modules 150 is provided. One each of the winding end portions 154 and 155 of the partial winding 151 is connected to each of the connection terminal 202. As a result, the bus bar module 200 is connected to each of the partial windings 151 of the U-phase, the partial windings 151 of the V-phase, and the partial windings 151 of the W-phase.

For example, the input/output terminal 203 may be made of a bus bar material and is provided so as to be oriented to extend in the axial direction. The input/output terminals 203 include an input/output terminal 203U for the U-phase, an input/output terminal 203V for the V-phase, and an input/output terminal 203W for the W-phase. These input/output terminals 203 are respectively connected to the bus bars 211 to 213 for each phase inside the annular portion 201. Input and output of electric power from an inverter (not shown) to the phase winding of each phase of the stator winding 61 is performed through the input/output terminals 203.

Here, a current sensor that detects a phase current of each phase may be integrally provided in the bus bar module 200. In this case, a current detection terminal is provided in the bus bar module 200. A detection result of the current sensor is outputted to a control apparatus (not shown) through the current detection terminal.

In addition, the annular portion 201 includes a plurality of protruding portions 205 that protrude towards the inner circumferential side as portions that are fixed to the stator holder 70. A through hole 206 that extends in the axial direction is formed in the protruding portion 205.

Figure 31:
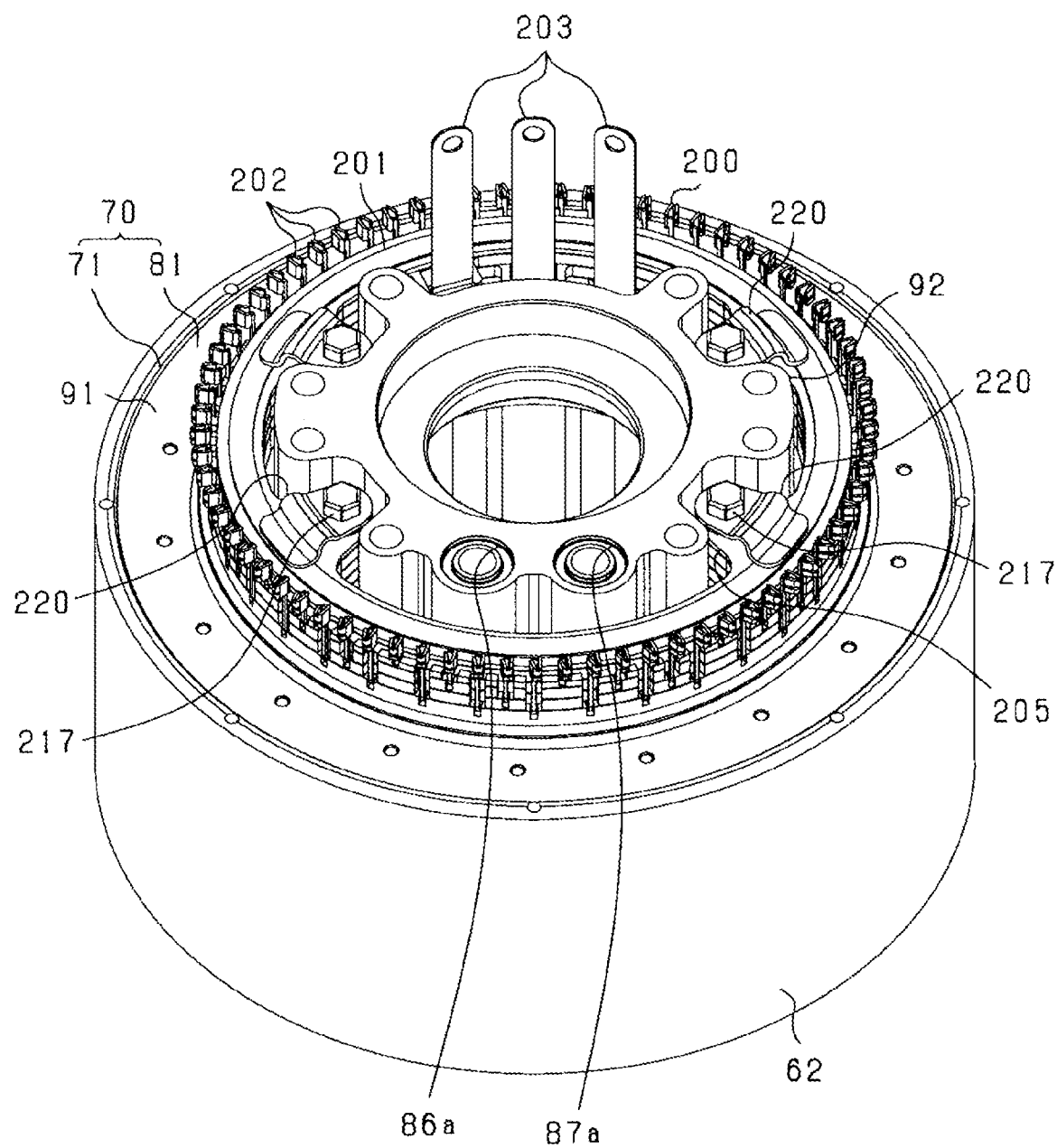
FIG. 31 is a perspective view of a state in which the bus bar module is assembled to a stator holder.
Figure 32:
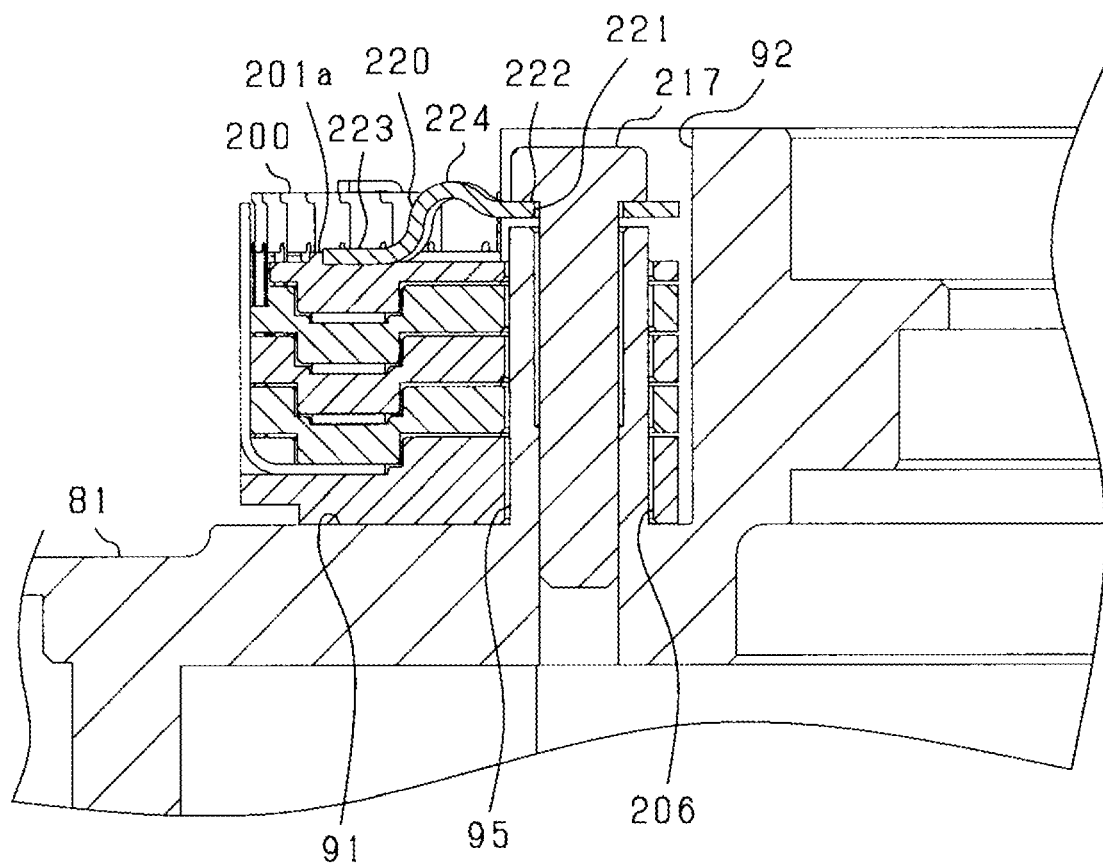
FIG. 32 is a longitudinal cross-sectional view of a fixing portion that fixes the bus bar module.

FIG. 31 is a perspective view of a state in which the bus bar module 200 is assembled to the stator holder 70. FIG. 32 is a longitudinal cross-sectional view of a fixing portion that fixes the bus bar module 200. Here, refer to FIG. 12 regarding the configuration of the stator holder 70 before assembly of the bus bar module 200.

In FIG. 31, the bus bar module 200 is provided on the end plate portion 91 so as to surround the boss portion 92 of the inner cylindrical member 81. The bus bar module 200 is fixed to the stator holder 70 (inner cylindrical member 81) by fastening by a fastener 217 such as a bolt, in a state in which positioning is performed by assembly to the column portion 95 (see FIG. 12) of the inner cylindrical member 81.

More specifically, as shown in FIG. 32, the column portion 95 that extends in the axial direction is provided in the end plate portion 91 of the inner cylindrical member 81. In addition, in a state in which the column portion 95 is inserted into the through hole 206 that is provided in the plurality of protruding portions 205, the bus bar module 200 is fixed to the column portion 95 by the fastener 217. According to the present embodiment, the bus bar module 200 is fixed using a retainer plate 220 that is made of a metal material such as iron. The retainer plate 220 includes a fastened portion 222 that has an insertion hole 221 into which the fastener 217 is inserted, a pressing portion 223 that presses an upper surface of the annular portion 201 of the bus bar module 200, and a bend portion 224 that is provided between the fastened portion 222 and the pressing portion 223.

In a mounting state of the retainer plate 220, the fastener 217 is screwed into the column portion 95 of the inner cylindrical member 81 in a state in which the fastener 217 is inserted into the insertion hole 221 of the retainer plate 220. In addition, the pressing portion 223 of the retainer plate 220 is in a state of contact with the upper plate of the annular portion 201 of the bus bar module 200. In this case, in accompaniment with the fastener 217 being screwed into the column portion 95, the retainer plate 220 is pressed towards the downward side in the drawing, and in response, the annular portion 201 is pressed downward by the pressing portion 223. The pressing force towards the downward side in the drawing that is generated in accompaniment with the screwing of the fastener 217 is transferred to the pressing portion 223 through the bend portion 224. Therefore, pressing by the pressing portion 223 is performed in a state in which the pressing is accompanied by elastic force at the bend portion 224.

As described above, the annular protruding portion 201*a* is provided on the upper surface of the annular portion 201. A tip end of the retainer plate 220 on the pressing portion 223 side can be in contact with the protruding portion 201*a*. As a result, the pressing force towards the downward side in the drawing of the retainer plate 220 escaping towards the outer side in the radial direction is suppressed. That is, the pressing force that is generated in accompaniment with the screwing of the fastener 217 is appropriately transferred to the side of the pressing portion 223.

Here, as shown in FIG. 31, in the state of assembly of the bus bar module 200 to the stator holder 70, the input/output terminal 203 is provided in a position on a side opposite the inlet opening 86*a* and the outlet opening 87*a* that are connected to the coolant passage 85, by 180 degrees in the circumferential direction. The input/output terminal 203 and the openings 86*a* and 87*a* may be collectively provided in the same position (that is, close positions).

Next, a relay member 230 that electrically connects the input/output terminal 203 of the bus bar module 200 to an external apparatus outside the rotating electric machine 10 will be described.

As shown in FIG. 1, in the rotating electric machine 10, the input/output terminal 203 of the bus bar module 200 is provided so as to protrude towards the outer side from the housing cover 242, and is connected to the relay member 230 on the outer side of the housing cover 242. The relay member 230 is a member that relays connection between the input/output terminal 203 for each phase that extends from the bus bar module 200 and a power line for each phase that extends from an external apparatus such as an inverter.

Figure 33:
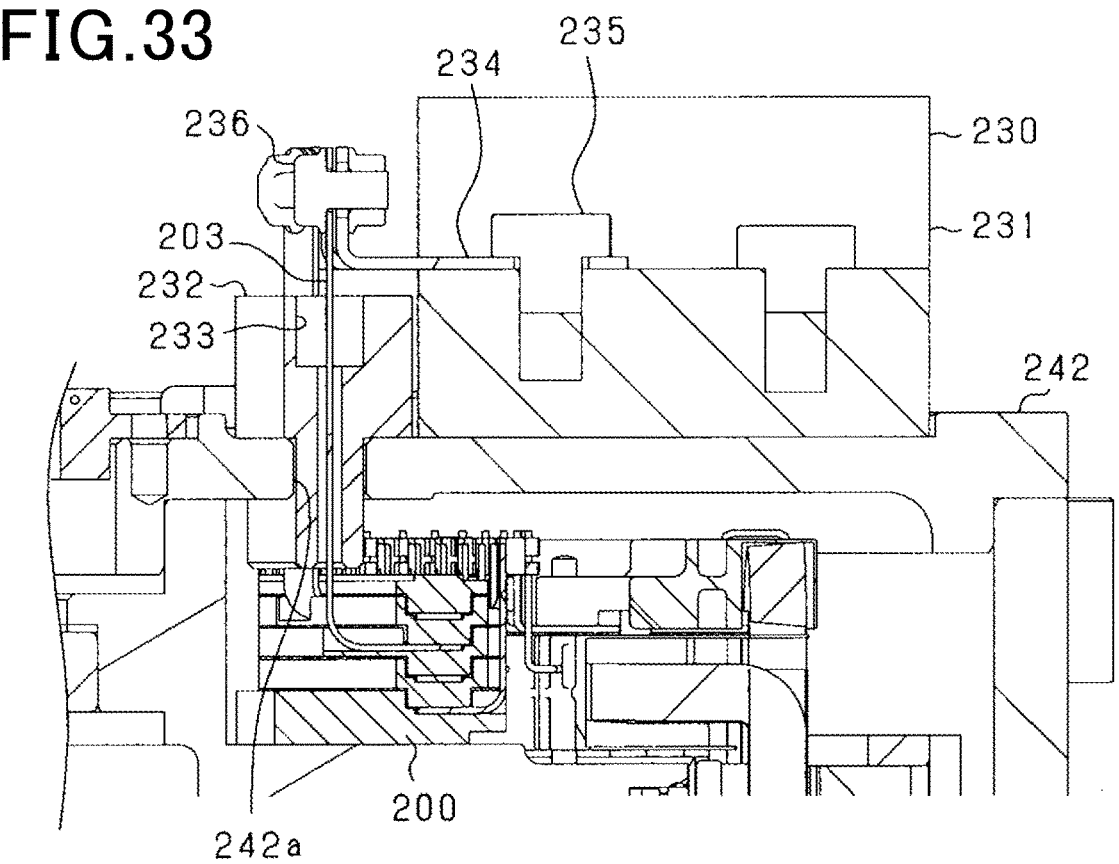
FIG. 33 is a longitudinal cross-sectional view of a state in which a relay member is attached to a housing cover.
Figure 34:
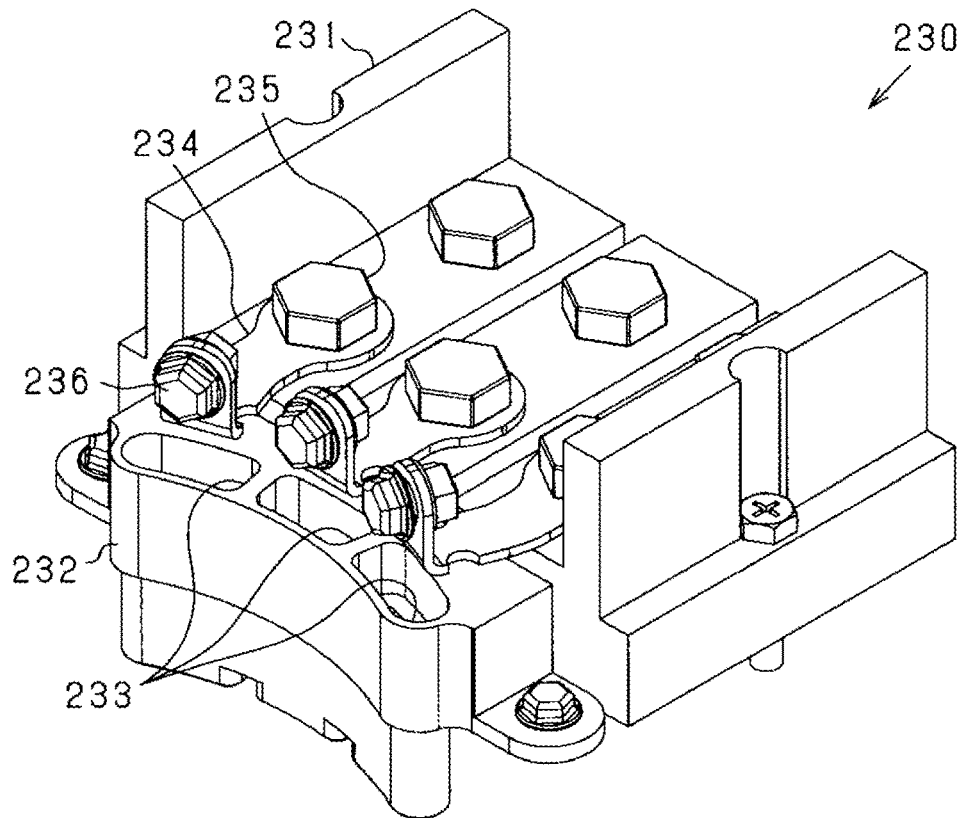
FIG. 34 is a perspective view of the relay member.

FIG. 33 is a longitudinal cross-sectional view of a state in which the relay member 230 is attached to the housing cover 242. FIG. 34 is a perspective view of the relay member 230. As shown in FIG. 33, a through hole 242*a* is formed in the housing cover 242, and the input/output terminal 203 can be drawn out through the through hole 242*a*.

The relay member 230 includes a main body portion 231 that is fixed to the housing cover 242, and a terminal inserting portion 232 that is inserted into the through hole 242*a* in the housing cover 242. The terminal inserting portion 232 has three insertion holes 233 in which the input/output terminals 203 of the phases are inserted, one to each insertion hole 233 The three insertion holes 233 are formed such that a cross-sectional opening has an elongated shape and are arrayed at an orientation in which a long direction is substantially the same.

In the main body portion 231, three relay bus bars 234 that are provided for each phase are attached. The relay bus bar 234 is formed by being bent into a substantially L-like shape. The relay bus bar 234 is fastened by a fastener 235 such as a bolt in the main body portion 231. In addition, the relay bus bar 234 is fastened by a fastener 236 such as a bolt and a nut to a tip end portion of the input/output terminal 203 that is inserted into the insertion hole 233 of the terminal insertion portion 232.

Here, although omitted in the drawings, a power line for each phase that extends from an external apparatus can be connected to the relay member 230. Input and output of electric power to and from the input/output terminal 203 of each phase can be performed.

Figure 35:
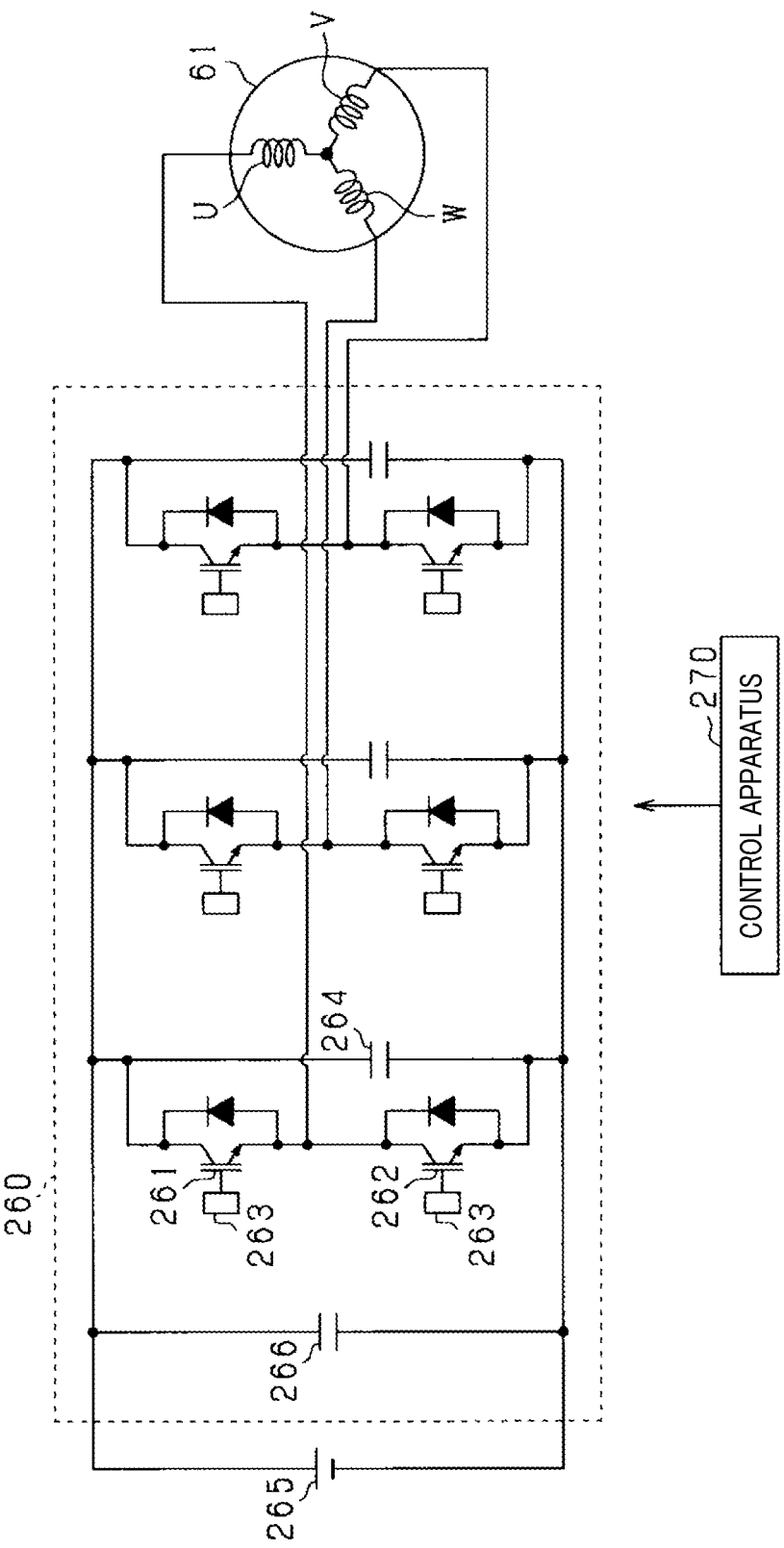
FIG. 35 is an electrical circuit diagram illustrating a control system of the rotating electric machine.
Figure 36:
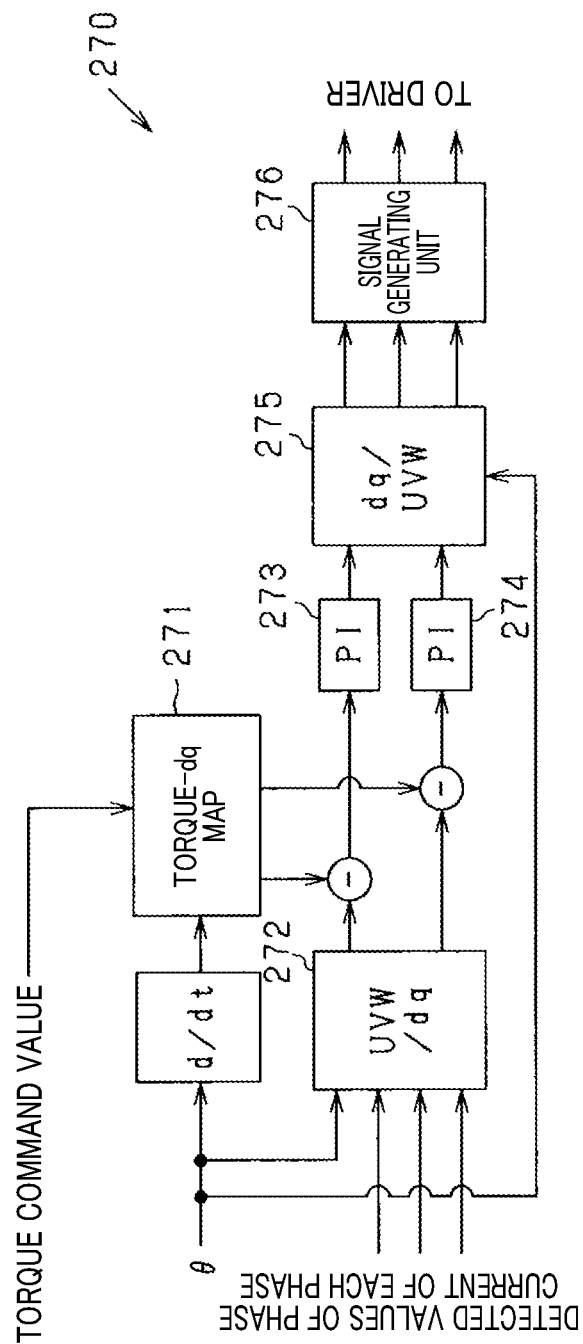
FIG. 36 is a functional block diagram illustrating a current feedback control process by a control apparatus.

Next, a configuration of the control system that controls the rotating electric machine 10 will be described. FIG. 35 is an electric circuit diagram illustrating the control system of the rotating electric machine 10. FIG. 36 is a functional block diagram illustrating a control process by the control apparatus 270.

As shown in FIG. 35, the stator winding 61 is made of a U-phase winding, a V-phase winding, and a W-phase winding. An inverter 260 is connected to the stator winding 61. The inverter 260 is configured by a full-bridge circuit that includes the same number of upper and lower arms as the number of phases. The inverter 260 is provided with a serial-connection body that is made of an upper arm switch 261 and a lower arm switch 262, for each phase. The switches 261 and 262 are each turned on/off by a driver 263. The phase winding of each phase is energized based on the on/off of the switches 261 and 262. For example, each of the switches 261 and 262 may be made of a semiconductor switching element, such as a metal-oxide-semiconductor field-effect transistor (MOSFET) or an insulated-gate bipolar transistor (IGBT). In addition, a charge-supplying capacitor 254 that supplies the switches 261 and 262 with electric charge that is required during switching is connected in parallel to the serial-connection body of the switches 261 and 262 in the upper and lower arms of each phase.

One end of each of the U-phase winding, the V-phase winding, and the W-phase winding is connected to an intermediate connection point between the switches 261 and 262 of the upper and lower arms. These phase windings are connected by a star connection (Y connection). Other ends of the phase windings are connected to one another at a neutral point.

A control apparatus 270 includes a microcomputer that is configured by a CPU and various memories. The control apparatus 270 performs energization control through on/off of the switches 261 and 262 based on various types of detection information of the rotating electric machine 10, and requests for power-running drive and power generation. For example, the detection information of the rotating electric machine 10 may include a rotation angle (electrical angle information) of the rotor 20 that is detected by an angle detector such as a resolver, a power supply voltage (inverter input voltage) that is detected by a voltage sensor, and an energization current of each phase that is detected by a current sensor. For example, the control apparatus 270 may perform on/off control of the switches 261 and 262 by pulse-width modulation (PWM) control at a predetermined switching frequency (carrier frequency) or rectangular wave control. The control apparatus 270 may be an internal control apparatus that is provided inside the rotating electric machine 10 or may be an external control apparatus that is provided outside the rotating electric machine 10.

Here, because the rotating electric machine 10 according to the present embodiment has a slot-less structure (toothless structure), an electrical time constant decreases as a result of decrease in inductance in the stator 60. Under such circumstances in which the electrical time constant is small, the switching frequency (carrier frequency) is preferably increased and switching speed is preferably increased. In this regard, wiring inductance decreases as a result of the charge-supplying capacitor 264 being connected in parallel to the serial-connection body of the switches 261 and 262 of each phase. Appropriate surge measures can be taken even in a configuration in which the switching speed is increased.

A high-potential-side terminal of the inverter 260 is connected to a positive electrode terminal of a direct-current power supply 265, and a low-potential-side terminal is connected to a negative electrode terminal (ground) of the direct-current power supply 265. For example, the direct-current power supply 265 may be configured by an assembled battery in which a plurality of unit batteries are connected in series. In addition, a smoothing capacitor 266 is connected to the high-potential-side terminal and the low-potential-side terminal of the inverter 260, in parallel with the direct-current power supply 265.

FIG. 36 shows a current feedback control process for controlling the phase currents of the U-, V-, and W-phases.

In FIG. 36, a current command value setting unit 271 sets a d-axis current command value and a q-axis current command value based on a power-running torque command value or a power-generation torque command value for the rotating electric machine 10, and an electrical angular velocity ω obtained by time-differentiating an electrical angle θ, using a torque-dq map. Here, for example, the power-generation torque command value may be a regeneration-torque command value when the rotating electric machine 10 is used as a vehicle power source.

A dq converting unit 272 converts a current detection value (three phase currents) from a current sensor that is provided for each phase to a d-axis current and a q-axis current that are components of an orthogonal two-dimensional rotating coordinate system in which a field direction (direction of an axis of a magnetic field or field direction) is the d-axis.

A d-axis current feedback control unit 273 calculates a d-axis command voltage as a manipulated variable for performing feedback control of the d-axis current to the d-axis current command value. In addition, a q-axis current feedback control unit 274 calculates a q-axis command voltage as a manipulated variable for performing feedback control of the q-axis current to the q-axis current command value. In the feedback control units 273 and 274, the command voltages are calculated using a proportional-integral (PI) feedback method based on deviation of the d-axis current and the q-axis current from the current command values.

A three-phase converting unit 275 converts the d-axis and q-axis command voltages to U-phase, V-phase, and W-phase command voltages. Here, the above-described units 271 to 275 are a feedback control unit that performs feedback control of a fundamental wave current based on a dq transformation theory. The U-phase, V-phase, and W-phase command voltages are feedback control values.

In addition, an operating signal generating unit 276 generates an operating signal for the inverter 260 based on the command voltages of the three phases using a known triangular-wave-carrier comparison method. Specifically, the operating signal generating unit 276 generates a switch operating signal (duty signal) for the upper and lower arms of each phase by PWM control based on a comparison of magnitude between a signal in which the command voltages of the three phases are standardized by the power supply voltage and a carrier signal such as a triangular wave signal. The switch operating signal that is generated by the operating signal generating unit 276 is outputted to the driver 263 of the inverter 260 and the switches 261 and 262 of each phase are turned on/off by the driver 263.

Next, a torque feedback control process will be described. For example, this process may be mainly used for the purpose of increasing output and reducing loss in the rotating electric machine 10 under driving conditions in which the output voltage of the inverter 260 increases, such as in a high-rotation region and a high-output region. The control apparatus 270 selects either of the torque feedback control process and the current feedback control process based on the driving conditions of the rotating electric machine 10, and performs the selected process.

Figure 37:
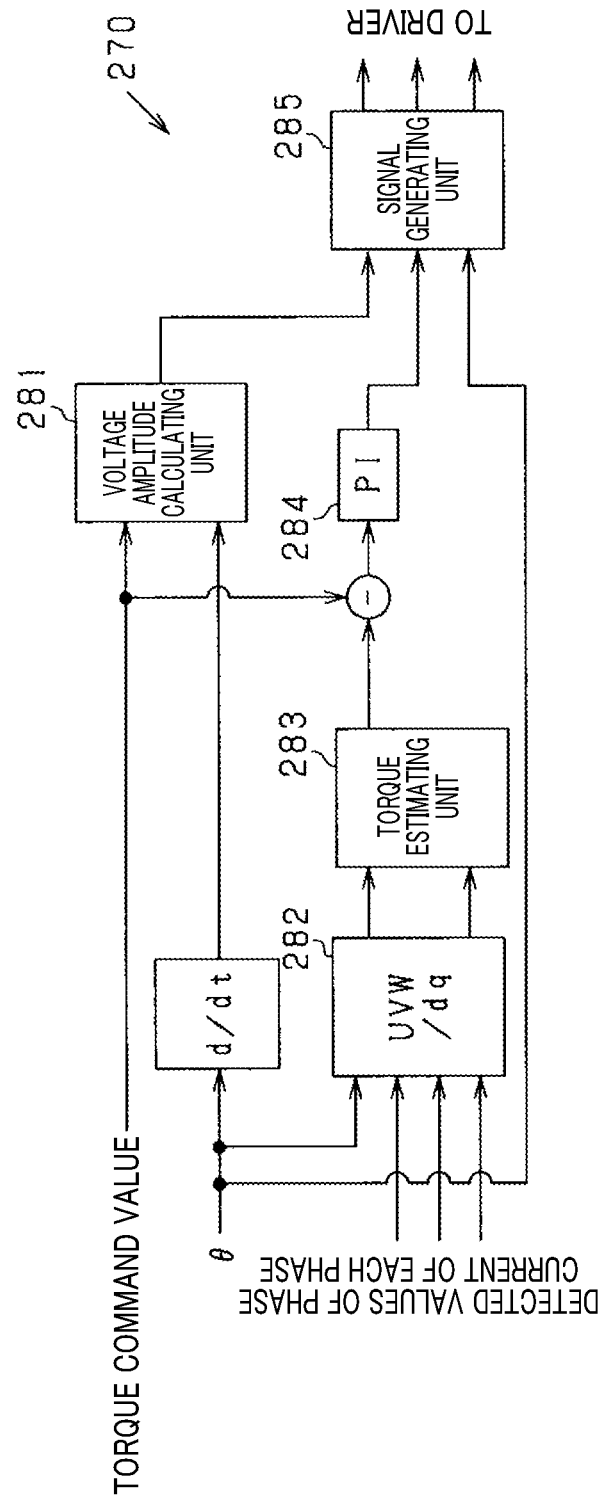
FIG. 37 is a functional block diagram illustrating a torque feedback control process by the control apparatus.

FIG. 37 shows the torque feedback control process that corresponds to the U-, V-, and W-phases.

A voltage amplitude calculating unit 281 calculates a voltage amplitude command that is a command value for a magnitude of a voltage vector, based on the power-running torque command value or the power-generation torque command value for the rotating electric machine 10, and the electrical angular velocity ω obtained by time-differentiating the electrical angle θ.

In a manner similar to the dq converting unit 272, a dq converting unit 282 converts the current detection value from the current sensor that is provided for each phase to the d-axis current and the q-axis current. A torque estimating unit 283 calculates a torque estimation value that corresponds to the U-, V-, and W-phases based on the d-axis current and the q-axis current. Here, the torque estimating unit 283 may calculate the voltage amplitude command based on map information in which the d-axis current, the q-axis current, and the voltage amplitude command are associated.

A torque feedback control unit 284 calculates a voltage phase command that is a command value for a phase of the voltage vector as a manipulated variable for performing feedback control of the torque estimation value to the power-running torque command value or the power-generation torque command value. In the torque feedback control unit 284, the voltage phase command is calculated using the PI feedback method, based on a deviation of the torque estimation value from the power-running torque command value or the power-generation torque command value.

An operating signal generating unit 285 generates the operating signal of the inverter 260 based on the voltage amplitude command, the voltage phase command, and the electrical angle θ. Specifically, the operating signal generating unit 285 calculates the command voltages of the three phases based on the voltage amplitude command, the voltage phase command, and the electrical angle θ, and generates the switch operating signal for the upper and lower arms of each phase by PWM control based on a comparison of magnitude between a signal in which the calculated command voltages of the three phases are standardized by the power supply voltage and a carrier signal such as a triangular wave signal. The switch operating signal that is generated by the operating signal generating unit 285 is outputted to the driver 263 of the inverter 260, and the switches 261 and 262 of each phase is turned on/off by the driver 263.

Here, the operating signal generating unit 285 may generate the switch operating signal based on pulse pattern information that is map information in which the voltage amplitude command, the voltage phase command, the electrical angle θ, and the switch operating signal are associated, the voltage amplitude command, the voltage phase command, and the electrical angle θ.

Modifications

Modifications related to the above-described embodiment will be described below.

Figure 38:
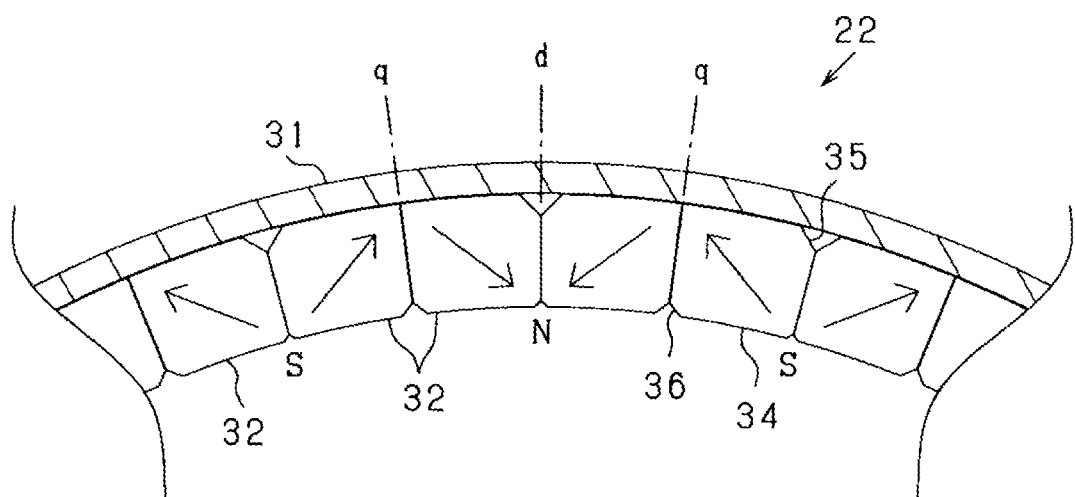
FIG. 38 is a partial lateral cross-sectional view of a cross-sectional structure of a magnet unit in a modification.

The configuration of the magnet in the magnet unit 22 may be modified in a following manner. In the magnet unit 22 shown in FIG. 38, the orientation of the easy axis of magnetization of the magnet 32 is oblique in relation to the radial direction, and a linear magnet magnetic path is formed along the orientation of the easy axis of magnetization. In the present configuration as well, the magnet magnetic path length of the magnet 32 can be made longer than the thickness dimension in the radial direction. Improvement in permeance can be achieved.

In the magnet unit 22, magnets that are in the Halbach array can be used.

In each partial winding 151, a bending direction of the crossover portion 153 may be either of the inner side and the outer side in the radial direction. In terms of a relationship with the core assembly CA, the first crossover portion 153A may be bent towards the core assembly CA side or the first crossover portion 153A may be bent towards the side opposite the core assembly CA. In addition, the second crossover portion 153B may be bent towards either of the inner side and the outer side in the radial direction, as long as the second crossover portion 153B straddles a portion of the first crossover portion 153A in the circumferential direction on the outer side in the axial direction of the first crossover portion 153A.

The partial winding 151 may not have two types of partial windings 151 (the first partial winding 151A and the second partial winding 151B), but rather, may have a single type of partial winding 151. Specifically, the partial winding 151 may be formed so as to have a substantially L-like shape or a substantially Z-like shape from a side view. When the partial winding 151 is formed into the substantially L-like shape from a side view, the crossover portion 153 is bent towards either of the inner side and the outer side in the radial direction on one end side in the axial direction and the crossover portion 153 is provided without being bent in the radial direction on the other end side in the axial direction. In addition, when the partial winding 151 is formed into the substantially Z-like shape from a side view, the crossover portions 153 are bent in opposite directions in the radial direction on one end side in the axial direction and on the other end side in the axial direction. In either case, the coil module 150 may be fixed to the core assembly CA by the insulation cover that covers the crossover portion 153 as described above.

In the above-described configuration, in the stator winding 61, all of the partial windings 151 are connected in parallel for each phase winding. However, this configuration may be modified. For example, all of the partial windings 151 for each phase winding may be divided into a plurality of parallel-connection groups, and the plurality of parallel-connection groups may be connected in series. That is, all of n partial windings 151 of each phase winding may be divided into two sets of parallel-connection groups that are n/2 partial windings 151 each, three sets of parallel-connection groups that are n/3 partial windings 151 each, or the like, and the parallel-connection groups may be connected in series. Alternatively, in the stator winding 61, the plurality of partial windings 151 may be all connected in series for each phase winding.

The stator winding 61 in the rotating electric machine 10 may have phase windings of two phases (the U-phase winding and the V-phase winding). In this case, for example, in the partial winding 151, the pair of intermediate conductor portions 152 may be provided so as to be separated by a single coil pitch, and a single intermediate conductor portion 152 of the partial winding 151 of the other phase may be arranged between the pair of intermediate conductor portions 152.

Figure 39A:
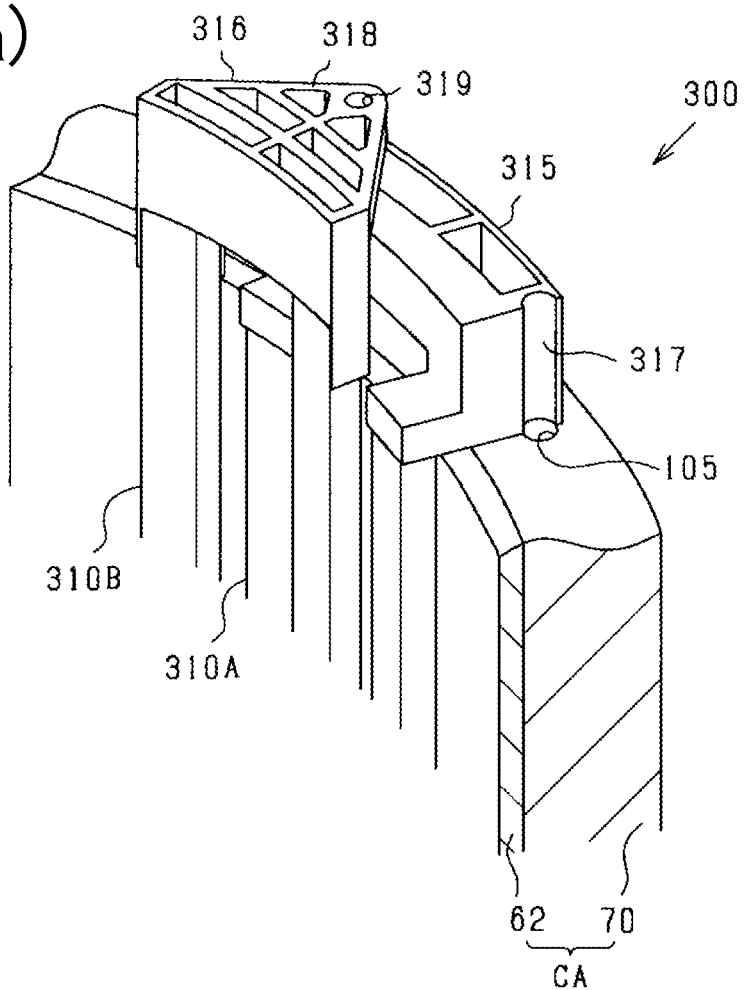
FIG. 39($a$) and FIG. 39($b$) are diagrams illustrating a configuration of a stator unit that has an inner-rotor structure.
Figure 39B:
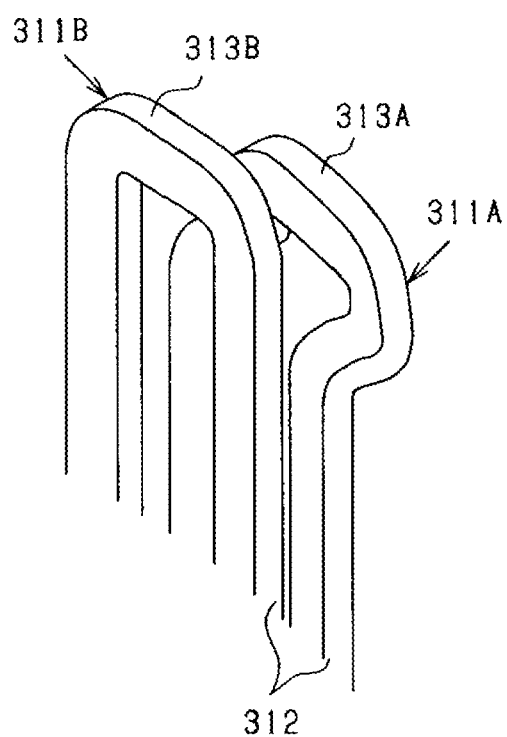

The rotating electric machine 10 can be actualized as an inner-rotor-type surface-magnet-type rotating electric machine, instead of the outer-rotor-type surface-magnet-type rotating electric machine. FIG. 39(a) and FIG. 39(b) show a configuration of a stator unit 300 in a case of an inner rotor structure. Of FIG. 39(a) and FIG. 39(b), FIG. 39(a) is a perspective view of a state in which coil modules 310A and 310B are assembled to the core assembly CA. FIG. 39(b) is a perspective view of partial windings 311A and 311B that are included in the coil modules 310A and 310B. In the present example, the core assembly CA is configured by the stator holder 70 being assembled on the outer side in the radial direction of the stator core 62. In addition, a plurality of coil modules 310A and 310B are assembled on the inner side in the radial direction of the stator core 62.

The partial winding 311A has a configuration that is substantially similar to that of the first partial winding 151A described above. The partial winding 311A has a pair of intermediate conductor portions 312 and crossover portions 313A that are formed by being bent towards the core assembly CA side (the outer side in the radial direction) on both sides in the axial direction. In addition, the partial winding 311B has a configuration that is substantially similar to that of the second partial winding 151B described above. The partial winding 311B has the pair of intermediate conductor portions 312 and crossover portions 313B that are provided so as to straddle the crossover portions 313A in the circumferential direction on the outer side in the axial direction, on both sides in the axial direction. An insulation cover 315 is attached to the crossover portion 313A of the partial winding 311A, and an insulation cover 316 is attached to the crossover portion 313B of the partial winding 311B.

In the insulation cover 315, semicircular recess portions 317 that extend in the axial direction are formed in side surface portions on both sides in the circumferential direction. In addition, in the insulation cover 316, a protruding portion 318 that protrudes further towards the outer side in the radial direction than the crossover portion 313B is provided. A through hole 319 that extends in the axial direction is provided in a tip end portion of the protruding portion 318.

Figure 40:
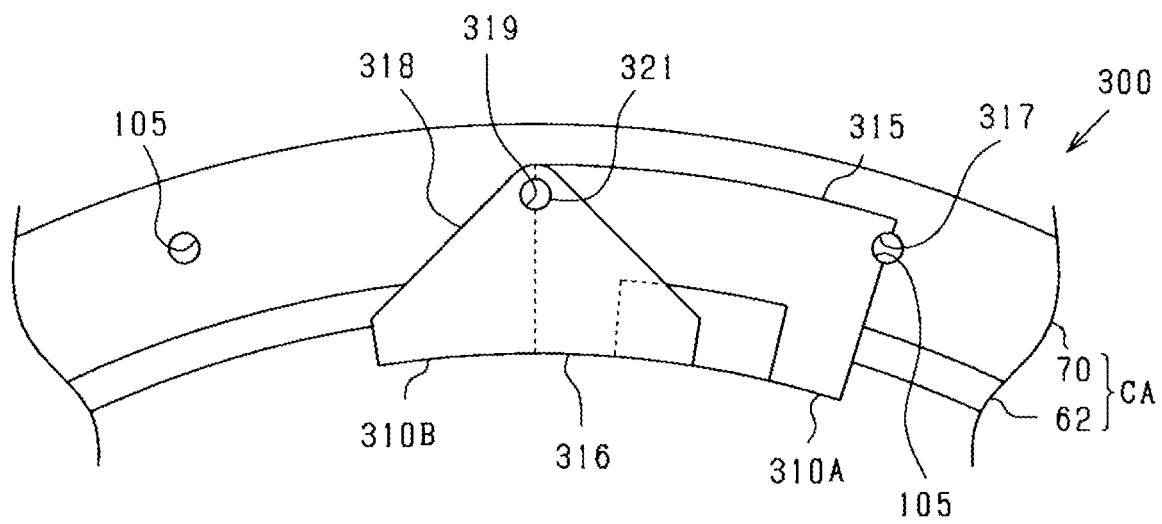
FIG. 40 is a plan view of a state of assembly of a coil module to a core assembly.

FIG. 40 is a plan view of a state in which the coil modules 310A and 310B are assembled to the core assembly CA. Here, in FIG. 40, a plurality of recess portions 105 are formed at even intervals in the circumferential direction on the end surface in the axial direction of the stator holder 70. In addition, the stator holder 70 has a cooling structure that uses a liquid coolant or air. For example, as an air cooling structure, a plurality of heat dissipating fins may be formed on the outer circumferential surface.

In FIG. 40, the insulation covers 315 and 316 are arranged so as to overlap in the axial direction. In addition, the recess portion 317 that is provided on the side surface portion of the insulation cover 315 and the through hole 319 that is provided in a position that is a center between one end and the other end in the circumferential direction of the insulation cover 316 in the protruding portion 318 of the insulation cover 316 are connected in the axial direction. Fixing by a fixing pin 321 is performed in these portions.

Furthermore, in FIG. 40, a fixing position of the insulation covers 315 and 316 by the fixing pin 321 is the end surface in the axial direction of the stator holder 70 that is further towards the outer side in the radial direction than the stator core 62. Fixing by the fixing pin 321 is performed to the stator holder 70. In this case, the stator holder 70 is provided with the cooling structure. Thus, heat that is generated in the partial windings 311A and 311B is easily transferred to the stator holder 70. Consequently, cooling performance of the stator winding 61 can be improved.

The stator 60 that is used in the rotating electric machine 10 may include a protruding portion (such as teeth) that extends from the back yoke. In this case as well, all that is required is that assembly of the coil module 150 and the like to the stator core is performed to the back yoke.

The rotating electric machine is not limited to one having a star connection and may have a Δ connection.

As the rotating electric machine 10, instead of a rotating-field-type rotating electric machine in which the field element is the rotor and the armature is the stator, a rotating-armature-type rotating electric machine in which the armature is the rotor and the field element is the stator can also be used.

Second Modification

According to the above-described embodiment or the above-described modification, the configuration of the conductor material CR that serves as the conductor may be as follows. Hereafter, the configuration of the conductor material CR in the modification will mainly be described in detail. Here, in the present modification, sections that differ from the configurations described according to the above-described embodiment and in the above-described example will mainly be described. In addition, in the present modification, as a basic configuration of the rotating electric machine 10, the configuration according to the first embodiment will be described as an example.

Figure 41:
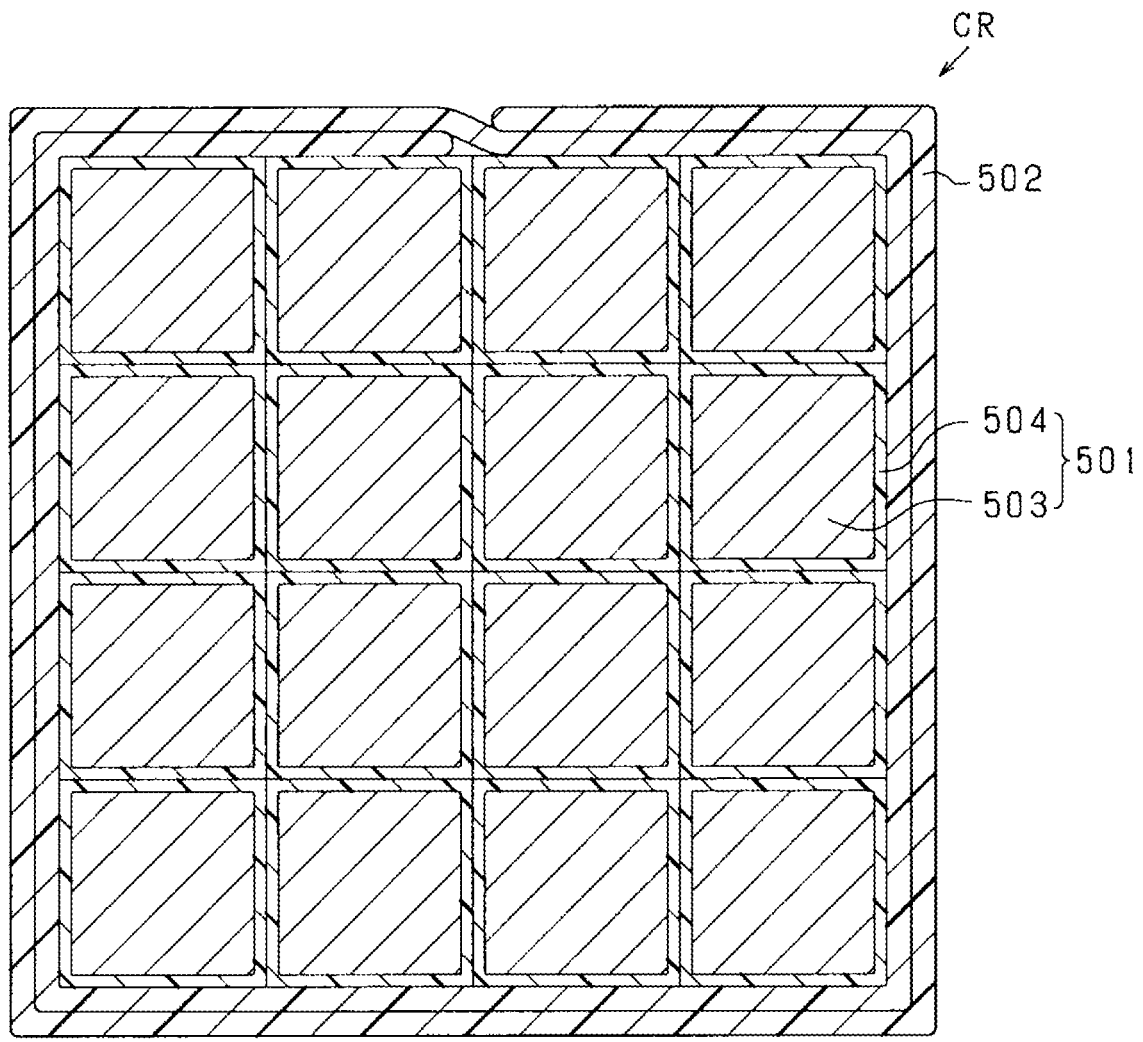
FIG. 41 is a cross-sectional view of a conductor material in a second modification.

FIG. 41 is an enlarged cross-sectional view of the conductor material CR. Here, a cross-section of the conductor material CR is not limited to a quadrangular shape and may be an arbitrary shape. For example, the cross-sectional may be a polygon instead of a quadrangle, or a circle. In addition, the conductor material CR is configured by a plurality of wires 501 being covered by an insulation coating 502 in a bundled state. As a result, insulation is respectively ensured between the conductor materials CR that overlap one another in the circumferential direction or the radial direction, and between the conductor material CR and the stator core 62.

Here, insulation by the insulation coating 502 is maintained in the stator winding 61 that is configured by the conductor material CR, excluding an exposed portion for connection. For example, the exposed portion may be the winding end portions 154 and 155.

The wire 501 includes a conductor body 503 configured to permit flow of a current and a fusion layer 504 that covers a surface of the conductor body 503. For example, the conductor body 503 may be a conductive metal such as copper. The conductive body 503 is a quadrangular wire of which a cross-section has a square shape. However, the conductor body 503 may have other shapes (such as a polygonal shape or an elliptical shape), such as a round wire. In addition, for example, the fusion layer 504 may be an epoxy adhesive resin. Heat resistance is about 150° C.

The fusion layer 504 is configured to be thinner than the insulation coating 502. For example, the fusion layer 504 may have a thickness that is equal to or less than 10 μm. In the wire 501, only the fusion layer 504 is formed on the surface of the conductor body 503. A separate insulating layer is not provided. Here, the fusion layer 504 may be configured by an insulation material. That is, the fusion layer 504 combining a resin of a self-fusing wire and insulation is considered. Although the insulating layer and the fusion layer are ordinarily separate, the epoxy adhesive resin that serves as the fusion layer 504 also serves as the insulating layer. That which is ordinarily referred to as an insulating layer is absent.

In addition, the fusion layer 504 melts at a lower temperature than the insulation coating 502. Alternatively, the fusion layer 504 has a characteristic in which a dielectric constant is high. As a result of the characteristic in which the fusion layer 504 melts at a low temperature, an effect in which conduction in end portions between the wires 501 is facilitated can be achieved. Furthermore, fusion and the like is facilitated. Moreover, as a reason for which the dielectric constant may be high, a precondition that a potential difference is smaller between the wires 501 than between the conductor materials CR can be given. As a result of a configuration such as this, even if the fusion layer 504 melts, eddy current loss can be effectively reduced by only contact resistance.

In addition, in a state in which the plurality of wires 501 are bundled, the fusion layers 504 are fused and in contact with one another. As a result, adjacent wires 501 are fixed together. Vibrations and noise that are generated as a result of the wires 501 rubbing together are suppressed. Furthermore, the shape is maintained by the plurality of wires 501 that have the fusion layers 504 being bundled and gathered, and the fusion layers 504 being fused together.

The insulation coating 502 is made of resin and may be, for example, a modified-polyimide (PI) enamel resin. As a result of the modified PI being used, oil resistance is achieved. Hydrolysis and attacks by sulfur are prevented in an automatic transmission fluid (ATF) and the like. Here, in this case, a coefficient of linear expansion of the epoxy adhesive resin is greater than that of the modified-PI enamel resin.

Figure 42:
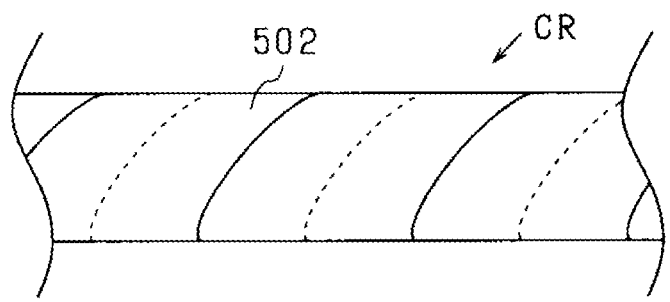
FIG. 42 is a side view of the conductor material in the second modification.

The insulation coating 502 is formed into a wide tape-like shape and is wound in a spiraling manner around an outer circumference of the bundled plurality of wires 501. As shown in FIG. 42, the insulation coating 502 is wound in a spiraling manner so as to be slightly shifted in an extending direction (left/right direction in FIG. 42) of the wires 501 such that the insulation coatings 502 overlap each other. Specifically, the insulation coating 502 is wound such that an amount that amounts to substantially half a width of the insulation coating 502 overlaps. As a result, the insulation coating 502 is provided in two layers in every section excluding the end portions. Here, the insulation coating 502 is not necessarily required to be provided in two layers, and may be three layers or more. Furthermore, as long as a gap is not formed, the insulation coating 501 may be provided in a single layer.

In addition, the insulation coating 502 is configured to have a higher insulation performance than the fusion layer 504 of the wire 501 and to be capable of providing insulation between phases. For example, when a thickness of the fusion layer 504 of the wire 501 is about 1 μm, a total thickness of the insulation coating 502 may be preferably about 9 μm to 50 μm, thereby enabling insulation between phases to be favorably performed. Specifically, when the insulation coating 502 is provided in two layers, a thickness dimension of a single layer may be about 5 μm.

Figure 43:
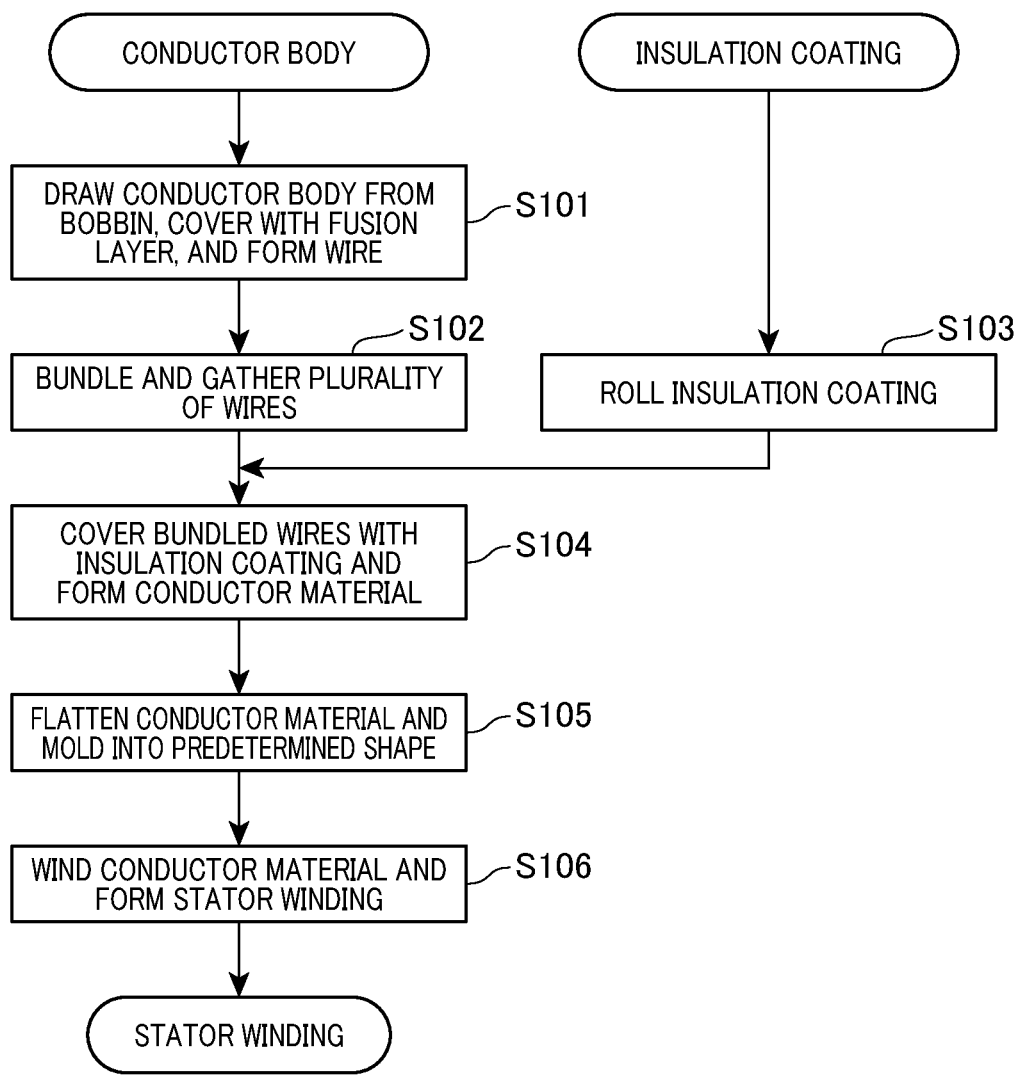
FIG. 43 is a flowchart illustrating a manufacturing method for the stator winding.

Next, a manufacturing method for the rotating electric machine 10, or more specifically, the stator winding 61 will be described with reference to FIG. 43 and FIG. 44. FIG. 43 is a flowchart illustrating a flow of the manufacturing method. FIG. 44 is an image diagram of a manufacturing line.

While linear conductor bodies 503 are respectively drawn from a plurality of bobbins 601 (reels) that have a circular cylindrical shape and around which the conductor bodies 503 are wound, the fusion layer 504 is applied to the surfaces of the conductor bodies 503 (step S101). Here, the wire 501 to which the fusion layer 504 is applied to the conductor body 503 may be wound onto the bobbin 602 in advance and stored. The wire 501 may then be drawn out from the bobbin 601.

Then, the wires 501 are bundled and gathered (step S102). At this time, the fusion layers are placed in contact with one another and fussed. In addition, at step S102, the wires 501 are straightened by tension being applied thereto. Here, the wires 501 may be straightened before being gathered (before step S102). This step S102 is a gathering step.

Meanwhile, as a result of the wide tape-like insulation coating 502 being rolled, the insulation coating 502 is processed to be made thinner (step S103). Here, as a result of the rolling process, work hardening occurs, and tensile strength of the insulation coating 502 improves from that before processing. This step S103 is a rolling step.

Subsequently (after step S102 and step S103), the tape-like insulation coating 502 that has been rolled is wound in a spiraling manner around the outer circumference of the plurality of wires 501 that are in the bundled state, and the outer circumference of the wires 501 is covered (step S104). Step S104 is a coating step. Then, in the state in which the plurality of wires 501 are covered by the insulation coating 502, a flattening step is performed such that the cross-section becomes a predetermined shape (such as a quadrangle) (step S105). As a result, the conductor material CR is formed. Here, the flattening step may be after the gathering step in which the wires 501 are bundled.

Then, as described according to the first embodiment, the conductor material CR is wound, thereby forming the stator winding 61 (step S106). For example, the stator winding 61 may be formed by the conductor material CR being wound along a stator winding bobbin 602. Step S106 is a winding step. Here, straightness of the wires 501 is maintained from when the wires 501 are straightened until the wires 501 are wound to form the stator winding 61 (from step S102 to step S106). That is, the manufacturing line is formed such that, after the conductor material CR is formed, the conductor material CR is not again wound onto a circular cylindrical bobbin.

In the above-described second modification, following effects can be achieved.

The insulation coating 502 provides insulation between the conductor materials CR. Meanwhile, although the conductor body 503 of the wire 501 is covered by the fusion layer 504, the insulating layer is not provided. Therefore, the conductor bodies 503 may come into contact with each other and become conductive. However, the potential difference between the conductor bodies 503 is small. In addition, even if the fusion layer 504 is damaged when the plurality of wires 501 are bundled or covered by the insulation coating 502, an area over which the conductor bodies 503 come into contact with each other is extremely small, and contact resistance is extremely large. Therefore, even if the conductor bodies 503 are not completely insulated, eddy currents flowing between the conductor bodies 503 can be suppressed.

Therefore, the fusion layer 504 is directly provided on the conductor body 503 without the insulating layer being provided on the surface of the conductor body 503, and the fusion layers 504 are fused together. As a result, difficulty in providing the insulating layer is eliminated. In addition, as a result of the fusion layer 504 being provided, the state in which the plurality of wires 501 are bundled can be easily maintained and covering by the insulation coating 502 can be facilitated. As a result of the foregoing, the conductor material CR and the rotating electric machine 10 can be easily manufactured.

The insulation coating 502 is formed into a tape-like shape and is wound in a spiraling manner around the outer circumference of the plurality of wires 501 that are bundled. Because the conductor material CR is formed by the tape-like insulation coating 502 being wound around the plurality of wires 501, compared to a case in which the plurality of wires 501 are resin-molded or the like, the insulation coating 501 can be made thinner. In addition, because the wires 501 are fused by the fusion layers 504, the shape can be maintained in the bundled state. The tape-like insulation coating 502 can be easily wound.

Unlike a conventional step in which the insulation coating 502 is applied by extrusion, because the insulation coating 502 is rolled, the insulation coating 502 can be made thinner and work-hardened. Therefore, when the stator winding 61 is formed by the conductor material CR being wound, the insulation coating 502 is no longer damaged. That is, force that is unique to separated wires in which separated wires 501 move irregularly against one another when being bent and tear the insulation coating 502 can be received by the insulation coating 502 that is reinforced tape. Here, when the coating is applied by extrusion, the coating may crack. In addition, because the insulation coating 502 can be made thin, space factor of the conductor body 503 in relation to a housing space of the stator winding 61 can be improved.

In the coating step at step S104, when the insulation coating 502 is wound around the outer circumference of the plurality of wires 501 that are bundled, the insulation coating 502 is wound in a spiraling manner such that the insulation coatings 502 overlap. As a result, foreign matter such as dust and water reaching the wires 501 through a gap between the insulation coatings 502 from outside can be prevented. In addition, because the insulation coatings 502 overlap each other, gaps are not easily formed even when the conductor material CR is wound and the stator winding 61 is formed. Furthermore, electrodeposition, enamel coating, and the like cannot be favorably performed on gaps that are present between the wires 501, and pores are formed. However, through use of the tape-like insulation coating 502, this issue can be resolved.

After the conductor material CR is formed (after the coating step), when the conductor material CR that is wound onto the bobbin is used, the conductor material CR that is drawn out from the bobbin bends. Minute shifting of straightness occurs, and improvement in space factor is inhibited. That is, an issue that is unique to separated wires in which stretching differs between the wire on the inner side and the wire on the outer side of the bobbin when the conductor material CR is wound onto the bobbin arises. Specifically, only the wire on the outer side of the bobbin is stretched. Therefore, when the conductor material CR of which only the outer side is stretched is drawn out from the bobbin to form the stator winding 61, because a portion is contracted, the conductor material CR has a wave-like shape. Because this conductor material CR is formed into the stator winding 61, when the conductor material CR is wound, gaps form between the conductor materials CR. Increase in space factor is inhibited, and copper loss increases.

Therefore, at the gathering step at step S101, pressure is applied to the plurality of wires 501 in the bundled state and the plurality of wires 501 are straightened. Subsequent to the gathering step, the wires 501 are kept straight until the conductor material CR is wound and the stator winding 61 is formed at step S106. Therefore, compared to when the conductor material CR is again wound around a circular cylindrical bobbin, the straightness of the conductor material CR can be improved. That is, based on curvature differing between the outer circumferential side and the inner circumferential side when the conductor material CR is wound onto the bobbin, a shift in straightness of the conductor material CR does not easily occur, and a wave-like peculiarity is not easily formed. Therefore, when the conductor material CR is wound and the stator winding 61 is formed, gaps are not easily formed between the conductor materials CR and the space factor can be improved.

The first coil module 150A has a shape in which the partial winding 151 is bent towards the inner side in the radial direction, that is, the stator core 62 side in the coil end CE. However, as described above, because the insulation coating 502 is rolled and tensile strength is improved, the insulation coating 502 is not easily damaged and can appropriately provide insulation. In addition, as a result of the coil end CE being formed so as to be bent in the radial direction, axial length of the stator winding 61 can be suppressed.

The thickness of the insulation coating 502 is configured to be thicker than that of the fusion layer 504. As a result, required intraphase withstand pressure and interphase withstand pressure can be ensured. Eddy current loss can be prevented without increase in copper loss. Copper loss occurs as a result of an area of copper decreasing as a result of increase in the coating.

Other Examples of the Second Modification

The configurations of the conductor material CR and the stator winding 62 in the above-described second modification may be modified as described below. Here, in this other example, sections that differ from the configurations described according to the above-described embodiment and in the above-described modifications and the like will mainly be described. In addition, in the present modification, as a basic configuration, the configuration in the second modification will be described as an example.

In the above-described second modification, the coefficient of linear expansion (linear expansion rate) of the fusion layer 504 may differ from the coefficient of linear expansion of the insulation coating 502. That is, as described above, the potential difference between the conductor bodies 503 is small. In addition, even if the fusion layer 504 is damaged when the plurality of wires 501 are bundled or covered by the insulation coating 502, the area over which the conductor bodies 503 come into contact with each other is extremely small, and contact resistance is extremely large. Therefore, even if the conductor bodies 503 are not completely insulated, eddy currents flowing between the conductor bodies 503 can be suppressed. It can also be said that, even if the fusion layer 504 is damaged and the conductor bodies 503 come into contact with each other after manufacturing, issues do not arise. Therefore, an arbitrary material that has a coefficient of linear expansion that differs from the coefficient of linear expansion of the insulation coating 502 can be selected for the fusion layer 504. Design is facilitated. For example, the coefficient of linear expansion of the fusion layer 504 may be greater than the coefficient of linear expansion of the insulation coating 502.

Furthermore, the coefficient of linear expansion of the fusion layer 504 may, of course, be smaller than the coefficient of linear expansion of the insulation coating 502. When the coefficient of linear expansion of the fusion layer 504 is smaller, the fusion layer 504 is not easily damaged and locations of contact between the conductor bodies 503 do not increase. Increase in eddy current loss can be suppressed.

In the above-described second modification, the coefficient of linear expansion (linear expansion rate) of the fusion layer 504 may be same as the coefficient of linear expansion of the insulation coating 502. As a result, simultaneous cracking of the fusion layer 504 and the insulation coating 502 can be suppressed.

In the above-described second modification, the coefficient of linear expansion (linear expansion rate) of the fusion layer 504 may differ from the coefficient of linear expansion of the conductor body 503. Here, when the coefficient of linear expansion (linear expansion rate) of the fusion layer 504 is between the coefficient of linear expansion of the conductor body 503 and the coefficient of linear expansion of the insulation coating 502, the fusion layer 504 serves as a cushion and cracking of the insulation coating 502 can be suppressed.

Polyamide (PA), PI, polyamide-imide (PAI), polyether ether ketone (PEEK), and the like can be used as the insulation coating 502 in the above-described second modification. In addition, fluorine, polycarbonate, silicon, epoxy, polyethylene naphthalate, or liquid-crystal polymer (LCP) may be used as the fusion layer 504.

In the above-described second modification, the flattening step is provided. However, when the conductor body 503 is a square-shaped wire and the conductor bodies 503 can be bundled without gaps, the flattening step may be omitted. Here, when the conductor body 503 is a round wire, the flattening step is preferably provided. The flattening step may be performed after the wires 501 are bundled. However, the flattening step may be performed such that the cross-sectional shape of each wire 501 is square-shaped before the wires 501 are bundled.

Figure 45A:
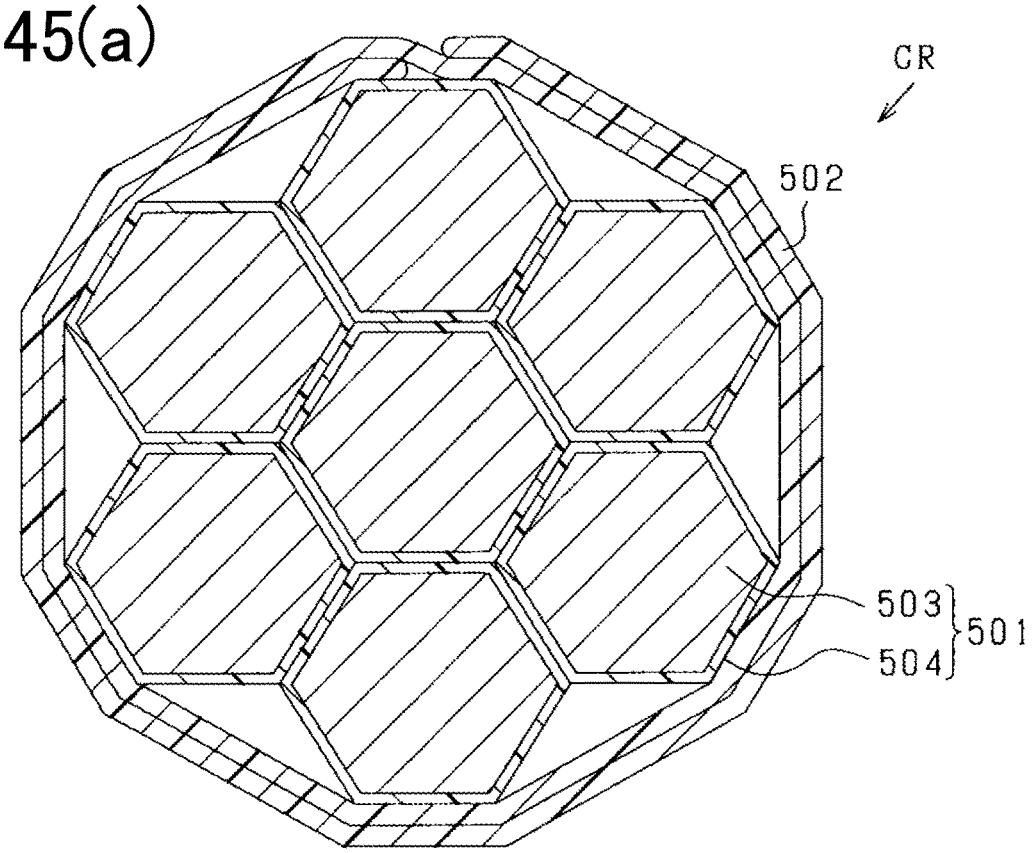
FIG. 45(a) and FIG. 45(b) are cross-sectional views of a conductor material of another example.
Figure 45B:
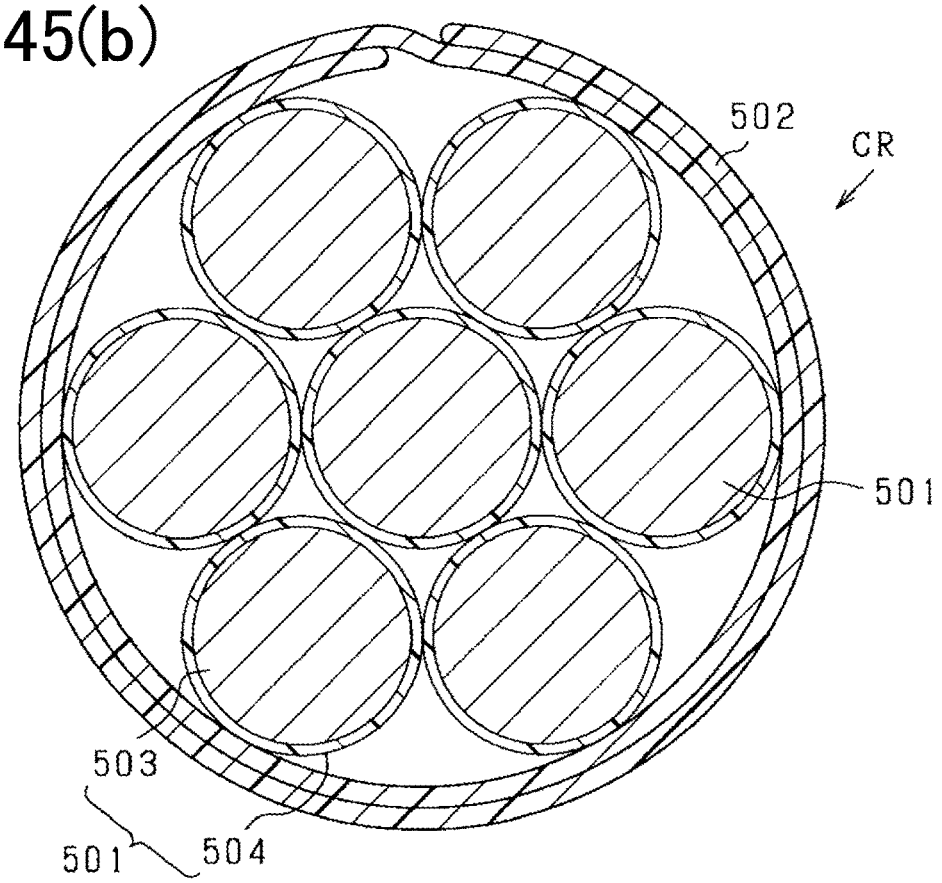

In the above-described second modification, the cross-sectional shape of the conductor body 503 may be any of a hexagon, a pentagon, a square, a triangle, and a circle. The cross-sectional shape of the conductor material CR may also be any of hexagon, a pentagon, a square, a triangle, and a circle. For example, as shown in FIG. 45(a), the cross-sectional shape of the conductor body 503 may be a hexagon and the cross-sectional shape of the conductor material CR may be a polygon. In addition, as shown in FIG. 45(b), the cross-sectional shapes of the conductor body 503 and the conductor material CR may be a circle. Here, in FIG. 45(a) and FIG. 45(b), a gap is provided between the insulation coating 502 and the wires 501. However, processing may be performed such that the gap is eliminated by the flattening step. In addition, the shapes of the conductor bodies 503 and the fusion layers 504 are not all required to be the same. The shapes of some or all of the conductor bodies 503 or the fusion layers 504 may differ as a result of the flattening step and the like. Furthermore, the shape of some or all of the conductor bodies 503 or the fusion layers 504 may, of course, be deformed as a result of being subject to the flattening step.

In the above-described second modification, the conductor body 503 of the wire 501 may be configured as a composite of fine, fibrous conductor materials that are bundled. For example, the conductor body may be a composite of carbon nanotube (CNT) fibers. As the CNT fibers, fibers that include boron-containing microfibers in which at least a portion of carbon is replaced by boron may be used. As carbon-based microfibers, in addition to the CNT fibers, vapor-grown carbon fibers (VGCF) and the like can be used. However, the CNT fibers are preferably used.

In the above-described second modification, the conductor material CR may be configured such that the plurality of wires 501 are twisted together. In this case, generation of eddy currents in the wires 501 is further suppressed. In addition, as a result of the wires 501 being twisted, a portion in which application directions of the magnetic field are opposite each other is formed a single wire 501 and counter-electromotive voltage is cancelled out. Therefore, again, reduction in eddy currents can be achieved. In particular, as a result of the wire 501 being configured by a fibrous conductor material, thinning and significant increase in twists can be achieved. Eddy currents can be more favorably reduced.

According to the above-described embodiment and in the second modification, the stator winding 61 is covered and sealed by a sealing member such as the insulation covers 161 to 164 and the insulation covering body 157. However, the stator winding 61 may be sealed such that the periphery of the conductor material CR that is wound is covered by resin molding. In this case, the sealing material that is formed by resin molding is preferably provided over an area that includes the coil ends CE of the stator winding 61. That is, the stator winding 61 is preferably resin-sealed over substantially its entirety, excluding the winding end portions 154 and 155, that is, the connection portions.

Here, when the rotating electric machine 10 is used as a vehicle power source, the above-described sealing member may be preferably made of high heat-resistant fluororesin, epoxy resin, polyphenylene sulfide (PPS) resin, PEEK resin, LCP resin, PAI resin, PI resin, or the like. In addition, taking into consideration the coefficient of linear expansion from the perspective of suppressing cracking due to expansion differences, the sealing member and the insulation coating 502 may be preferably made of the same material. That is, silicon resin of which the coefficient of linear expansion is generally twice that of other resins or greater is preferably excluded. Here, in an electrical product that does not include a motor that uses combustion, such as an electric vehicle, polyphenylene oxide (PPO) resin, phenol resin, and fiberglass-reinforced plastic (FRP) resin that have heat resistance of about 180° C. are also candidates. This is not limited thereto in fields in which an ambient temperature of the rotating electric machine can be considered less than 100° C.

Furthermore, when the sealing member is provided, the coefficient of linear expansion of the sealing member may differ from the coefficient of linear expansion of the insulation coating 502. For example, the coefficient of linear expansion of the insulation coating 502 may be smaller than the coefficient of linear expansion of the sealing member and smaller than the coefficient of linear expansion of the fusion layer 504. As a result, co-cracking can be prevented. That is, expansion due to external temperature changes can be temporarily prevented by the insulation coating 502 that has the small coefficient of linear expansion. The reverse is also true.

In addition, the coefficient of linear expansion of the insulation coating 502 may be a value between the coefficient of linear expansion of the sealing member and the coefficient of linear expansion of the fusion layer 504. For example, the coefficient of linear expansion of the sealing member may be greater than the coefficient of linear expansion of the insulation coating 502, and the coefficient of linear expansion of the insulation coating 502 may be greater than the coefficient of linear expansion of the fusion layer 504. That is, the coefficient of linear expansion may increase towards the outer side. Furthermore, the coefficient of linear expansion of the sealing member may be smaller than the coefficient of linear expansion of the insulation coating 502, and the coefficient of linear expansion of the insulation coating 502 may be smaller than the coefficient of linear expansion of the of the fusion layer 504. That is, the coefficient of linear expansion may increase towards the inner side. As a result, even when a difference is present between the coefficient of linear expansion of the sealing member and the coefficient of linear expansion of the fusion layer 504, as a result of the insulation coating 502 that has a coefficient of linear expansion that is intermediate between the coefficient of linear expansion of the sealing member and the coefficient of linear expansion of the fusion layer 504 being interposed therebetween, the insulation coating 502 serves as a cushion. Consequently, simultaneous cracking of the sealing member and the fusion layer 504 as a result of external temperature change of the stator winding 61 or heat generation in the conductor body 503 can be suppressed.

In the above-described second modification, bonding strength between the conductor body 503 and the fusion layer 504, bonding strength between the fusion layer 504 and the insulation coating 502, and bonding strength between the sealing member and the insulation coating 502 may differ. For example, the bonding strength may weaken towards the outer side. Here, for example, a magnitude of the bonding strength can be ascertained by tensile strength that is required when the two layers of coating are peeled. As a result of the bonding strength being set as described above, even when internal and external temperature differences caused by heat generation or cooling occur, cracking occurring in both the inner layer side and the outer layer side (co-cracking) can be suppressed.

Figure 46:
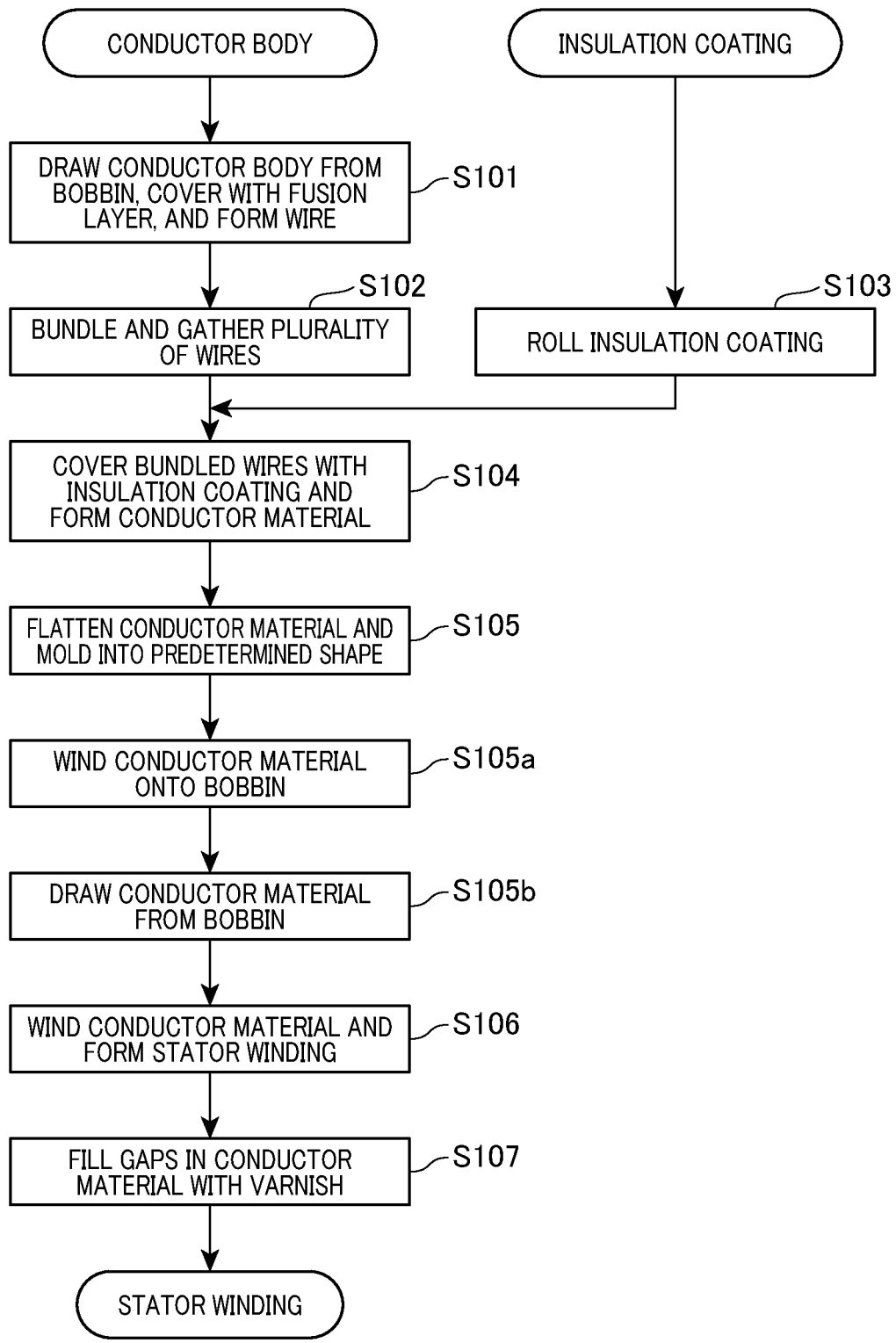
FIG. 46 is a flowchart illustrating a manufacturing method for a stator winding in another example.

In the above-described second modification, after the conductor material CR is formed, the conductor material CR may be temporarily wound onto a circular cylindrical bobbin and stored. That is, as shown in FIG. 46, after step S105, after the conductor material CR is formed, the conductor material CR may be temporarily wound onto a circular cylindrical bobbin and stored (step S105a). Then, the conductor material CR may be drawn out from the bobbin (step S105b), and as a result of the conductor material CR being wound as described according to the first embodiment, the stator winding 61 may be formed (step S106).

In this case, based on curvature differing between the outer circumferential side and the inner circumferential side when the conductor material CR is wound onto the bobbin, a shift in straightness of the conductor material CR occurs, and a wave-like peculiarity is formed. Therefore, when the conductor material CR is wound and the stator winding 61 is formed, gaps are easily formed between the conductor materials CR. Therefore, a filler material such as varnish fills minute gaps between wires (step S107). As a result, vibrations can be reduced. In addition, because the conductor material CR is temporarily wound onto the circular cylindrical bobbin after being formed, straightness of the wire 501 is not required to be maintained from when the wire 501 is straightened until the wire 501 is wound to form the stator winding 61 (from step S102 to step S106). That is, these steps are not required to be actualized on a single manufacturing line. A degree of freedom of the manufacturing line can be improved.

The disclosure of the present specification is not limited to the embodiments given as examples. The disclosure includes the embodiments given as examples, as well as modifications by a person skilled in the art based on the embodiments. For example, the disclosure is not limited to the combinations of components and/or elements described according to the embodiments. The disclosure can be carried out using various combinations. The disclosure may have additional sections that can be added to the embodiments. The disclosure includes that in which a component and/or element according to an embodiment has been omitted. The disclosure includes replacements and combinations of components and/or elements between one embodiment and another embodiment. The technical scope that is disclosed is not limited to the descriptions according to the embodiments. Several technical scopes that are disclosed are cited in the scope of claims. Furthermore, the technical scopes should be understood to include all modifications within the meaning and scope of equivalency of the scope of claims.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

What is claimed is:

1. A rotating electric machine comprising:
    an armature that has an armature winding of multiple phases, wherein:
    the armature winding is configured by a conductor being wound;
    the conductor is configured by a plurality of wires covered by an insulation coating in a state in which the plurality of wires are bundled;
    each of the plurality of wires includes
        a conductor body configured to permit flow of a current, and
        a fusion layer that covers a surface of the conductor body,
        a bonding strength between the fusion layer and the insulation coating being weaker than a bonding strength between the conductor body and the fusion layer, and
        a coefficient of linear expansion of the fusion layer being between a coefficient of linear expansion of the conductor body and a coefficient of linear expansion of the insulation coating; and
    the fusion layer of each of the plurality of wires is thinner than the insulation coating, and in the state in which the plurality of wires are bundled, fusion layers of the plurality of wires are fused and in contact with one another.

2. The rotating electric machine according to claim 1, wherein:
    the insulation coating is formed into a tape-like shape and is wound in a spiraling manner around an outer circumference of the plurality of wires that are bundled.

3. A conductor that configures an armature winding of a rotating electric machine, wherein:
    the conductor is configured by a plurality of wires covered by an insulation coating in a state in which the plurality of wires are bundled;
    each of the plurality of wires includes
        a conductor body configured to permit flow of a current, and
        a fusion layer that covers a surface of the conductor body,
        a bonding strength between the fusion layer and the insulation coating being weaker than a bonding strength between the conductor body and the fusion layer, and
        a coefficient of linear expansion of the fusion layer being between a coefficient of linear expansion of the conductor body and a coefficient of linear expansion of the insulation coating;
    the fusion layer of each of the plurality of wires is thinner than the insulation coating; and
    in the state in which the plurality of wires are bundled, fusion layers of the plurality of wires are fused and in contact with one another.

* * * * *